United States Patent
Chandran et al.

(10) Patent No.: US 9,783,417 B2
(45) Date of Patent: Oct. 10, 2017

(54) SYSTEM FOR SYNGAS CLEAN-UP

(71) Applicant: ThermoChem Recovery International, Inc., Baltimore, MD (US)

(72) Inventors: Ravi Chandran, Ellicott City, MD (US); Daniel Michael Leo, Baltimore, MD (US); Shawn Robert Freitas, Corvallis, OR (US); Dave G. Newport, Cumberland, ME (US); Hamilton Sean Michael Whitney, Baltimore, MD (US); Daniel A. Burciaga, Manchester, MD (US)

(73) Assignee: ThermoChem Recovery International, Inc., Baltimore, MD (US)

( * ) Notice: Subject to any disclaimer, the term of this patent is extended or adjusted under 35 U.S.C. 154(b) by 168 days.

(21) Appl. No.: 14/939,040

(22) Filed: Nov. 12, 2015

(65) Prior Publication Data
US 2016/0060110 A1     Mar. 3, 2016

Related U.S. Application Data

(62) Division of application No. 14/347,431, filed as application No. PCT/US2012/057594 on Sep. 27, 2012, now Pat. No. 9,499,404.
(Continued)

(51) Int. Cl.
*C01B 3/52*     (2006.01)
*C01B 3/56*     (2006.01)
(Continued)

(52) U.S. Cl.
CPC ............ *C01B 3/52* (2013.01); *B01D 5/006* (2013.01); *B01D 5/0072* (2013.01);
(Continued)

(58) Field of Classification Search
CPC ..................................................... B01D 53/47
See application file for complete search history.

(56) References Cited

U.S. PATENT DOCUMENTS 2,680,665 A     6/1954  Atwell
4,069,024 A     1/1978  Fernandes
(Continued)

FOREIGN PATENT DOCUMENTS

CA     2820091 A1     2/2010
EP     2275513        1/2011
(Continued)

OTHER PUBLICATIONS

Hall et al., "Installation and Operation of Sorbathene Solvent Vapor Recovery Units to Recover and Recycle Volatile Organic Compounds at Operating Sites Within the Dow Chemical Company," Proceedings from the Sixteenth National Industrial Energy Technology Converence, Houston, TX (Apr. 13-14, 1994).
(Continued)

*Primary Examiner* — Paul Wartalowicz
(74) *Attorney, Agent, or Firm* — Womble Carlyle

(57) ABSTRACT

A system and method for processing unconditioned syngas first removes solids and semi-volatile organic compounds (SVOC), then removes volatile organic compounds (VOC), and then removes at least one sulfur containing compound from the syngas. Additional processing may be performed depending on such factors as the source of syngas being processed, the products, byproducts and intermediate products desired to be formed, captured or recycled and environmental considerations.

23 Claims, 41 Drawing Sheets

Related U.S. Application Data

(60) Provisional application No. 61/539,924, filed on Sep. 27, 2011.

(51) Int. Cl.
| | |
|---|---|
| *B01D 53/047* | (2006.01) |
| *B01D 53/12* | (2006.01) |
| *B01D 53/14* | (2006.01) |
| *B01D 53/18* | (2006.01) |
| *B01D 53/32* | (2006.01) |
| *C01B 3/24* | (2006.01) |
| *B01D 5/00* | (2006.01) |
| *B01D 47/10* | (2006.01) |
| *B01D 17/02* | (2006.01) |
| *B01D 29/27* | (2006.01) |
| *B01D 29/66* | (2006.01) |

(52) U.S. Cl.
 CPC ....... *B01D 5/0075* (2013.01); *B01D 17/0208* (2013.01); *B01D 29/27* (2013.01); *B01D 29/66* (2013.01); *B01D 47/10* (2013.01); *B01D 53/047* (2013.01); *B01D 53/12* (2013.01); *B01D 53/1406* (2013.01); *B01D 53/1462* (2013.01); *B01D 53/1487* (2013.01); *B01D 53/18* (2013.01); *B01D 53/326* (2013.01); *C01B 3/24* (2013.01); *C01B 3/56* (2013.01); *B01D 2252/103* (2013.01); *B01D 2252/504* (2013.01); *B01D 2257/708* (2013.01); *B01D 2259/402* (2013.01); *C01B 2203/0233* (2013.01); *C01B 2203/042* (2013.01); *C01B 2203/043* (2013.01); *C01B 2203/048* (2013.01); *C01B 2203/0415* (2013.01); *C01B 2203/0465* (2013.01); *C01B 2203/0475* (2013.01); *C01B 2203/0485* (2013.01); *Y02P 30/30* (2015.11)

(56) References Cited

U.S. PATENT DOCUMENTS

| | | | |
|---|---|---|---|
| 4,097,361 A | 6/1978 | Ashworth | |
| 4,105,545 A | 8/1978 | Muller et al. | |
| 4,219,402 A | 8/1980 | DeGeorge | |
| 4,300,916 A | 11/1981 | Frewer et al. | |
| 4,522,685 A | 6/1985 | Feldmann | |
| 4,688,521 A | 8/1987 | Korenberg | |
| 4,857,084 A | 8/1989 | Robbins et al. | |
| 5,439,491 A | 8/1995 | Kubiak et al. | |
| 5,624,470 A | 4/1997 | Tanca | |
| 5,635,147 A | 6/1997 | Herbert et al. | |
| 5,667,560 A | 9/1997 | Dunne | |
| 5,700,310 A | 12/1997 | Bowman et al. | |
| 5,752,994 A | 5/1998 | Monacelli et al. | |
| 5,853,548 A | 12/1998 | Piskorz et al. | |
| 6,149,765 A | 11/2000 | Mansour et al. | |
| 6,248,796 B1 | 6/2001 | Jackson et al. | |
| 6,753,353 B2 | 6/2004 | Jackson et al. | |
| 7,214,720 B2 | 5/2007 | Bayle et al. | |
| 7,220,390 B2 | 5/2007 | Tonkovich et al. | |
| 7,309,378 B2 | 12/2007 | Bancon et al. | |
| 7,572,362 B2 | 8/2009 | Freel et al. | |
| 7,879,919 B2 | 2/2011 | Ernst et al. | |
| 7,905,990 B2 | 3/2011 | Freel | |
| 8,007,688 B2 | 8/2011 | Dahlin et al. | |
| 8,084,656 B2 | 12/2011 | Feldmann | |
| 8,137,655 B2 | 3/2012 | Chornet et al. | |
| 8,168,686 B2 | 5/2012 | Blevins et al. | |
| 8,580,152 B2 | 11/2013 | Sutradhar et al. | |
| 8,585,789 B2 | 11/2013 | Sutradhar et al. | |
| 8,889,746 B2 | 11/2014 | Kresnyak | |
| 8,894,885 B2 | 11/2014 | Bell et al. | |
| 2002/0142172 A1 | 10/2002 | Brinker et al. | |
| 2006/0117952 A1 | 6/2006 | Bancon et al. | |
| 2008/0023338 A1 | 1/2008 | Stoots et al. | |
| 2008/0169449 A1 | 7/2008 | Mundschau | |
| 2008/0196308 A1 | 8/2008 | Hutton et al. | |
| 2008/0222956 A1 | 9/2008 | Tsangaris et al. | |
| 2008/0264254 A1 | 10/2008 | Song et al. | |
| 2008/0282892 A1 | 11/2008 | Deckman et al. | |
| 2008/0308769 A1 | 12/2008 | Marty et al. | |
| 2009/0084035 A1 | 4/2009 | Wei | |
| 2009/0229464 A1 | 9/2009 | Robertson | |
| 2009/0232729 A1 | 9/2009 | Genkin et al. | |
| 2010/0011955 A1 | 1/2010 | Hufton et al. | |
| 2010/0018115 A1 | 1/2010 | Wallace et al. | |
| 2010/0024300 A1 | 2/2010 | Chornet et al. | |
| 2010/0051857 A1 | 3/2010 | Takakusa et al. | |
| 2010/0051875 A1 | 3/2010 | Chornet et al. | |
| 2010/0096594 A1 | 4/2010 | Dahlin et al. | |
| 2010/0129691 A1 | 5/2010 | Dooher et al. | |
| 2010/0181539 A1 | 7/2010 | Apanel et al. | |
| 2010/0196227 A1 | 8/2010 | Venderbosch et al. | |
| 2010/0307335 A1 | 12/2010 | Hayward | |
| 2011/0031103 A1 | 2/2011 | Deckman et al. | |
| 2011/0218254 A1 | 9/2011 | Chakravarti | |
| 2011/0248218 A1 | 10/2011 | Sutradhar et al. | |
| 2011/0297885 A1 | 12/2011 | Boerrigter et al. | |
| 2014/0158940 A1 | 6/2014 | Navaee-Ardeh et al. | |
| 2015/0093664 A1 | 4/2015 | Berlowitz et al. | |

FOREIGN PATENT DOCUMENTS

| | | |
|---|---|---|
| GB | 1395953 A | 5/1975 |
| WO | WO 00/69994 | 11/2000 |
| WO | WO 03/013714 A1 | 2/2003 |
| WO | WO 2007/117590 A2 | 10/2007 |
| WO | WO 2010/096626 A1 | 8/2010 |

OTHER PUBLICATIONS

International Preliminary Report on Patentability dated Sep. 13, 2013 issued in PCT counterpart application (No. PCT/US12/57594).

International Search Report and Written Opinion dated Nov. 29, 2012 issued in PCT counterpart application (No. PCT/US12/57594).

Office action dated Feb. 27, 2015 issued in Chinese counterpart application (No. 201280058313.1) with English translation.

Extended search report issued in European counterpart application (No. 12837138.2).

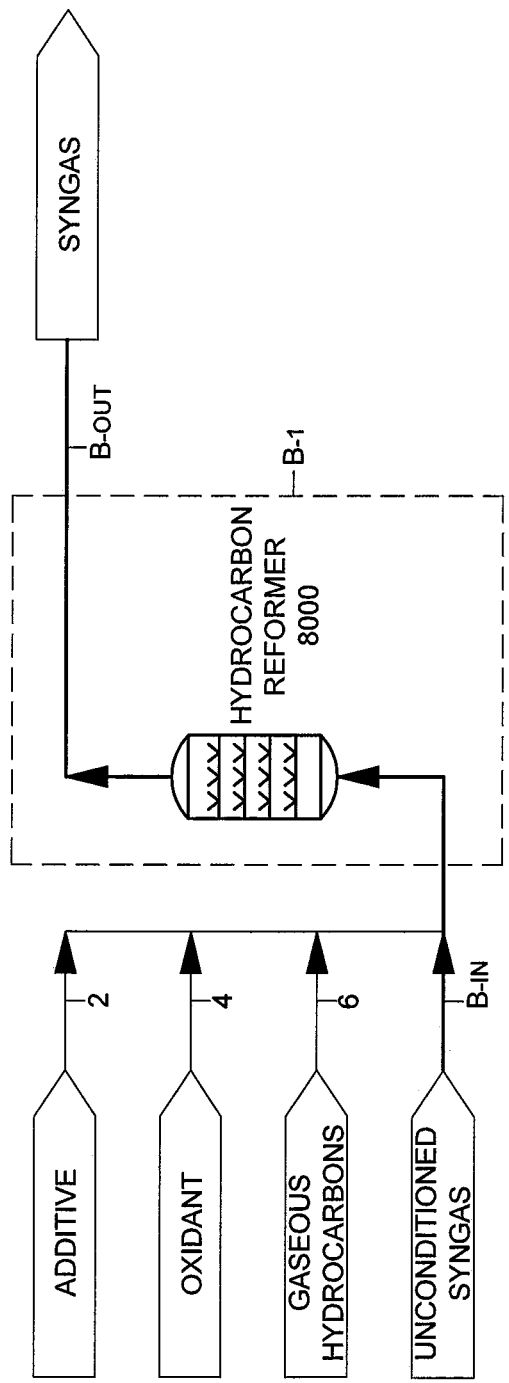

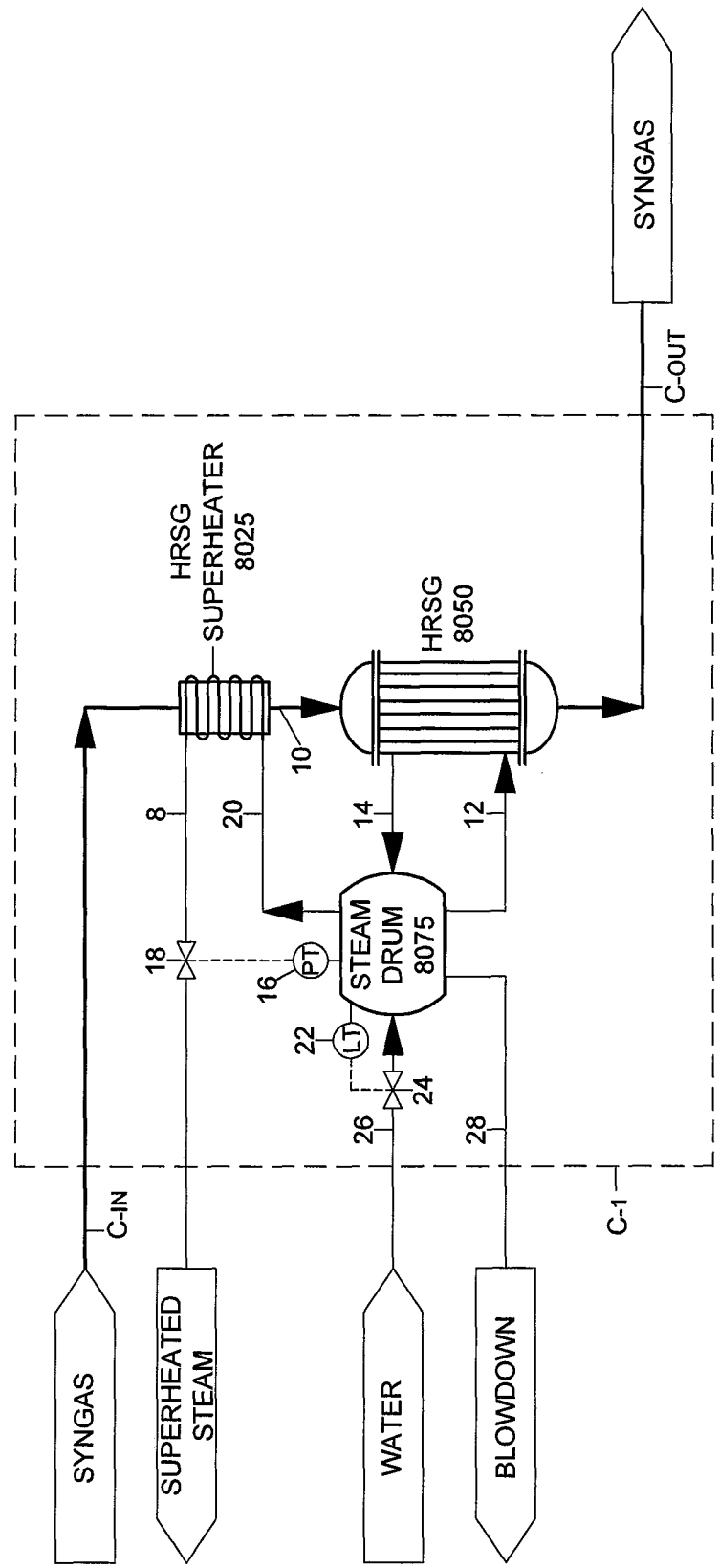

STEP D, OPTION 1, BLOCK PROCESS FLOW DRAWING

STEP D, SOLIDS REMOVAL & SVOC REMOVAL

STEP D, OPTION 1, CONTINUOUS SOLVENT FILTRATION & FILTRATE BACKFLUSH REGENERATION

FILTRATE BACKFLUSH REGENERATION OPERATION PROCEDURE

FIGURE 8

STEP D, OPTION 1, SEQUENCE STEP OPERATION PROCEDURE

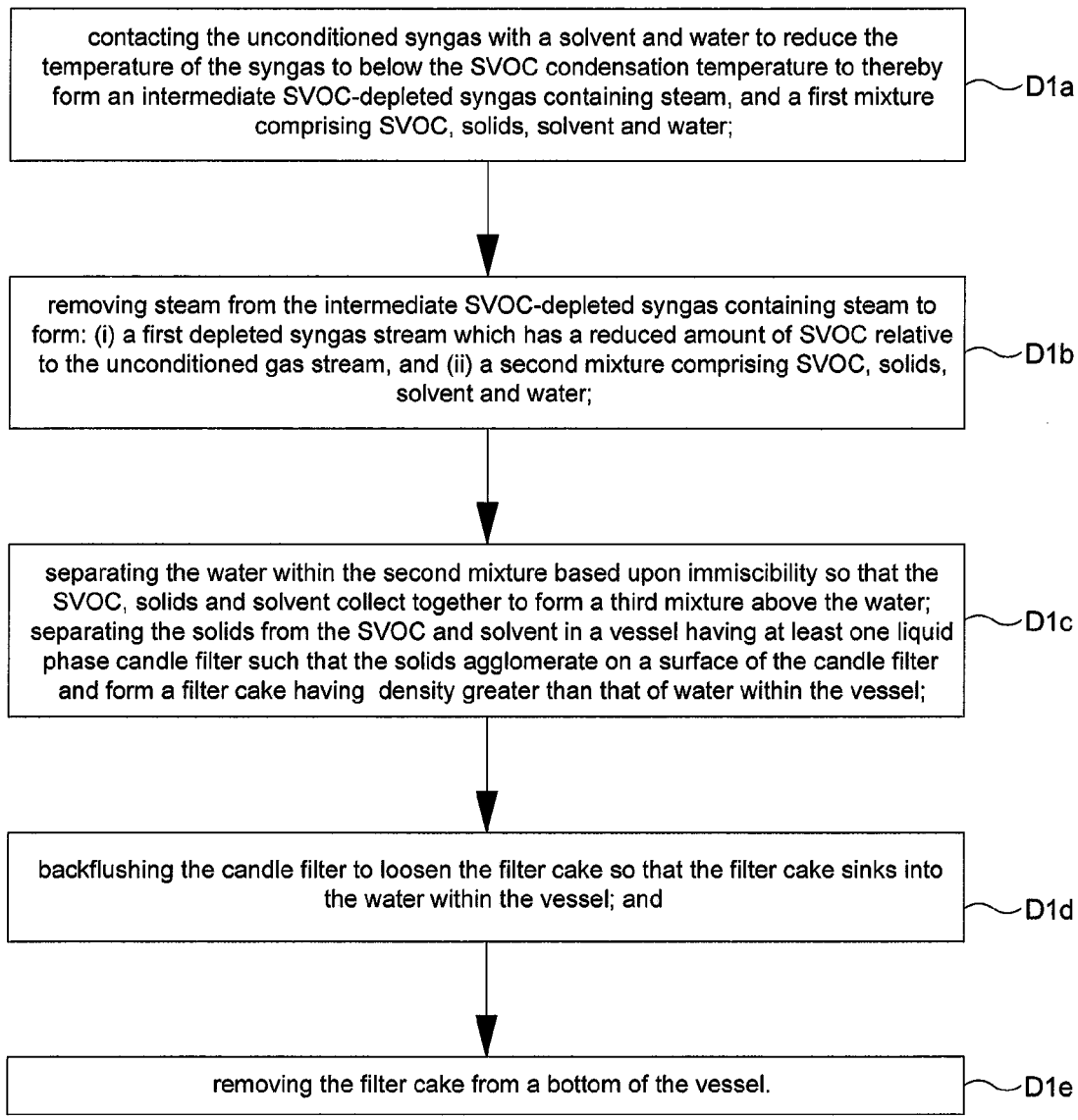

contacting the unconditioned syngas with a solvent and water to reduce the temperature of the syngas to below the SVOC condensation temperature to thereby form an intermediate SVOC-depleted syngas containing steam, and a first mixture comprising SVOC, solids, solvent and water; — D1a removing steam from the intermediate SVOC-depleted syngas containing steam to form: (i) a first depleted syngas stream which has a reduced amount of SVOC relative to the unconditioned gas stream, and (ii) a second mixture comprising SVOC, solids, solvent and water; — D1b separating the water within the second mixture based upon immiscibility so that the SVOC, solids and solvent collect together to form a third mixture above the water; separating the solids from the SVOC and solvent in a vessel having at least one liquid phase candle filter such that the solids agglomerate on a surface of the candle filter and form a filter cake having density greater than that of water within the vessel; — D1c backflushing the candle filter to loosen the filter cake so that the filter cake sinks into the water within the vessel; and — D1d removing the filter cake from a bottom of the vessel. — D1e

STEP D, OPTION 2,
BLOCK PROCESS
FLOW DRAWING

SVOC SEPARATION SYSTEM, OPTION 1, SVOC FLASH SEPARATION

STEP G, PARTICULATE POLISHING

STEP H, SYNGAS COMPRESSION

STEP I, VOC REMOVAL

STEP I, VOC SEPARATION SYSTEM, OPTION 1, TSA / PSA SYSTEM

STEP I, VOC SEPARATION SYSTEM, OPTION 2, FLUIDIZED BED ADSORBER SYSTEM

STEP K, AMMONIA REMOVAL

STEP M, HEAT ADDITION

STEP N, CARBONYL SULFIDE REMOVAL

STEP O, SULFUR POLISHING

STEP Q, R, & S, HEAT INTEGRATION & HYDROCARBON REFORMING OR CARBON DIOXIDE ELECTROLYSIS

FIGURE 28

TYPICAL COMPONENTS WITHIN UNCONDITIONED SYNGAS

| FORMULA | CHEMICAL NAME(S) | | UNITS | CONCENTRATION |
|---|---|---|---|---|
| CO | Carbon Monoxide | | Vol% dry | 5 - 35 |
| $H_2$ | Hydrogen | | Vol% dry | 20 - 60 |
| $CO_2$ | Carbon Dioxide | | Vol% dry | 15 - 35 |
| $CH_4$ | Methane | | Vol% dry | 1 - 15 |
| $C_2H_4$ | Ethylene | | Vol% dry | 0 - 4 |
| $C_2H_6$ | Ethane | | Vol% dry | 0 - 2 |
| $C_2H_2$ | Acetylene | | Vol% dry | 0 - 1 |
| $C_6H_6$ | Benzene | VOC / aromatics | ppmVdry | 500 to 10,000 |
| $C_7H_8$ | Toluene | | | |
| $C_6H_6O$ | Phenol | | | |
| $C_8H_8$ | Styrene | | | |
| $C_8H_{10}$ | (m-, o-, p-) xylene | | | |
| $C_7H_8O$ | (m-, o-, p-) cresol | | | |
| $C_9H_8$ | Indene | SVOC / polyaromatics | ppmVdry | 10 to 1,000 |
| $C_9H_{10}$ | Indan | | | |
| $C_{10}H_8$ | Napthalene | | | |
| $C_{11}H_{10}$ | (1-, 2-) methylnapthalene | | | |
| $C_{12}H_8$ | acenapthylene | | | |
| $C_{12}H_{10}$ | acenapthalene | | | |
| $C_{13}H_{10}$ | Florene | | | |
| $C_{14}H_{10}$ | Anthracene, phenanthrene | | | |
| $C_{15}H_{12}$ | (methyl-) anthracenes/phenanthrenes | | | |
| $C_{16}H_{10}$ | Pyrene/fluoranthene | | | |
| $C_{17}H_{12}$ | Methylpyrenes/benzofluorenes | | | |
| $C_{18}H_{12}$ | Chrysene, benz[a]anthracene, ... | | | |
| $C_{19}H_{14}$ | Methylchrysenes, methylbenz[a]anthracenes | | | |
| $C_{20}H_{12}$ | Perylene, benzo[a]pyrene, ... | | | |
| $C_{21}H_{14}$ | Dibenz[a,kl]anthracene, ... | | | |
| $C_{22}H_{14}$ | Dibenz[a,h]anthracene, ... | | | |
| $NH_3$ | Ammonia | | ppmVdry | 0 to 1,000 |
| HCl | Hydrogen Chloride | | ppmVdry | 0 to 1,000 |
| HCN | Hydrogen Cyanide | | ppmVdry | 0 to 50 |
| $H_2S$ | Hydrogen Sulfide | | ppmVdry | 0 to 1000 |
| COS | Carbonyl Sulfide | | ppmVdry | 0 to 15 |
| Hg, As, Pb, Cd | Trace metals (mercury, arsenic, lead, cadmium) | | ppmVdry | 0 to 30 |
| | Char (carbon & ash) | | WT % | 0 to 1 |

FIGURE 29

SEQUENCE STEP PARAMETER & CONTAMINANT REMOVAL EFFICIENCY

| SEQUENCE STEP & DESCRIPTION | INLET | OUTLET |
|---|---|---|
| Sequence Step B, Hydrocarbon Reforming [B] | Gaseous Hydrocarbons = 1 to 100 wt%<br>SVOC = 10 to 1,000 ppm<br>VOC = 500 to 10,000 ppm | Gaseous Hydrocarbons = 50 to 100% Conversion Efficiency<br>SVOC = 50 to 99% Conversion Efficiency<br>VOC = 50 to 99% Conversion Efficiency |
| Sequence Step C, Syngas Cooling [C] | 750 to 1500 deg F | 250 to 650 deg F |
| Sequence Step D, Solids Removal & SVOC Removal [D] | Solids = 0 to 1 wt%<br>SVOC = 1 to 500 ppm | Solids = 80 to 99% Capture Efficiency<br>SVOC = 95 to 99% Capture Efficiency |
| Sequence Step E, Chlorine Removal [E] | Hydrogen Chloride = 0 to 1000 ppm | Hydrogen Chloride = 80 to 99% Capture Efficiency |
| Sequence Step F, Sulfur Removal [F] | Hydrogen Sulfide = 0 to 1000 ppm | Hydrogen Sulfide = 80 to 99% Capture Efficiency |
| Sequence Step G, Particulate Filtration [G] | Solids = 0 to .1 wt% | Solids = 99 to 100% Capture Efficiency |
| Sequence Step H, Syngas Compression [H] | 15 to 50 psig | 100 to 2,000 psig |
| Sequence Step I, VOC Removal [I] | 1 to 500 ppm | 95 to 99% Capture Efficiency |
| Sequence Step J, Metal Removal [J] | 0 to 30 ppm | 0 to 10 ppb |
| Sequence Step K, Ammonia Removal [K] | 0 to 1,000 ppm | 80 to 99% Capture Efficiency |
| Sequence Step L, Ammonia Polishing [L] | 0 to 15 ppm | 0 to 10 ppb |
| Sequence Step M, Heat Addition [M] | 75 to 125 deg F | 350 to 450 deg F |
| Sequence Step N, Carbonyl Sulfide Removal [N] | 0 to 15 ppm | 0 to 30 ppb |
| Sequence Step O, Sulfur Polishing [O] | 0 to 15 ppm | 0 to 30 ppb |
| Sequence Step P, Carbon Dioxide Removal [P] | 10 to 40 vol% | 20 to 80 % Capture Efficiency |
| Sequence Step Q, Heat Addition [Q] | 350 to 450 deg F | 1,350 to 1,650 deg F |
| Sequence Step R, Steam Methane Reforming [R] | Gaseous Hydrocarbons = 1 to 100 wt%<br>SVOC = 0 to 1 ppm<br>VOC = 0 to 5 ppm | Gaseous Hydrocarbons = 50 to 100% Conversion Efficiency<br>SVOC = 50 to 99% Conversion Efficiency<br>VOC = 50 to 99% Conversion Efficiency |
| Sequence Step R, Carbon Dioxide Electrolysis [R] | Carbon Dioxide = 15 to 45 wt% | Carbon Dioxide = 50 to 100% Conversion Efficiency |
| Sequence Step S, Heat Removal [S] | 1,350 to 1,650 deg F | 350 to 450 deg F |

FIGURE 30a

| Embodiment # | \multicolumn{18}{c}{Combination} |
|---|---|---|---|---|---|---|---|---|---|---|---|---|---|---|---|---|---|---|
| | B | C | D | E | F | G | H | I | J | K | L | M | N | O | P | Q | R | S |
| 1001 |   | C | D |   | F |   | H | I |   | K |   | M | N | O | P | Q | R | S |
| 1002 |   | C | D |   | F | G | H | I |   | K |   | M | N | O | P | Q | R | S |
| 1003 |   | C | D | E | F | G | H | I | J | K | L | M | N | O | P | Q | R | S |
| 1004 | B | C | D |   | F | G | H | I |   | K |   | M | N | O | P |   |   |   |
| 1005 | B | C | D |   | F |   | H | I |   | K |   | M | N | O | P |   |   |   |
| 1006 | B | C | D | E | F | G | H | I | J | K | L | M | N | O | P |   |   |   |
| 1007 | B | C | D | E | F | G | H | I | J | K | L | M | N | O |   | Q | R | S |
| 1008 |   | C | D | E | F | G | H | I | J | K | L | M | N | O | P | Q | R | S |
| 1009 |   | C | D | E | F | G | H | I | J | K | L | M | N | O |   | Q | R | S |
| 1010 |   | C | D | E | F | G | H | I | J | K | L | M | N | O | P | Q | R | S |
| 1011 |   | C | D |   | F | G | H | I | J | K | L | M | N | O |   | Q | R | S |
| 1012 |   | C | D |   | F | G | H | I | J | K | L | M | N | O | P | Q | R | S |
| 1013 |   | C | D |   | F | G | H | I |   | K | L | M | N | O |   | Q | R | S |
| 1014 |   | C | D |   | F | G | H | I |   | K |   | M | N | O |   | Q | R | S |
| 1015 | B | C | D | E | F | G | H | I | J | K | L | M | N | O |   |   |   |   |
| 1016 |   | C | D | E | F | G | H | I | J | K | L | M | N | O |   |   |   |   |
| 1017 |   | C | D | E | F | G | H | I | J | K | L | M | N | O | P |   |   |   |
| 1018 |   | C | D |   | F | G | H | I | J | K | L | M | N | O |   |   |   |   |
| 1019 |   | C | D |   | F | G | H | I | J | K | L | M | N | O | P |   |   |   |
| 1020 |   | C | D |   | F | G | H | I |   | K | L | M | N | O |   |   |   |   |
| 1021 |   | C | D |   | F | G | H | I |   | K |   | M | N | O |   |   |   |   |
| 1022 | B | C | D |   | F | G | H | I | J | K | L | M | N | O |   |   |   |   |
| 1023 | B | C | D |   | F | G | H | I | J | K | L | M | N | O | P |   |   |   |
| 1024 | B | C | D |   | F | G | H | I |   | K | L | M | N | O |   |   |   |   |
| 1025 | B | C | D |   | F |   | H | I |   | K |   | M | N | O |   |   |   |   |
| 1026 | B | C | D |   | F | G | H | I |   | K |   | M | N | O |   |   |   |   |
| 1027 | B | C | D | E | F | G | H | I |   |   |   |   |   |   |   | Q | R | S |
| 1028 | B | C | D | E | F | G | H |   |   |   |   |   |   |   |   | Q | R | S |
| 1029 |   | C | D | E | F | G | H | I |   |   |   |   |   |   |   | Q | R | S |
| 1030 |   | C | D | E | F | G | H |   |   |   |   |   |   |   |   | Q | R | S |
| 1031 | B | C | D | E | F | G | H | I |   |   |   |   |   |   |   |   |   |   |
| 1032 | B | C | D | E | F | G | H |   |   |   |   |   |   |   |   |   |   |   |
| 1033 |   | C | D | E | F | G | H | I |   |   |   |   |   |   |   |   |   |   |
| 1034 |   | C | D | E | F | G | H |   |   |   |   |   |   |   |   |   |   |   |
| 1035 | B | C | D |   | F | G |   | I |   |   |   |   |   |   |   | Q | R | S |
| 1036 | B | C | D |   | F | G |   |   |   |   |   |   |   |   |   | Q | R | S |
| 1037 |   | C | D |   | F | G |   | I |   |   |   |   |   |   |   | Q | R | S |
| 1038 |   | C | D |   | F | G |   |   |   |   |   |   |   |   |   | Q | R | S |
| 1039 | B | C | D |   | F | G |   | I |   |   |   |   |   |   |   |   |   |   |
| 1040 | B | C | D |   | F | G |   |   |   |   |   |   |   |   |   |   |   |   |
| 1041 |   | C | D |   | F | G |   | I |   |   |   |   |   |   |   |   |   |   |
| 1042 |   | C | D |   | F | G |   |   |   |   |   |   |   |   |   |   |   |   |
| 1043 | B | C | D | E | F | G | H | I |   | K |   | M | N | O |   | Q | R | S |
| 1044 | B | C | D | E | F | G | H |   |   | K |   | M | N | O |   | Q | R | S |
| 1045 | B | C | D | E | F | G | H | I |   | K | L | M | N | O |   | Q | R | S |
| 1046 | B | C | D | E | F | G | H |   |   | K | L | M | N | O |   | Q | R | S |
| 1047 | B | C | D | E | F | G | H | I |   | K |   | M |   | O |   | Q | R | S |
| 1048 | B | C | D | E | F | G | H |   |   | K |   | M |   | O |   | Q | R | S |
| 1049 | B | C | D | E | F | G | H | I |   | K |   | M | N | O | P | Q | R | S |

FIGURE 30b

| Embodiment # | Combination | | | | | | | | | | | | | | | | | |
|---|---|---|---|---|---|---|---|---|---|---|---|---|---|---|---|---|---|---|
| 1050 | B | C | D | E | F | G | H |   | K |   | M | N | O | P | Q | R | S |   |
| 1051 | B | C | D | E | F | G | H | I | K | L | M | N | O | P | Q | R | S |   |
| 1052 | B | C | D | E | F | G | H |   | K | L | M | N | O | P | Q | R | S |   |
| 1053 | B | C | D | E | F | G | H | I | K |   | M |   | O | P | Q | R | S |   |
| 1054 | B | C | D | E | F | G | H |   | K |   | M |   | O | P | Q | R | S |   |
| 1055 | B | C | D | E | F | G | H | I | K |   | M | N | O |   | Q | R | S |   |
| 1056 | B | C | D | E | F | G | H |   | K |   | M | N | O |   | Q | R | S |   |
| 1057 | B | C | D | E | F | G | H | I | K | L | M | N | O |   | Q | R | S |   |
| 1058 | B | C | D | E | F | G | H |   | K | L | M | N | O |   | Q | R | S |   |
| 1059 | B | C | D | E | F | G | H | I | K |   | M |   | O |   | Q | R | S |   |
| 1060 | B | C | D | E | F | G | H |   | K |   | M |   | O |   | Q | R | S |   |
| 1061 | B | C | D | E | F | G | H | I | K |   | M | N | O |   |   |   |   |   |
| 1062 | B | C | D | E | F | G | H |   | K |   | M | N | O |   |   |   |   |   |
| 1063 | B | C | D | E | F | G | H | I | K | L | M | N | O |   |   |   |   |   |
| 1064 | B | C | D | E | F | G | H |   | K | L | M | N | O |   |   |   |   |   |
| 1065 | B | C | D | E | F | G | H | I | K |   | M |   | O |   |   |   |   |   |
| 1066 | B | C | D | E | F | G | H |   | K |   | M |   | O |   |   |   |   |   |
| 1067 | B | C | D | E | F | G | H | I | K |   | M | N | O | P |   |   |   |   |
| 1068 | B | C | D | E | F | G | H |   | K |   | M | N | O | P |   |   |   |   |
| 1069 | B | C | D | E | F | G | H | I | K | L | M | N | O | P |   |   |   |   |
| 1070 | B | C | D | E | F | G | H |   | K | L | M | N | O | P |   |   |   |   |
| 1071 | B | C | D | E | F | G | H | I | K |   | M |   | O | P |   |   |   |   |
| 1072 | B | C | D | E | F | G | H |   | K |   | M |   | O | P |   |   |   |   |
| 1073 | B | C | D | E | F | G | H | I | K |   | M | N | O |   |   |   |   |   |
| 1074 | B | C | D | E | F | G | H |   | K |   | M | N | O |   |   |   |   |   |
| 1075 | B | C | D | E | F | G | H | I | K | L | M | N | O |   |   |   |   |   |
| 1076 | B | C | D | E | F | G | H |   | K | L | M | N | O |   |   |   |   |   |
| 1077 | B | C | D | E | F | G | H | I | K |   | M |   | O |   |   |   |   |   |
| 1078 | B | C | D | E | F | G | H |   | K |   | M |   | O |   |   |   |   |   |
| 1079 |   | C | D | E | F | G | H | I | K |   | M | N | O |   | Q | R | S |   |
| 1080 |   | C | D | E | F | G | H |   | K |   | M | N | O |   | Q | R | S |   |
| 1081 |   | C | D | E | F | G | H | I | K | L | M | N | O |   | Q | R | S |   |
| 1082 |   | C | D | E | F | G | H |   | K | L | M | N | O |   | Q | R | S |   |
| 1083 |   | C | D | E | F | G | H | I | K |   | M |   | O |   | Q | R | S |   |
| 1084 |   | C | D | E | F | G | H |   | K |   | M |   | O |   | Q | R | S |   |
| 1085 |   | C | D | E | F | G | H |   |   |   |   |   |   |   | Q | R | S |   |
| 1086 |   | C | D | E | F | G | H |   |   |   |   |   |   |   | Q | R | S |   |
| 1087 |   | C | D | E | F | G | H |   | K |   |   |   |   |   | Q | R | S |   |
| 1088 | B | C | D |   | F | G | H | I | K |   | M | N | O |   | Q | R | S |   |
| 1089 | B | C | D |   | F | G | H |   | K |   | M | N | O |   | Q | R | S |   |
| 1090 | B | C | D |   | F | G | H | I | K | L | M | N | O |   | Q | R | S |   |
| 1091 | B | C | D |   | F | G | H |   | K | L | M | N | O |   | Q | R | S |   |
| 1092 | B | C | D |   | F | G | H | I | K |   | M |   | O |   | Q | R | S |   |
| 1093 | B | C | D |   | F | G | H |   | K |   | M |   | O |   | Q | R | S |   |
| 1094 | B | C | D |   | F | G | H | I | K |   | M | N | O | P | Q | R | S |   |
| 1095 | B | C | D |   | F | G | H |   | K |   | M | N | O | P | Q | R | S |   |
| 1096 | B | C | D |   | F | G | H | I | K | L | M | N | O | P | Q | R | S |   |
| 1097 | B | C | D |   | F | G | H |   | K | L | M | N | O | P | Q | R | S |   |
| 1098 | B | C | D |   | F | G | H | I | K |   | M |   | O | P | Q | R | S |   |
| 1099 | B | C | D |   | F | G | H |   | K |   | M |   | O | P | Q | R | S |   |

FIGURE 30c

| Embodiment # | Combination | | | | | | | | | | | | | | | | | |
|---|---|---|---|---|---|---|---|---|---|---|---|---|---|---|---|---|---|---|
| 1100 | B | C | D |   | F | G | H | I |   | K |   | M | N | O |   | Q | R | S |
| 1101 | B | C | D |   | F | G | H |   |   | K |   | M | N | O |   | Q | R | S |
| 1102 | B | C | D |   | F | G | H | I |   | K | L | M | N | O |   | Q | R | S |
| 1103 | B | C | D |   | F | G | H |   |   | K | L | M | N | O |   | Q | R | S |
| 1104 | B | C | D |   | F | G | H | I |   | K |   | M |   | O |   | Q | R | S |
| 1105 | B | C | D |   | F | G | H |   |   | K |   | M |   | O |   | Q | R | S |
| 1106 | B | C | D |   | F | G | H | I |   | K |   | M | N | O |   |   |   |   |
| 1107 | B | C | D |   | F | G | H |   |   | K |   | M | N | O |   |   |   |   |
| 1108 | B | C | D |   | F | G | H | I |   | K | L | M | N | O |   |   |   |   |
| 1109 | B | C | D |   | F | G | H |   |   | K | L | M | N | O |   |   |   |   |
| 1110 | B | C | D |   | F | G | H | I |   | K |   | M |   | O |   |   |   |   |
| 1111 | B | C | D |   | F | G | H |   |   | K |   | M |   | O |   |   |   |   |
| 1112 | B | C | D |   | F | G | H | I |   | K |   | M | N | O | P |   |   |   |
| 1113 | B | C | D |   | F | G | H |   |   | K |   | M | N | O | P |   |   |   |
| 1114 | B | C | D |   | F | G | H | I |   | K | L | M | N | O | P |   |   |   |
| 1115 | B | C | D |   | F | G | H |   |   | K | L | M | N | O | P |   |   |   |
| 1116 | B | C | D |   | F | G | H | I |   | K |   | M |   | O | P |   |   |   |
| 1117 | B | C | D |   | F | G | H |   |   | K |   | M |   | O | P |   |   |   |
| 1118 | B | C | D |   | F | G | H | I |   | K |   | M | N | O |   |   |   |   |
| 1119 | B | C | D |   | F | G | H |   |   | K |   | M | N | O |   |   |   |   |
| 1120 | B | C | D |   | F | G | H | I |   | K | L | M | N | O |   |   |   |   |
| 1121 | B | C | D |   | F | G | H |   |   | K | L | M | N | O |   |   |   |   |
| 1122 | B | C | D |   | F | G | H | I |   | K |   | M |   | O |   |   |   |   |
| 1123 | B | C | D |   | F | G | H |   |   | K |   | M |   | O |   |   |   |   |
| 1124 |   | C | D |   | F | G | H | I |   | K |   | M | N | O |   | Q | R | S |
| 1125 |   | C | D |   | F | G | H |   |   | K |   | M | N | O |   | Q | R | S |
| 1126 |   | C | D |   | F | G | H | I |   | K | L | M | N | O |   | Q | R | S |
| 1127 |   | C | D |   | F | G | H |   |   | K | L | M | N | O |   | Q | R | S |
| 1128 |   | C | D |   | F | G | H | I |   | K |   | M |   | O |   | Q | R | S |
| 1129 |   | C | D |   | F | G | H |   |   | K |   | M |   | O |   | Q | R | S |
| 1130 |   | C | D |   | F | G | H |   |   |   |   |   |   |   |   | Q | R | S |
| 1131 |   | C | D |   | F | G | H |   |   |   |   |   |   |   |   | Q | R | S |
| 1132 |   | C | D |   | F | G | H |   |   | K |   |   |   |   |   | Q | R | S |
| 1133 | B | C | D |   |   | G | H | I |   | K |   | M | N | O |   |   |   |   |
| 1134 | B | C | D |   |   | G | H |   |   | K |   | M | N | O |   |   |   |   |
| 1135 | B | C | D |   |   | G | H | I |   | K | L | M | N | O |   |   |   |   |
| 1136 | B | C | D |   |   | G | H |   |   | K | L | M | N | O |   |   |   |   |
| 1137 | B | C | D |   |   | G | H | I |   | K |   | M |   | O |   |   |   |   |
| 1138 | B | C | D |   |   | G | H |   |   | K |   | M |   | O |   |   |   |   |
| 1139 | B | C | D |   |   | G | H | I |   | K |   | M | N | O | P |   |   |   |
| 1140 | B | C | D |   |   | G | H |   |   | K |   | M | N | O | P |   |   |   |
| 1141 | B | C | D |   |   | G | H | I |   | K | L | M | N | O | P |   |   |   |
| 1142 | B | C | D |   |   | G | H |   |   | K | L | M | N | O | P |   |   |   |
| 1143 | B | C | D |   |   | G | H | I |   | K |   | M |   | O | P |   |   |   |
| 1144 | B | C | D |   |   | G | H |   |   | K |   | M |   | O | P |   |   |   |
| 1145 | B | C | D |   |   | G | H | I |   | K |   | M | N | O |   |   |   |   |
| 1146 | B | C | D |   |   | G | H |   |   | K |   | M | N | O |   |   |   |   |
| 1147 | B | C | D |   |   | G | H | I |   | K | L | M | N | O |   |   |   |   |
| 1148 | B | C | D |   |   | G | H |   |   | K | L | M | N | O |   |   |   |   |
| 1149 | B | C | D |   |   | G | H | I |   | K |   | M |   | O |   |   |   |   |

FIGURE 30d

| Embodiment # | | | | | | | | | | | | | | | | |
|---|---|---|---|---|---|---|---|---|---|---|---|---|---|---|---|---|
| | | | | | | | Combination | | | | | | | | | |
| 1150 | B | C | D | | | G | H | | K | | M | | O | | | |
| 1151 | | C | D | | | G | H | I | K | | M | N | O | | Q | R | S |
| 1152 | | C | D | | | G | H | | K | | M | N | O | | Q | R | S |
| 1153 | | C | D | | | G | H | I | K | L | M | N | O | | Q | R | S |
| 1154 | | C | D | | | G | H | | K | L | M | N | O | | Q | R | S |
| 1155 | | C | D | | | G | H | I | K | | M | | O | | Q | R | S |
| 1156 | | C | D | | | G | H | | K | | M | | O | | Q | R | S |
| 1157 | | C | D | | | G | H | | | | | | | | Q | R | S |
| 1158 | | C | D | | | G | H | | | | | | | | Q | R | S |
| 1159 | | C | D | | | G | H | | K | | | | | | Q | R | S |
| 1160 | B | C | D | E | | G | H | I | K | | M | N | O | | | | |
| 1161 | B | C | D | E | | G | H | | K | | M | N | O | | | | |
| 1162 | B | C | D | E | | G | H | I | K | L | M | N | O | | | | |
| 1163 | B | C | D | E | | G | H | | K | L | M | N | O | | | | |
| 1164 | B | C | D | E | | G | H | I | K | | M | | O | | | | |
| 1165 | B | C | D | E | | G | H | | K | | M | | O | | | | |
| 1166 | B | C | D | E | | G | H | I | K | | M | N | O | P | | | |
| 1167 | B | C | D | E | | G | H | | K | | M | N | O | P | | | |
| 1168 | B | C | D | E | | G | H | I | K | L | M | N | O | P | | | |
| 1169 | B | C | D | E | | G | H | | K | L | M | N | O | P | | | |
| 1170 | B | C | D | E | | G | H | I | K | | M | | O | P | | | |
| 1171 | B | C | D | E | | G | H | | K | | M | | O | P | | | |
| 1172 | B | C | D | E | | G | H | I | K | | M | N | O | | | | |
| 1173 | B | C | D | E | | G | H | | K | | M | N | O | | | | |
| 1174 | B | C | D | E | | G | H | I | K | L | M | N | O | | | | |
| 1175 | B | C | D | E | | G | H | | K | L | M | N | O | | | | |
| 1176 | B | C | D | E | | G | H | I | K | | M | | O | | | | |
| 1177 | B | C | D | E | | G | H | | K | | M | | O | | | | |
| 1178 | | C | D | E | | G | H | I | K | | M | N | O | | Q | R | S |
| 1179 | | C | D | E | | G | H | | K | | M | N | O | | Q | R | S |
| 1180 | | C | D | E | | G | H | I | K | L | M | N | O | | Q | R | S |
| 1181 | | C | D | E | | G | H | | K | L | M | N | O | | Q | R | S |
| 1182 | | C | D | E | | G | H | I | K | | M | | O | | Q | R | S |
| 1183 | | C | D | E | | G | H | | K | | M | | O | | Q | R | S |
| 1184 | | C | D | E | | G | H | | | | | | | | Q | R | S |
| 1185 | | C | D | E | | G | H | | | | | | | | Q | R | S |
| 1186 | | C | D | E | | G | H | | K | | | | | | Q | R | S |
| 1187 | B | C | D | E | F | G | | | | | | | | P | | | |
| 1188 | B | C | D | | F | G | | | | | | | | P | | | |
| 1189 | B | C | D | | | G | | | | | | | | P | | | |
| 1190 | B | C | D | E | | G | | | | | | | | P | | | |
| 1191 | B | C | D | E | F | G | | I | | | | | | P | | | |
| 1192 | B | C | D | | F | G | | I | | | | | | P | | | |
| 1193 | B | C | D | | | G | | I | | | | | | P | | | |
| 1194 | B | C | D | E | | G | | I | | | | | | P | | | |
| 1195 | B | C | D | E | F | G | | | | | | | | | | | |
| 1196 | B | C | D | | F | G | | | | | | | | | | | |
| 1197 | B | C | D | | | G | | | | | | | | | | | |
| 1198 | B | C | D | E | | G | | | | | | | | | | | |
| 1199 | B | C | D | E | F | G | | I | | | | | | | | | |

FIGURE 30e

| Embodiment # | Combination | | | | | | | | | | | | | | |
|---|---|---|---|---|---|---|---|---|---|---|---|---|---|---|---|
| 1200 | B | C | D |   | F | G |   | I |   |   |   |   |   |   |   |
| 1201 | B | C | D |   |   | G |   | I |   |   |   |   |   |   |   |
| 1202 | B | C | D | E |   | G |   | I |   |   |   |   |   |   |   |
| 1203 | B | C | D | E | F | G |   | I |   |   |   |   |   | Q | R | S |
| 1204 | B | C | D |   | F | G |   | I |   |   |   |   |   | Q | R | S |
| 1205 | B | C | D |   |   | G |   | I |   |   |   |   |   | Q | R | S |
| 1206 | B | C | D | E |   | G |   | I |   |   |   |   |   | Q | R | S |
| 1207 | B | C | D | E | F | G |   | I |   |   |   |   | P |   |   |
| 1208 | B | C | D |   | F | G |   | I |   |   |   |   | P |   |   |
| 1209 | B | C | D |   |   | G |   | I |   |   |   |   | P |   |   |
| 1210 | B | C | D | E |   | G |   | I |   |   |   |   | P |   |   |
| 1211 |   | C | D | E | F | G | H | I | K |   | M | N | O |   |   |
| 1212 |   | C | D | E | F | G | H |   | K |   | M | N | O |   |   |
| 1213 |   | C | D | E | F | G | H | I | K | L | M | N | O |   |   |
| 1214 |   | C | D | E | F | G | H |   | K | L | M | N | O |   |   |
| 1215 |   | C | D | E | F | G | H | I | K |   | M |   | O |   |   |
| 1216 |   | C | D | E | F | G | H |   | K |   | M |   | O |   |   |
| 1217 |   | C | D | E | F | G | H | I | K |   | M | N | O | P |   |
| 1218 |   | C | D | E | F | G | H |   | K |   | M | N | O | P |   |
| 1219 |   | C | D | E | F | G | H | I | K | L | M | N | O | P |   |
| 1220 |   | C | D | E | F | G | H |   | K | L | M | N | O | P |   |
| 1221 |   | C | D | E | F | G | H | I | K |   | M |   | O | P |   |
| 1222 |   | C | D | E | F | G | H |   | K |   | M |   | O | P |   |
| 1223 |   | C | D | E | F | G | H | I | K |   | M | N | O |   |   |
| 1224 |   | C | D | E | F | G | H |   | K |   | M | N | O |   |   |
| 1225 |   | C | D | E | F | G | H | I | K | L | M | N | O |   |   |
| 1226 |   | C | D | E | F | G | H |   | K | L | M | N | O |   |   |
| 1227 |   | C | D | E | F | G | H | I | K |   | M |   | O |   |   |
| 1228 |   | C | D | E | F | G | H |   | K |   | M |   | O |   |   |
| 1229 |   | C | D |   | F | G | H | I | K |   | M | N | O |   |   |
| 1230 |   | C | D |   | F | G | H |   | K |   | M | N | O |   |   |
| 1231 |   | C | D |   | F | G | H | I | K | L | M | N | O |   |   |
| 1232 |   | C | D |   | F | G | H |   | K | L | M | N | O |   |   |
| 1233 |   | C | D |   | F | G | H | I | K |   | M |   | O |   |   |
| 1234 |   | C | D |   | F | G | H |   | K |   | M |   | O |   |   |
| 1235 |   | C | D |   | F | G | H | I | K |   | M | N | O | P |   |
| 1236 |   | C | D |   | F | G | H |   | K |   | M | N | O | P |   |
| 1237 |   | C | D |   | F | G | H | I | K | L | M | N | O | P |   |
| 1238 |   | C | D |   | F | G | H |   | K | L | M | N | O | P |   |
| 1239 |   | C | D |   | F | G | H | I | K |   | M |   | O | P |   |
| 1240 |   | C | D |   | F | G | H |   | K |   | M |   | O | P |   |
| 1241 |   | C | D |   | F | G | H | I | K |   | M | N | O |   |   |
| 1242 |   | C | D |   | F | G | H |   | K |   | M | N | O |   |   |
| 1243 |   | C | D |   | F | G | H | I | K | L | M | N | O |   |   |
| 1244 |   | C | D |   | F | G | H |   | K | L | M | N | O |   |   |
| 1245 |   | C | D |   | F | G | H | I | K |   | M |   | O |   |   |
| 1246 |   | C | D |   | F | G | H |   | K |   | M |   | O |   |   |
| 1247 |   | C | D |   |   | G | H | I | K |   | M | N | O |   |   |
| 1248 |   | C | D |   |   | G | H |   | K |   | M | N | O |   |   |
| 1249 |   | C | D |   |   | G | H | I | K | L | M | N | O |   |   |

FIGURE 30f

| Embodiment # | | | | | | | Combination | | | | | | | | | |
|---|---|---|---|---|---|---|---|---|---|---|---|---|---|---|---|---|
| 1250 | | C | D | | | G | H | | K | L | M | N | O | | | |
| 1251 | | C | D | | | G | H | I | K | | M | | O | | | |
| 1252 | | C | D | | | G | H | | K | | M | | O | | | |
| 1253 | | C | D | | | G | H | I | K | | M | N | O | P | | |
| 1254 | | C | D | | | G | H | | K | | M | N | O | P | | |
| 1255 | | C | D | | | G | H | I | K | L | M | N | O | P | | |
| 1256 | | C | D | | | G | H | | K | L | M | N | O | P | | |
| 1257 | | C | D | | | G | H | I | K | | M | | O | P | | |
| 1258 | | C | D | | | G | H | | K | | M | | O | P | | |
| 1259 | | C | D | | | G | H | I | K | | M | N | O | | | |
| 1260 | | C | D | | | G | H | | K | | M | N | O | | | |
| 1261 | | C | D | | | G | H | I | K | L | M | N | O | | | |
| 1262 | | C | D | | | G | H | | K | L | M | N | O | | | |
| 1263 | | C | D | | | G | H | I | K | | M | | O | | | |
| 1264 | | C | D | | | G | H | | K | | M | | O | | | |
| 1265 | | C | D | E | | G | H | I | K | | M | N | O | | | |
| 1266 | | C | D | E | | G | H | | K | | M | N | O | | | |
| 1267 | | C | D | E | | G | H | I | K | L | M | N | O | | | |
| 1268 | | C | D | E | | G | H | | K | L | M | N | O | | | |
| 1269 | | C | D | E | | G | H | I | K | | M | | O | | | |
| 1270 | | C | D | E | | G | H | | K | | M | | O | | | |
| 1271 | | C | D | E | | G | H | I | K | | M | N | O | P | | |
| 1272 | | C | D | E | | G | H | | K | | M | N | O | P | | |
| 1273 | | C | D | E | | G | H | I | K | L | M | N | O | P | | |
| 1274 | | C | D | E | | G | H | | K | L | M | N | O | P | | |
| 1275 | | C | D | E | | G | H | I | K | | M | | O | P | | |
| 1276 | | C | D | E | | G | H | | K | | M | | O | P | | |
| 1277 | | C | D | E | | G | H | I | K | | M | N | O | | | |
| 1278 | | C | D | E | | G | H | | K | | M | N | O | | | |
| 1279 | | C | D | E | | G | H | I | K | L | M | N | O | | | |
| 1280 | | C | D | E | | G | H | | K | L | M | N | O | | | |
| 1281 | | C | D | E | | G | H | I | K | | M | | O | | | |
| 1282 | | C | D | E | | G | H | | K | | M | | O | | | |
| 1283 | | C | D | E | F | G | | | | | | | | | | |
| 1284 | | C | D | | F | G | | | | | | | | | | |
| 1285 | B | C | D | | | | | I | | | | | | P | Q | R | S |
| 1286 | B | | D | | | | | I | | | | | | P | Q | R | S |
| 1287 | B | | D | | | | | I | | | | | | P | | | |
| 1288 | B | | D | | | | | I | | | | | | | | | |
| 1289 | | | D | | | | | I | | | | | | | | | |
| 1290 | | | D | | | G | | I | | | | | | | | | |
| 1291 | | | D | | | G | | | | | | | | | | | |
| 1292 | | C | D | | | G | | | | | | | | | | | |
| 1293 | | C | D | E | | G | | | | | | | | | | | |
| 1294 | | C | D | E | F | G | H | I | | | | | | | | | |
| 1295 | | C | D | E | F | G | H | | | | | | | | | | |
| 1296 | | C | D | | F | G | H | I | | | | | | | | | |
| 1297 | | C | D | | F | G | H | | | | | | | | | | |
| 1298 | | C | D | | | G | H | I | | | | | | | | | |
| 1299 | | C | D | | | G | H | | | | | | | | | | |
| 1300 | | C | D | E | | G | H | I | | | | | | | | | |
| 1301 | | C | D | E | | G | H | | | | | | | | | | |
| 1302 | | C | D | E | F | | | I | | | | | | | | | |
| 1303 | | C | D | E | | G | | I | | | | | | | | | |
| 1304 | B | C | D | E | | G | | I | | | | | | | | | |
| 1305 | | C | D | | | G | | I | | | | | | | | | |
| 1306 | B | C | D | | | G | | I | | | | | | | | | |
| 1307 | B | C | D | | F | G | | | | | | | | | | | |
| 1308 | B | C | D | | | G | | I | | | | | | | | | |
| 1309 | B | C | D | | F | | | | | | | | | | | | |
| 1310 | B | C | D | | F | | | I | | | | | | | | | |
| 1311 | B | C | D | | | G | | | | | | | | | | | |

SYSTEM FOR SYNGAS CLEAN-UP

RELATED APPLICATIONS

This is a Divisional of U.S. patent application Ser. No. 14/347,431 filed Mar. 26, 2014, now U.S. Pat. No. 9,499,404, which is a 371 US National Phase of PCT/US2012/057594, filed Sep. 27, 2012, which, in turn, claims priority to U.S. Provisional Patent Application No. 61/539,924 filed Sep. 27, 2011. The contents of the aforementioned applications are incorporated by reference in their entirety.

FIELD OF THE INVENTION

The present invention is directed to the processing of syngas created from the processing of carbonaceous material.

BACKGROUND

A raw synthesis gas product, hereinafter called 'unconditioned syngas', is generated by the process of steam reforming, and may be characterized by a dirty mixture of gases and solids, comprised of carbon monoxide, hydrogen, carbon dioxide, methane, ethylene, ethane, acetylene, and a mixture of unreacted carbon and ash, commonly called 'char', as well as elutriated bed material particulates, and other trace contaminants, including but not limited to ammonia, hydrogen chloride, hydrogen cyanide, hydrogen sulfide, carbonyl sulfide, and trace metals. FIG. 28 presents a more complete list of components that may be found in unconditioned syngas.

Unconditioned syngas may also contain a variety of volatile organic compounds (VOC) or aromatics including benzene, toluene, phenol, styrene, xylene, and cresol, as well as semi-volatile organic compounds (SVOC) or polyaromatics, such as indene, indan, napthalene, methylnapthalene, acenapthylene, acenapthalene, anthracene, phenanthrene, (methyl-) anthracenes/phenanthrenes, pyrene/fluoranthene, methylpyrenes/benzofluorenes, chrysene, benz[a]anthracene, methylchrysenes, methylbenz[a]anthracenes, perylene, benzo[a]pyrene, dibenz[a,kl]anthracene, and dibenz[a,h]anthracene.

Syngas processing technology applications can generally be defined as industrial processing systems that accept a syngas source and produce or synthesize something from it. Normally, these can be categorized into systems that generate hydrogen, ethanol, mixed alcohols, methanol, dimethyl ether, chemicals or chemical intermediates (plastics, solvents, adhesives, fatty acids, acetic acid, carbon black, olefins, oxochemicals, ammonia, etc.), Fischer-Tropsch products (LPG, Naptha, Kerosene/diesel, lubricants, waxes), synthetic natural gas, or power (heat or electricity).

A plethora of syngas processing technologies exist, each converting syngas into something, and each possessing its own unique synthesis gas cleanliness requirement. For example, a Fischer-Tropsch (FT) catalytic synthesis processing technology requires more stringent cleanliness requirements when compared to a methanol synthesis application. This is because some FT cobalt catalysts are extremely sensitive to sulfur, resulting in deactivation, whereas sulfur does not pose a problem for some catalytic methanol applications. Therefore, a vast array of permutations or combinations of syngas clean-up operational sequence steps are possible to meet the economical and process intensive demands of synthesis gas conversion technologies.

SUMMARY OF THE INVENTION

In one aspect, the present invention is directed to a method of processing unconditioned syngas. The method comprises removing solids and semi-volatile organic compounds (SVOC) from the unconditioned syngas, then removing volatile organic compounds (VOC), and then removing at least one sulfur containing compound.

In another aspect, the present invention is directed to a system for processing unconditioned syngas. The system comprises means for removing solids and semi-volatile organic compounds (SVOC) from the unconditioned syngas, a compressor configured to receive and compress the resultant syngas stream, means for removing volatile organic compounds (VOC) from the compressed resultant syngas stream, and at least one bed configured to receive VOC-depleted syngas stream and remove at least one sulfur compound.

In yet another aspect, the present invention is directed to a method for removing solids and semi-volatile organic compounds (SVOC) from unconditioned syngas. The method includes (a) contacting the unconditioned syngas with a solvent and water to thereby form an intermediate SVOC-depleted syngas containing steam, and a first mixture comprising SVOC, solids, solvent and water; (b) removing steam from the intermediate SVOC-depleted syngas containing steam to form: (i) a first depleted syngas stream which has a reduced amount of SVOC relative to the unconditioned gas stream, and (ii) a second mixture comprising SVOC, solids, solvent and water; (c) separating the water within the second mixture based upon immiscibility so that the SVOC, solids and solvent collect together to form a third mixture above the water; (d) separating the solids from the SVOC and solvent in a vessel having at least one liquid phase candle filter such that the solids agglomerate on a surface of the candle filter and form a filter cake having density greater than that of water within the vessel; (e) backflushing the candle filter to loosen the filter cake so that the filter cake sinks into the water within the vessel; and (f) removing the filter cake from a bottom of the vessel.

In still another aspect, the present invention is directed to a system for removing solids and semi-volatile organic compounds (SVOC) from unconditioned syngas. The system includes: a venturi scrubber configured to receive the unconditioned syngas, solvent and water and output an intermediate SVOC-depleted syngas containing steam together with a first mixture comprising SVOC, solids, solvent and water; a char scrubber configured to receive the intermediate SVOC-depleted syngas containing steam and the first mixture, and separately output: (i) a first depleted syngas stream which has a reduced amount of SVOC relative to the unconditioned gas stream, and (ii) a second mixture comprising SVOC, solids, solvent and water; a decanter configured to receive the second mixture and separate the water within the second mixture based upon immiscibility so that the SVOC, solids and solvent collect together to form a third mixture above the water within the decanter, the decanter further configured to separately output the water and the third mixture; and a vessel arranged to receive the third mixture, the vessel having at least one liquid phase candle filter and a vessel bottom provided with a drain port; wherein: the candle filter is capable of operating so that: (i) the solids agglomerate on a surface of the candle filter and form a filter cake, and (ii) the SVOC and solvent are removed through the candle filter, and the drain port is suitable for removing filter cake therethrough.

The present invention is further directed to a system for processing unconditioned syngas which include the aforementioned system for removing solids and semi-volatile organic compounds (SVOC), in combination with various types of VOC-removal equipment and sulfur-removal equipment which operate under pressure.

These and other aspects of the present invention are described below in further detail.

DETAILED DESCRIPTION

Figure 1:
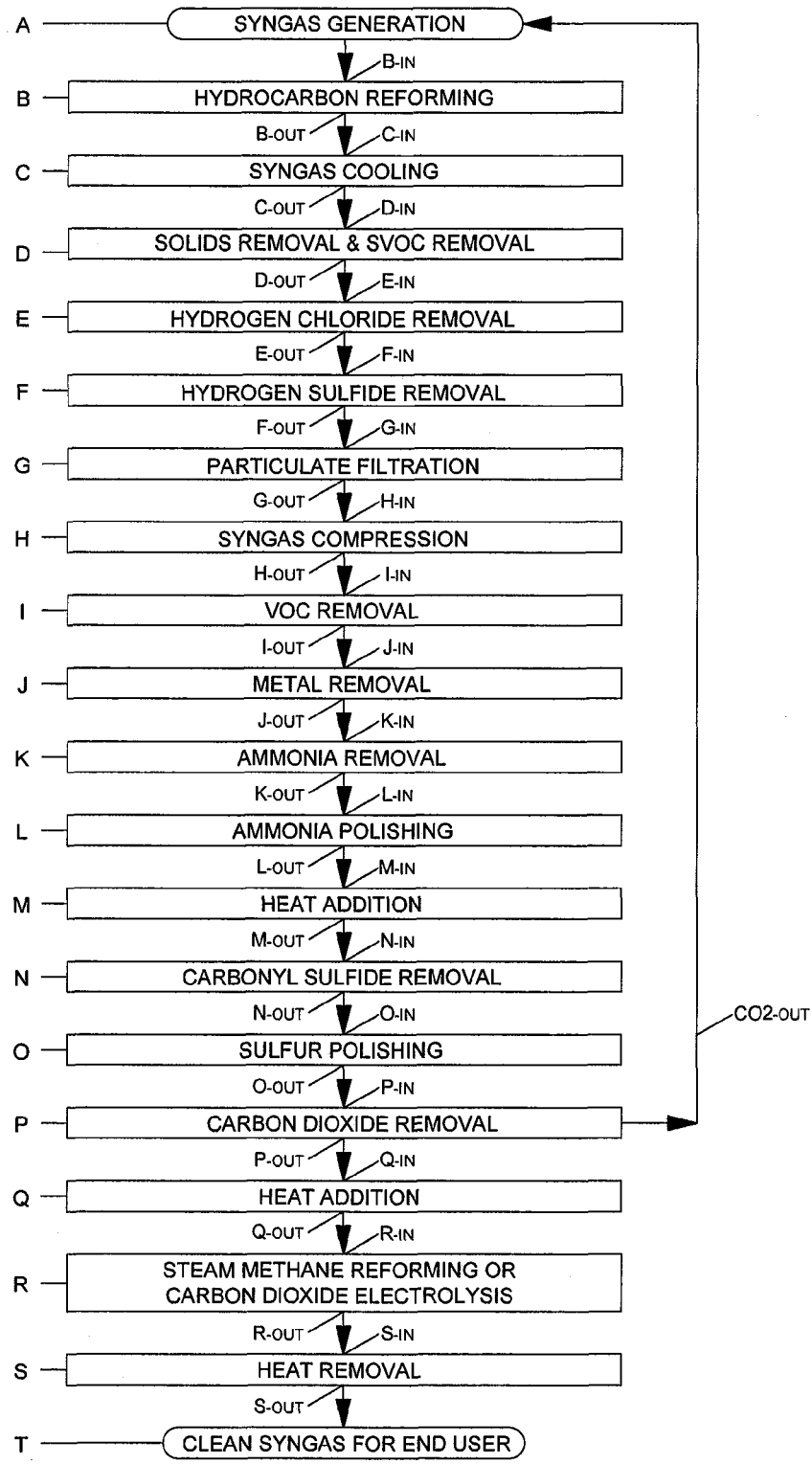
FIG. 1—Syngas Clean-Up Step Flow Diagram
FIG. 1A-1D—Syngas Clean-Up System
FIGS. 1E-1F—Abbreviated Syngas Clean Up System and Process
FIG. 2—Step B, Hydrocarbon Reforming Module
FIG. 3—Step C, Syngas Cooling Module
FIG. 4—Step D, Option 1, Block Process Flow Diagram for Solids & SVOC Removal
FIG. 5—Step D, Solids & SVOC Removal Module
FIG. 6—Step D, Option 1, Continuous Solvent Filtration & Filtrate Backflush Regeneration Module
FIG. 7—Filtrate Backflush Regeneration Operation Process Flow Diagram
FIG. 8—Step D, Option 1, Sequence Step Operation Flow Diagram
FIG. 9—Step D, Option 2, Block Process Flow Diagram for Solids & SVOC Removal
FIG. 10—Step D, Option 2, Sequence Step Operation Process Flow Diagram
FIG. 11—SVOC Separation System, Option 1, SVOC Flash Separation Module
FIG. 12—SVOC Separation System, Option 2, SVOC Sorptive Separation Module
FIG. 13—Step E, Chlorine Removal Module
FIG. 14—Step F, Sulfur Removal Module
FIG. 15—Step G, Particulate Filtration Module
FIG. 16—Step H, Syngas Compression Module
FIG. 17—Step I, VOC Removal Module
FIG. 18—Step I, VOC Separation System, Option 1, TSA/PSA System
FIG. 19—Step I, VOC Separation System, Option 2, Fluidized Bed Adsorber System
FIG. 20—Step J, Metal Removal Module
FIG. 21—Step K, Ammonia Removal Module
FIG. 22—Step L, Ammonia Polishing Module
FIG. 23—Step M, Heat Addition Module
FIG. 24—Step N, Carbonyl Sulfide Removal Module
FIG. 25—Step O, Sulfur Polishing Module
FIG. 26—Step P, Carbon Dioxide Removal Module
FIG. 27—Steps Q, R, & S Heat Integration & Hydrocarbon Reforming Module
FIG. 28—Typical Components within Unconditioned Syngas
FIG. 29—Sequence Step Parameter & Contaminant Removal Efficiency
FIGS. 30A-30F—List of Combinations of Steps Associated With Various Syngas Clean-Up Methods

FIG. 1 lists each syngas clean-up operational sequence step that may be included in an overall syngas cleaning process. As discussed below, not all steps need be performed in every implementation and so one or more of the steps may be optional.

The focus of the following text is to describe in detail the functionality, flexibility, and variability of each syngas clean-up process operational sequence step in communication with one another. It is further an object of the following text to elaborate upon the varying permutations of syngas clean-up process operational sequence steps to form an integrated syngas clean-up process.

Selection of a precise combination and/or permutation of steps and equipment may be important, as dictated by various criteria. Depending upon the process conditions involved, albeit be chemical and reactionary in nature, temperature, pressure, or presence or absence of a specific contaminate or component species, (such as water, for example) certain logical requirements and practical proprietary heuristics dictate where in the entire permutable sequence of unit operations a specific syngas clean-up operational sequence step may be placed.

A multitude of permutations of syngas operational sequence steps are possible to realize an overall integrated syngas clean-up process. Syngas contaminant tolerances, or cleanliness requirements of downstream syngas processing technologies, dictate how elaborate a given integrated syngas clean-up process must be.

The idea of a control volume is an extremely general concept used widely in the study and practice of chemical engineering. Control volumes may be used in applications that analyze physical systems by utilization of the laws of conservation of mass and energy. They may be employed during the analysis of input and output data of an arbitrary space, or region, usually being a chemical process, or a portion of a chemical process. They may be used to define process streams entering a single piece of chemical equipment that performs a certain task, or they may be used to define process streams entering a collection of equipment, and assets which work together to perform a certain task.

With respect to the surrounding text, a control volume is meaningful in terms of defining the boundaries of a particular syngas clean-up sequence step. With respect to the accompanied text, a sequence step may be defined as a member of an ordered list of events. These events may be arranged in a plethora of varying ways depending upon any number of requirements dictated by contaminant tolerances of any type of syngas processing technology. Each sequence step is assigned a name corresponding to the problem is solves.

The arrangements of equipment contained within each control volume are the preferred ways of accomplishing each sequence step. Furthermore, all preferred embodiments are non-limiting in that any number of combinations of unit operations, equipment and assets, including pumping, piping, and instrumentation, may be used as an alternate. However, it has been our realization that the preferred embodiments that make up each sequence step are those which work best to realize contaminant removal efficiencies as described in FIG. 29. Nonetheless, any types of unit operations or processes may be used within any control volume shown as long as it accomplishes the goal of that particular sequence step.

FIGS. 1A through 1D depict one embodiment of a system consistent with the steps shown in FIG. 1 to realize an overall integrated syngas clean-up process. The specific details of each control volume are elaborated upon in the accompanied text below.

Figure 1A:
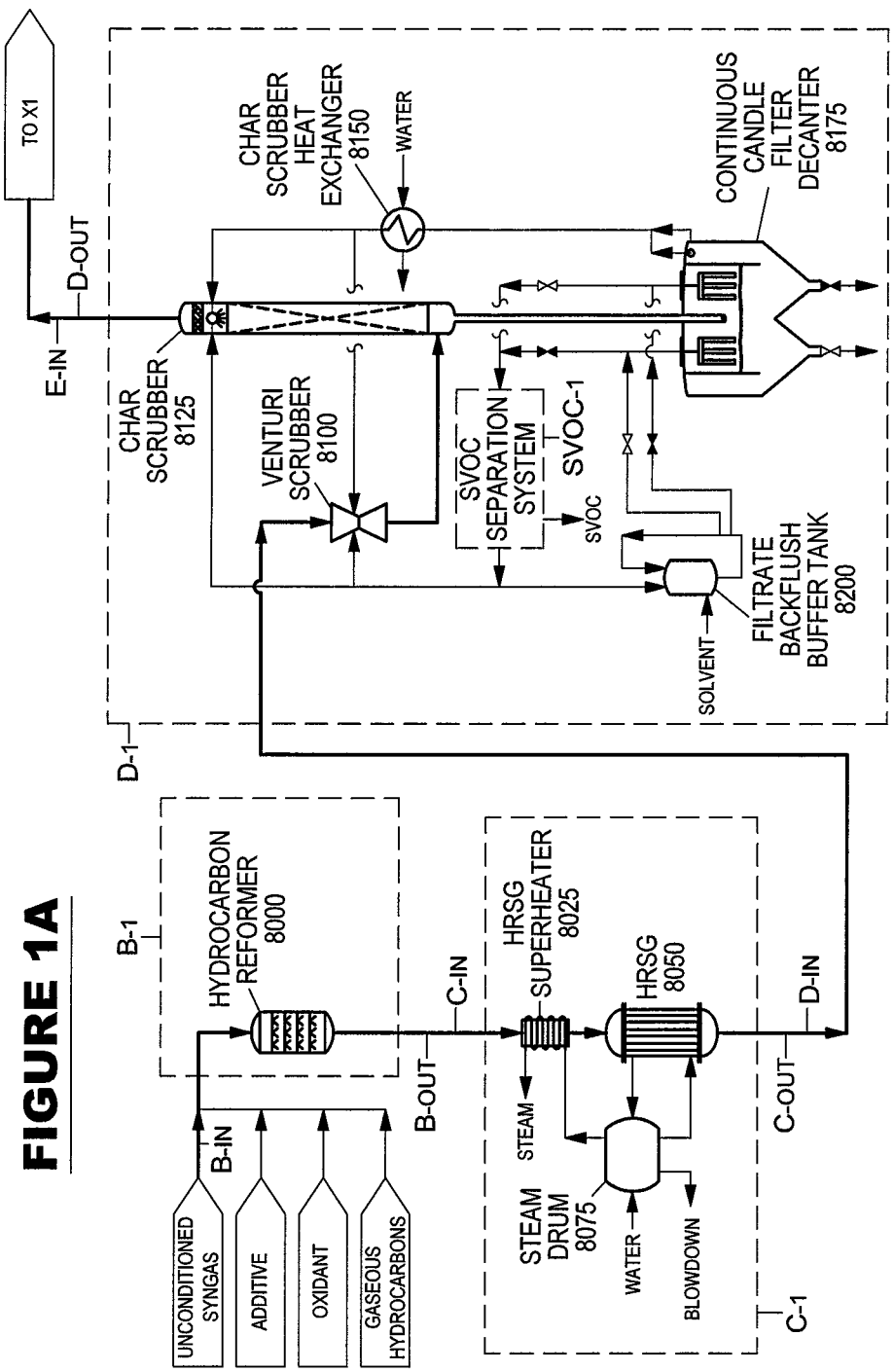

FIG. 1A illustrates a Hydrocarbon Reforming Control Volume [B-1] accepting an unconditioned syngas through a Sequence Step B Syngas Inlet [B-IN] and outputting a syngas of improved quality through a Sequence Step B Syngas Discharge [B-OUT]. Syngas quality improvement is defined below and is achieved through hydrocarbon reforming and/or cracking with the use of either partial oxidative, catalytic, or non-thermal non-catalytic systems or processes.

Syngas of improved quality is then routed to a Syngas Cooling Control Volume [C-1] through a Sequence Step C Syngas Inlet [C-IN] which reduces the temperature of the syngas prior to outputting the cooled syngas through a Sequence Step C Syngas Discharge [C-OUT]. Any number of processes and unit operations may be employed to cool the syngas within this control volume and the objective of this process step is to reduce the temperature of the syngas prior to the removal of solids and semi-volatile organic compounds (SVOC) within the following sequence step.

Solids and SVOC are next removed from the unconditioned syngas within a Solids Removal & SVOC Removal Control Volume [D-1]. A solids and SVOC laden Sequence Step D Syngas Inlet [D-IN] is provided to the control volume where the assets included therein remove solids and SVOC from the syngas to output a solids and SVOC-depleted Sequence Step D Syngas Discharge [D-OUT]. It is preferable to remove solids and SVOC utilizing the systems and methods as described below, however any type of systems and methods may be utilized within this control volume to accomplish the goal of the sequence step to remove solids and SVOC from syngas.

Figure 1B:
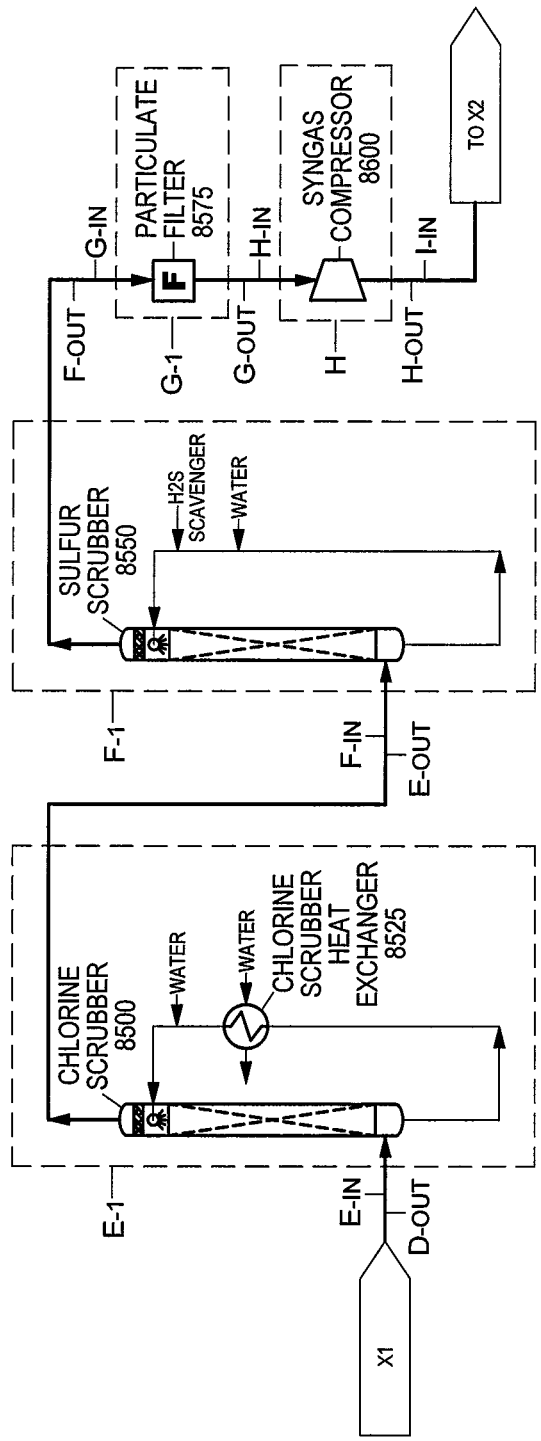

FIG. 1B illustrates the solids and SVOC-depleted Sequence Step D Syngas Discharge [D-OUT] being routed to a Chlorine Removal Control Volume [E-1] which accepts through a chlorine laden Sequence Step E Syngas Inlet [E-IN] and outputs a chlorine depleted Sequence Step E Syngas Discharge [E-OUT]. It is preferable that chlorine is scrubbed from the syngas with the use of water, however any type of scrubbing liquid may be used, and in addition, any type of chlorine removal process or system may be employed to accomplish the goal of the sequence step to remove chlorine from syngas.

Syngas depleted of chlorine is then routed to a Sulfur Removal Control Volume [F-1] which accepts as a sulfur laden Sequence Step F Syngas Inlet [F-IN], and outputs a sulfur-depleted Sequence Step F Syngas Discharge [F-OUT]. It is preferable that sulfur is scrubbed from the syngas with the use of a triazine hydrogen sulfide scavenger, however any type of scrubbing liquid may be used, and in addition, any type of sulfur removal process or system may be employed to accomplish the goal of the sequence step to remove sulfur from syngas.

Syngas depleted of sulfur is then routed to a Particulate Filtration Control Volume [G-1] which accepts as a particulate laden Sequence Step G Syngas Inlet [G-IN], and outputting a particulate depleted Sequence Step G Syngas Discharge [G-OUT]. It is desirable to have this sequence step in place immediately prior to the compression step so as to provide a final separation of any solids that may carry over, or become elutriated, during any intermittent operational upset within the upstream solids removal unit operations.

Syngas is then routed to a Syngas Compression [H] step wherein a Syngas Compressor accepts as a Sequence Step H Syngas Inlet [H-IN], and outputs a Sequence Step H Syngas Discharge [H-OUT]. The following described sequence steps and processes illustrated in FIGS. 1C through 1D primarily operate at a pressure higher than the preceding described sequence steps, relatively, since the compressor elevates the pressure of the syngas so that the outlet syngas is at a higher pressure in relation to the inlet syngas pressure.

Figure 1C:
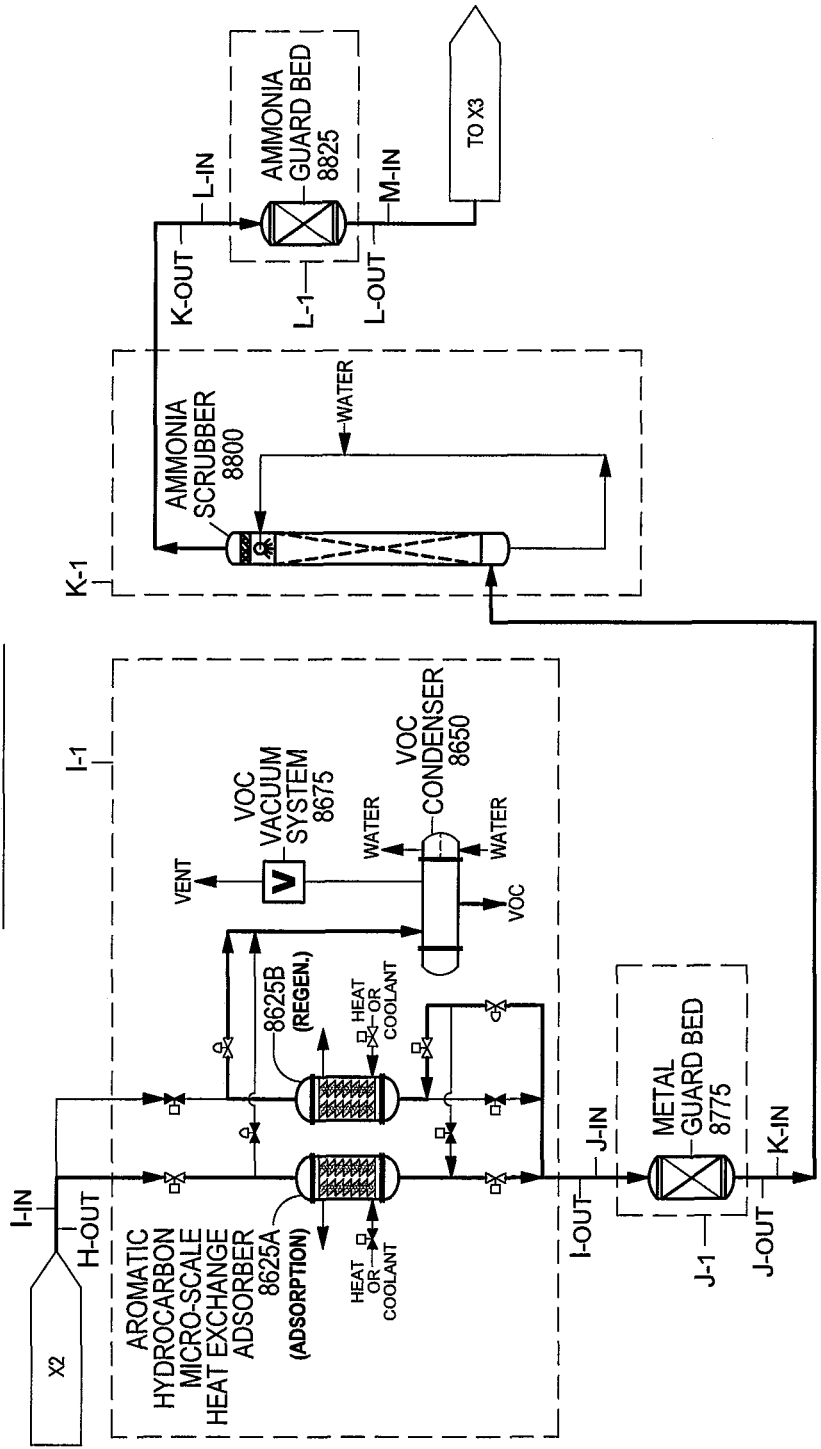

As seen in FIG. 1C, compressed syngas is then routed to a Volatile Organic Compounds (VOC) Removal Control Volume [I-1], which accepts as a VOC laden Sequence Step I Syngas Inlet [I-IN], and outputs a VOC-depleted Sequence Step I Syngas Discharge [I-OUT]. It is preferable that VOC is removed with the use of pressure swing and temperature swing adsorption and desorption methods and systems utilizing either microchannel heat exchangers, or pressure or temperature swing adsorption and desorption methods and systems utilizing fixed beds, or even utilizing fluidized bed systems and methods in which syngas fluidizes a sorbent material to remove VOC within the syngas, and in addition, any type of VOC removal process or system may be employed to accomplish the goal of the sequence step to remove VOC from syngas.

VOC-depleted syngas is the routed to a Metal Removal Control Volume [J-1] which accepts through a metal laden Sequence Step J Syngas Inlet [J-IN], and outputs a metal depleted Sequence Step J Syngas Discharge [J-OUT]. It is preferable that metals are adsorbed from the syngas with the use fixed bed systems and methods utilizing suitable adsorbent materials, however absorption may employed instead, and in addition, any type of metals removal process or system may be employed to accomplish the goal of the sequence step to remove metal from syngas.

Syngas depleted of metals is then routed to an Ammonia Removal Control Volume [K-1] which accepts as an ammonia laden Sequence Step K Syngas Inlet [K-IN], and outputs an ammonia-depleted Sequence Step K Syngas Discharge [K-OUT]. It is preferable that ammonia is scrubbed from the syngas with the use of water, however any type of scrubbing liquid may be used, and in addition any type of ammonia removal system may be employed to accomplish the goal of the sequence step to remove ammonia from syngas.

Syngas depleted of ammonia is then routed to an Ammonia Polishing Control Volume [L-1] which accepts as a Sequence Step L Syngas Inlet [L-IN], and outputs Sequence Step L Syngas Discharge [L-OUT]. It is preferable that ammonia is polished from the syngas using fixed bed adsorption systems and methods; however any type of ammonia polishing system may be employed to accomplish the goal of the sequence step to polish ammonia from syngas.

Figure 1D:
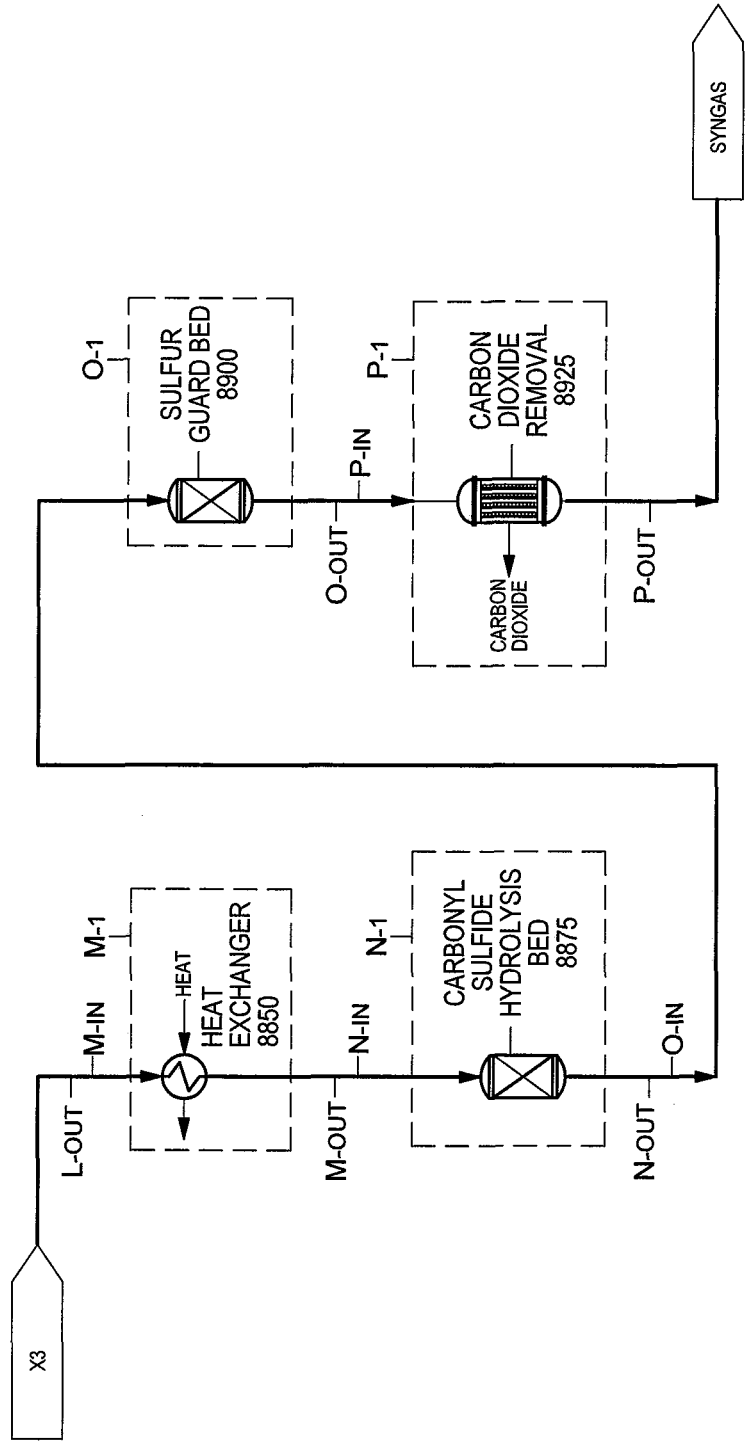

FIG. 1D displays a series of sequence steps to be performed to remove sulfur containing compounds. Syngas polished of ammonia is routed to a Heat Addition Control Volume [M-1], which accepts through a Sequence Step M Syngas Inlet [M-IN], and outputs a Sequence Step M Syngas Discharge [M-OUT]. The goal of this control volume is to elevate the temperature of the syngas prior to removal of sulfur containing compounds.

Syngas at an elevated temperature is then routed to a Carbonyl Sulfide Removal Control Volume [N-1] which accepts a carbonyl sulfide laden Sequence Step N Syngas Inlet [N-IN], and outputs a sulfur-depleted Sequence Step N Syngas Discharge [N-OUT]. It is preferred to accomplish the goals of this sequence step with the utilization of a packed bed of an alumina based material which allows for the hydrolysis of carbonyl sulfide into carbon dioxide and hydrogen sulfide, however any type of carbonyl sulfide removal system or method, such as adsorption or absorption type systems, may be employed to accomplish the goal of the sequence step to remove carbonyl sulfide from syngas.

Sulfur-depleted syngas is then routed to a final Sulfur Polishing Control Volume [O-1] which accepts as a Sequence Step O Syngas Inlet [O-IN], and outputs through a Sequence Step O Syngas Discharge [O-OUT]. It is preferable that sulfur is polished from the syngas using fixed bed adsorption systems and methods; however any type of sulfur polishing system may be employed to accomplish the goal of the sequence step to polish sulfur from syngas.

Sulfur-depleted syngas is then routed to a Carbon Dioxide Removal Control Volume [P-1], which accepts through a carbon dioxide laden Sequence Step P Syngas Inlet [P-IN], and outputting a carbon dioxide depleted Sequence Step P Syngas Discharge [P-OUT]. Membrane based processes are the preferred system utilized to remove carbon dioxide from syngas, however other alternate systems and methods may be utilized to accomplish the goals of this sequence step, not limited to adsorption or absorption based carbon dioxide removal systems and processes. In a further embodiment, carbon dioxide may be reduced within this sequence step by use of a carbon dioxide electrolyzer.

Figure 1E:
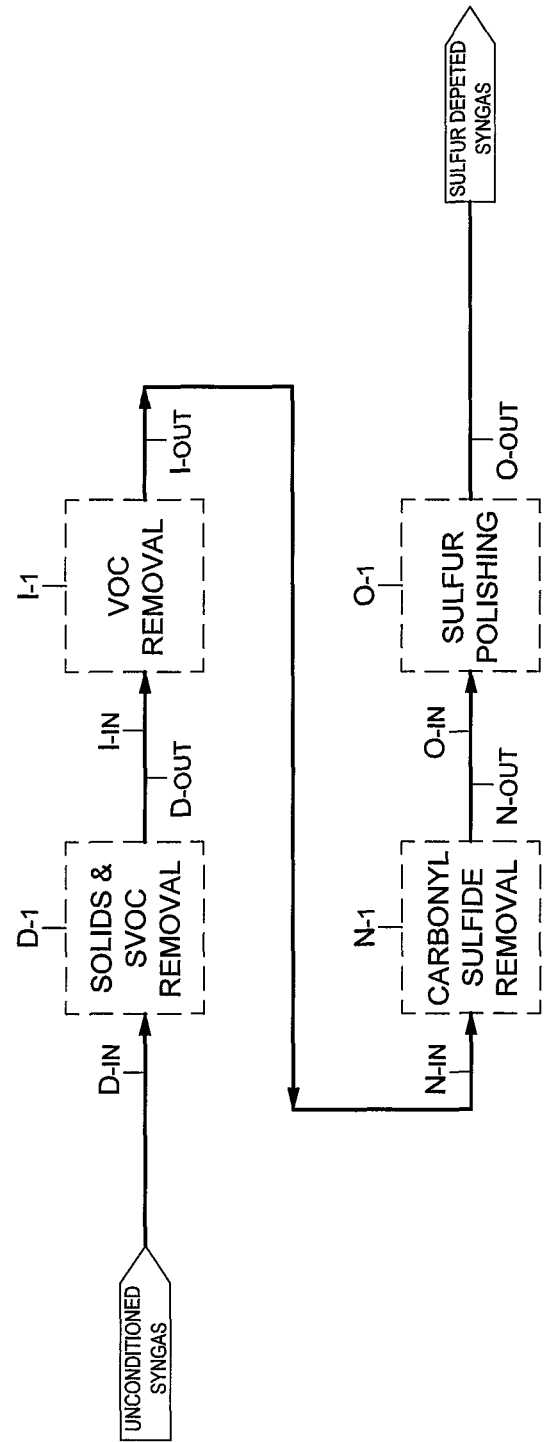

FIG. 1E represents a preferred embodiment where an unconditioned syngas is provided to a Solids Removal & SVOC Removal Control Volume [D-1] which accepts unconditioned syngas through a solids and SVOC laden Sequence Step D Syngas Inlet [D-IN] and removes solids and SVOC from the unconditioned syngas to form a first depleted syngas stream thereby discharging through a solids and SVOC-depleted Sequence Step D Syngas Discharge [D-OUT]. The first depleted syngas stream has a reduced amount of solids and SVOC relative to the unconditioned syngas.

The first depleted syngas stream is then routed to a Volatile Organic Compounds (VOC) Removal Control Volume [I-1], which accepts as a VOC laden Sequence Step I Syngas Inlet [I-IN], and removes volatile organic compounds (VOC) from the first depleted syngas stream to form a second depleted syngas stream which has a reduced amount of VOC relative to the first depleted syngas stream thereby outputting through a VOC-depleted Sequence Step I Syngas Discharge [I-OUT].

The second depleted syngas stream is then routed to a Carbonyl Sulfide Removal Control Volume [N-1] which accepts as a carbonyl sulfide laden Sequence Step N Syngas Inlet [N-IN], and removes at least one sulfur containing compound from the second depleted syngas stream to produce a sulfur-depleted syngas stream which has a reduced sulfur amount of sulfur relative to the second depleted syngas stream thereby outputting as a sulfur-depleted Sequence Step N Syngas Discharge [N-OUT].

The sulfur-depleted syngas stream is then routed to a final Sulfur Polishing Control Volume [O-1] which accepts as a Sequence Step O Syngas Inlet [O-IN], and provides an additional sulfur polishing step to reduce total sulfur content to less than 100 part-per billion thereby discharging through a Sequence Step O Syngas Discharge [O-OUT].

Figure 1F:
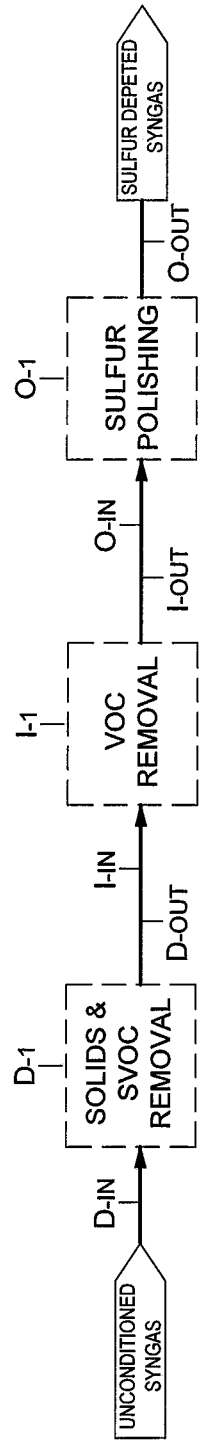

FIG. 1F represents a preferred embodiment where an unconditioned syngas is provided to a Solids Removal & SVOC Removal Control Volume [D-1] which accepts unconditioned syngas through a solids and SVOC laden Sequence Step D Syngas Inlet [D-IN] and removes solids and SVOC from the unconditioned syngas to form a first depleted syngas stream thereby discharging through a solids and SVOC-depleted Sequence Step D Syngas Discharge [D-OUT]. The first depleted syngas stream has a reduced amount of solids and SVOC relative to the unconditioned syngas.

The first depleted syngas stream is then routed to a Volatile Organic Compounds (VOC) Removal Control Volume [I-1], which accepts as a VOC laden Sequence Step I Syngas Inlet [I-IN], and removes volatile organic compounds (VOC) from the first depleted syngas stream to form a second depleted syngas stream which has a reduced amount of VOC relative to the first depleted syngas stream thereby outputting through a VOC-depleted Sequence Step I Syngas Discharge [I-OUT].

The second depleted syngas stream is then routed to a final Sulfur Polishing Control Volume [O-1] which accepts as a Sequence Step O Syngas Inlet [O-IN], and provides an additional sulfur polishing step to generate a sulfur-depleted syngas stream which has a reduced sulfur amount of sulfur relative to the second depleted syngas stream thereby discharging through a Sequence Step O Syngas Discharge [O-OUT].

Sequence Step B, Hydrocarbon Reforming [B]

FIG. 2 illustrates Sequence Step B, Hydrocarbon Reforming [B]. Hydrocarbon Reforming Control Volume [B-1] encapsulates the preferred arrangement of equipment and assets that work together to provide a method for improving syngas quality by reforming and/or cracking one or more undesirable syngas constituents into desirable syngas constituents.

As used herein the term "desirable syngas constituents" or "favorable syngas constituents" or variants thereof refer to hydrogen ($H_2$) and carbon monoxide (CO).

As used herein the term "undesirable syngas constituents" refer to any constituents present in syngas other than hydrogen ($H_2$) and carbon monoxide (CO), including, but not limited to, carbon dioxide ($CO_2$), hydrocarbons, VOC, SVOC, nitrogen containing compounds, sulfur containing compounds, as well as other impurities that are present in the feedstock that can form during thermochemical syngas generation processes.

As used herein the term "hydrocarbon" refers to organic compounds of hydrogen and carbon, CxHy. These may include, but not limited to methane ($CH_4$), ethane ($C_2H_6$), ethylene ($C_2H_4$), propane ($C_3H_8$), benzene ($C_6H_6$), etc. Hydrocarbons include VOC and SVOC.

As used herein "improved syngas quality" or variants thereof refer to a syngas where at least one undesirable syngas constituent is reformed and/or cracked into at least one desirable syngas constituent.

As used herein the term "cracking" or "cracked" or variations thereof mean that undesirable syngas constituents, including hydrocarbons, SVOC, and/or VOC, are reacted with a suitable catalyst and/or in a partial oxidative environment and/or in a non-thermal non-catalytic plasma environment, to provide chemical species comprised of decreased molecular weights. For example, raw syngas that may contain propane ($C_3H_8$), having a molecular weight of 44 lb/mol, may be cracked into compounds comprised of lesser molecular weights, for example, methane ($CH_4$) and ethylene ($C_2H_4$), both having lesser molecular weights than that of propane, being 16 lb/mol and 28 lb/mol, respectively.

As used herein the term "reforming" or "reformation" or variations thereof mean that undesirable syngas constituents, including hydrocarbons, SVOC, and/or VOC, are converted into desirable syngas constituents. For example, in the presence of an oxidant and a suitable catalyst and/or in a partial oxidative environment and/or in a non-thermal non-catalytic plasma environment, methane ($CH_4$) can be reformed into carbon monoxide (CO) and hydrogen ($H_2$).

Unconditioned syngas may be transferred from a Syngas Generation [A] system, preferably a biomass steam reforming system (not shown), and routed through Sequence Step B Syngas Inlet [B-IN] into a Hydrocarbon Reforming Control Volume [B-1], which produces a Sequence Step B Syngas Discharge [B-OUT].

This Hydrocarbon Reformer [8000] is preferably of a non-thermal, non-catalytic, cold plasma gliding-arc type, however, partial oxidation, and/or catalytic systems, or combinations thereof, may be employed to accomplish the sequence step objective of hydrocarbon reforming and/or cracking for syngas quality improvement. The Hydrocarbon Reformer generates a syngas or improved quality and depleted of VOC, SVOC, and other less desirable constituents, including, carbon dioxide, methane, ethylene, ethane, and acetylene, which may then be routed from the reformer through a Sequence Step B Syngas Discharge [B-OUT].

Additives [2], including solids possessing low ionization potential, not only including alkali metals, preferably sodium compounds or potassium compounds or mixtures thereof, may be provided to the Hydrocarbon Reformer. Utilization of these additives serves the purpose to increase the ionization energy in the cold plasma reaction zone within the Hydrocarbon Reformer, and thus aiding the decomposition of SVOC, and VOC, along with the less desirable syngas constituents, into favorable constituents including carbon monoxide and hydrogen. The presence of the additives within the Hydrocarbon Reformer favorably alters the electron density within the cold plasma arc reaction zone. This in turn enhances the thermochemical and electrochemical properties within the plasma reaction zone resultantly increasing the efficiency of the Hydrocarbon Reformer to reform and/or crack the VOC, SVOC, and other less desirable constituents into carbon monoxide and hydrogen.

An oxidant source [4], including, but not limited to, carbon dioxide, steam, air, or oxygen, may be made available to the Hydrocarbon Reformer to increase the reforming and/or cracking efficiency to promote production of carbon monoxide and hydrogen.

A gaseous hydrocarbon source [6] may be made available to the Hydrocarbon Reformer and may include, natural gas, syngas, refinery offgases, methanol, ethanol, petroleum, methane, ethane, propane, butane, hexane, benzene, toluene, xylene, or even waxes or low melting solids such as paraffin wax and naphthalene.

Sequence Step C, Syngas Cooling [C]

FIG. 3 illustrates Sequence Step C, Syngas Cooling [C], wherein Syngas Cooling Control Volume [C-1] accepts a Sequence Step C Syngas Inlet [C-IN] and outputs a Sequence Step C Syngas Discharge [C-OUT].

Syngas may be routed through a Sequence Step C Syngas Inlet [C-IN], to a Heat Recovery Steam Generator (HRSG) Superheater [8025], where heat is indirectly removed from the syngas. The HRSG Superheater is preferably a shell and tube type heat exchanger, with the hot syngas traveling through the tube-side indirectly contacting steam which is located on the shell-side. Heat is transferred from the syngas traveling on the equipment's tube-side to the saturated steam that flows through the heat exchanger shell-side, thus generating a source of superheated steam [8] discharged from the shell-side of the Heat Recovery Steam Generator (HRSG) Superheater.

Syngas is transferred from the HRSG Superheater to the Heat Recovery Steam Generator (HRSG) [8050] through HRSG transfer line [10] where the syngas is further cooled prior to being discharged from the HRSG through Sequence Step C Syngas Discharge [C-OUT]. The HRSG is preferably a shell and tube type heat exchanger, with the syngas on the tube-side and water on the shell-side. Water [12] is introduced to a HRSG lower shell-side inlet and used as the heat transfer fluid to remove thermal energy from the syngas. A steam and water mixture [14] is generated in the shell-side of the HRSG and transferred to the Steam Drum [8075]. The Steam Drum is operated under pressure control with a pressure transmitter [16] acting in communication with a pressure control valve [18] located on the HRSG Superheater shell-side superheated steam [8] discharge line. When pressure control valve [18] opens and releases pressure on automatic pressure control, to maintain a steady pressure in the Steam Drum, saturated steam is transferred to the HRSG Superheater through saturated steam transfer line [20], where steam indirectly contacts the syngas flowing through the HRSG Superheater. The Steam Drum is operated under level control where a level transmitter [22] located on the vessel acts in communication with a level control valve [24] located on a water supply line [26] to provide water to maintain sufficient level in the Steam Drum to allow recirculation of water through the shell-side of the HRSG. A continuous purge of water flows from the Steam Drum through a steam drum continuous blowdown line [28] to regulate the concentration of suspended and total dissolved solids within the volume of water contained within the Steam Drum.

Any type of heat exchange system may be used to achieve the syngas cooling functionality prescribed in Sequence Step C. One single heat exchanger may be used, or more than one may be used. Saturated steam may be generated, as opposed to superheated steam. A forced recirculation HRSG cooling water loop may be used as opposed to the disclosed natural thermosiphon configuration.

Sequence Step D, Solids Removal & SVOC Removal [D] Venturi Scrubber

Figure 4:
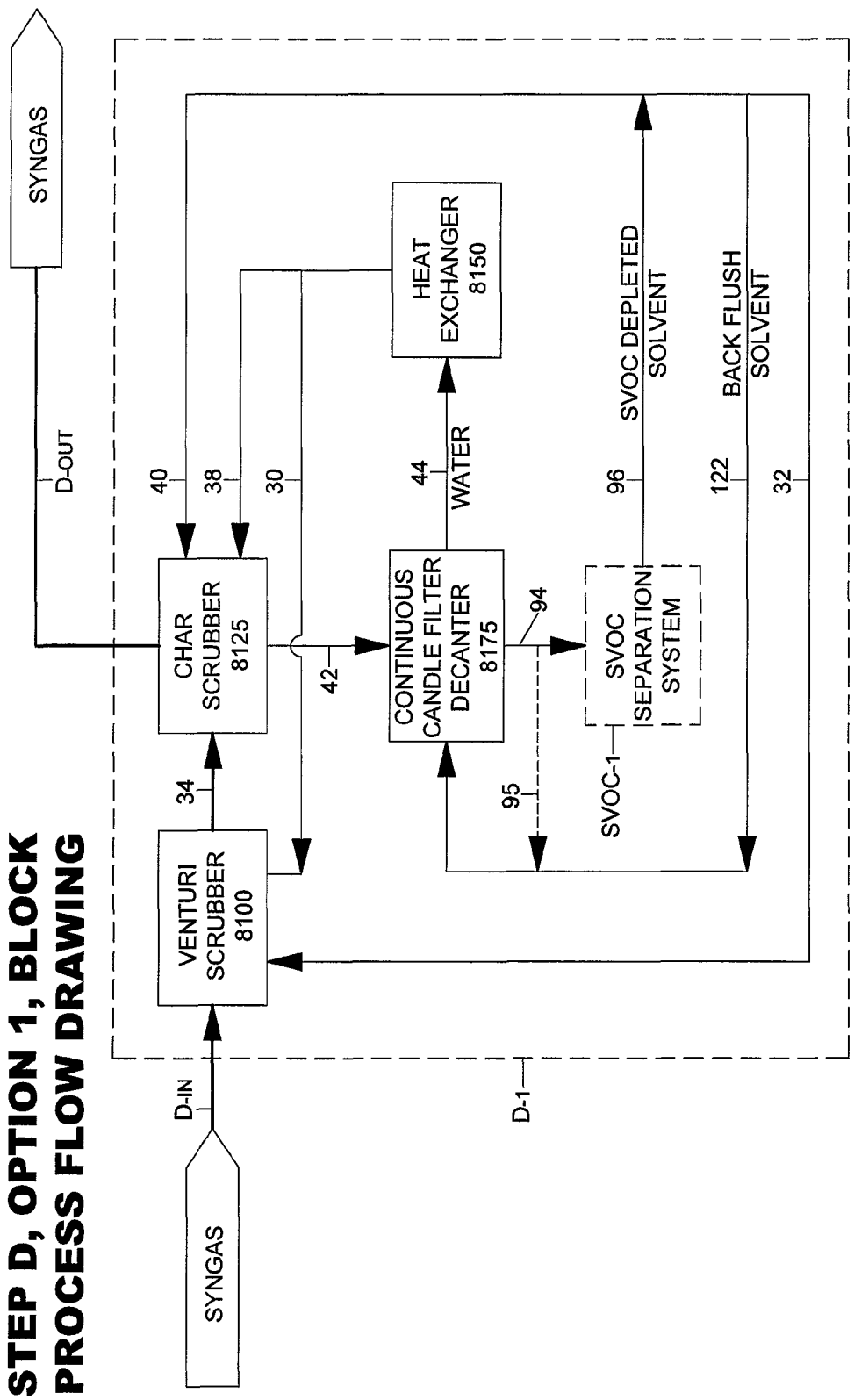

FIG. 4 illustrates Sequence Step D, Solids Removal & SVOC Removal [D], wherein Solids Removal & SVOC Removal Control Volume [D-1] accepts an unconditioned syngas through a Solids & SVOC laden Sequence Step D Syngas Inlet [D-IN], and outputs a first depleted syngas stream, which has a reduced amount of solids and SVOC relative to the unconditioned syngas, through a Solids & SVOC-depleted Sequence Step D Syngas Discharge [D-OUT].

Although any commercially available system capable of removing solids and SVOC from syngas may be employed, the specific combination and configuration of equipment and assets, and methods of operation, disclosed herein, indicate the preferred system to be utilized.

Figure 5:
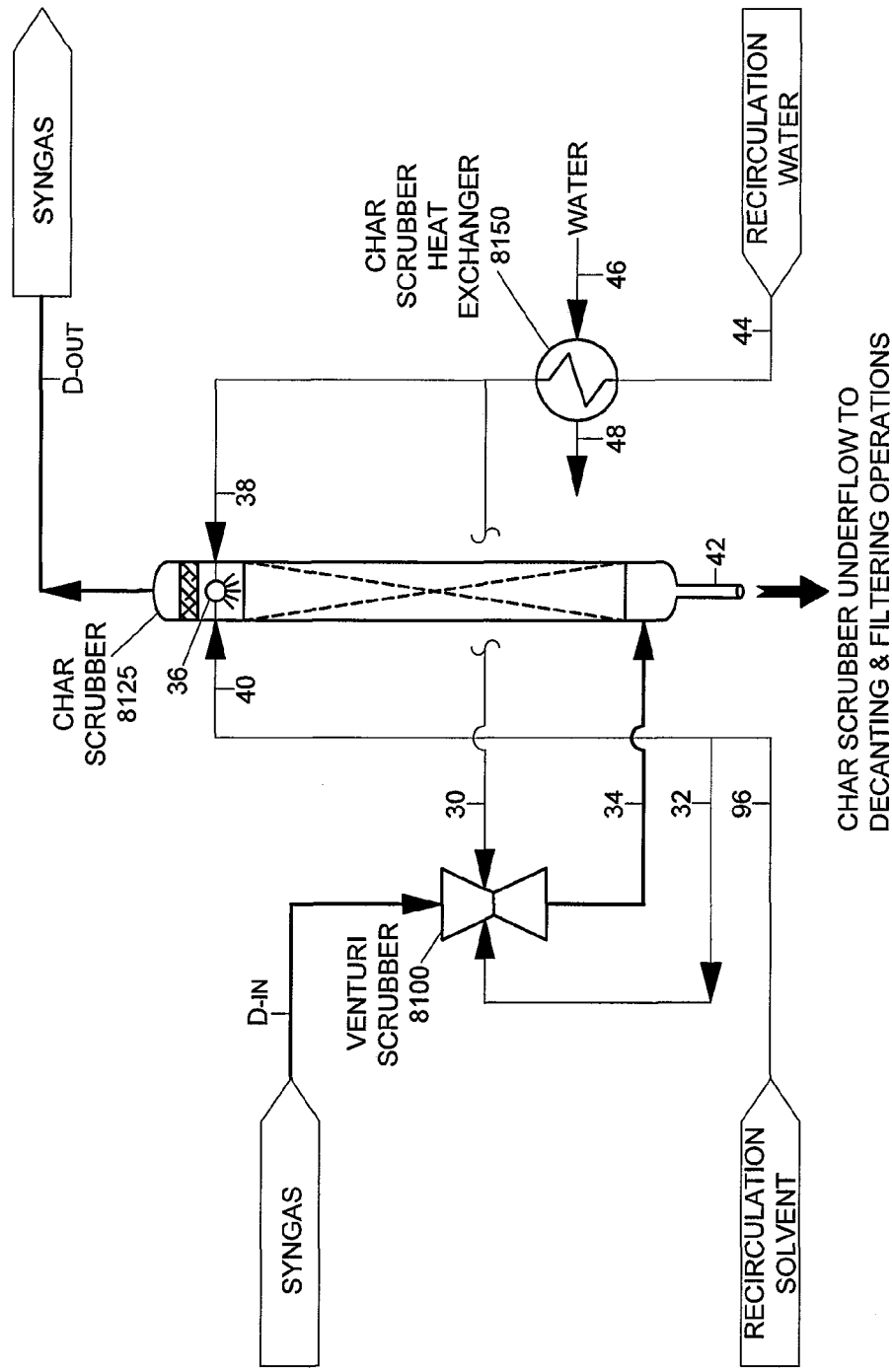
Figure 9:
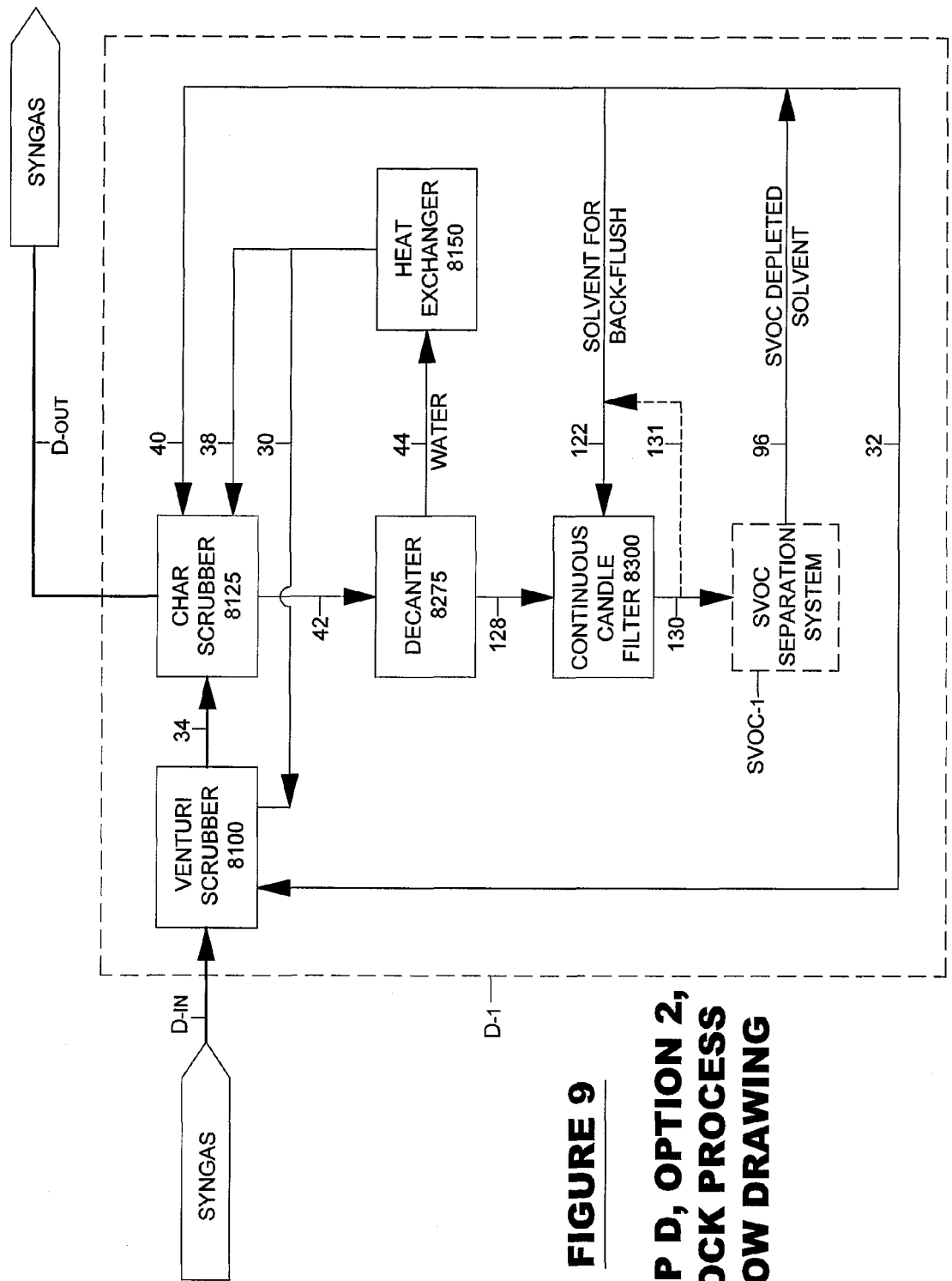

Two separate block process flow drawing configurations for Solids Removal & SVOC Removal Control Volume [D-1] are disclosed in the accompanying text. These are Option 1 and Option 2 as illustrated in FIG. 4, and FIG. 9, respectively. FIG. 5 together with FIG. 6 clarify details of preferred Option 1 of Sequence Step D.

Cooled unconditioned syngas is routed to a wetted throat Venturi Scrubber [8100] through Sequence Step D Syngas Inlet [D-IN]. The Venturi Scrubber operates at a temperature below the SVOC condensation temperature and below the dew-point of the excess steam contained within the syngas therefore condensing said SVOC and excess steam out into a liquid phase. Solid char particulates entrained within the syngas come into contact with water provided by a Venturi Scrubber recirculation water line [30], and solvent provided by a Venturi Scrubber recirculation solvent line [32], at the divergent section of the Venturi Scrubber and said particulates act as a nuclei for excess steam condensation and are displaced from the vapor phase and into the liquid phase.

Char Scrubber

An intermediate SVOC-depleted syngas containing steam together with a first mixture comprising SVOC, solids, solvent and water, is routed to the lower section of the Char Scrubber via a Venturi Scrubber to Char Scrubber transfer conduit [34]. The Char Scrubber serves as an entrainment separator for the Venturi Scrubber and is configured to receive the intermediate SVOC-depleted syngas containing steam and the first mixture, and separately output a first depleted syngas stream and a second mixture comprising SVOC, solids, solvent and water.

The Char Scrubber, is preferably a vertically oriented cylindrical, or rectangular, pressure vessel having a lower section, and an upper section, along with a central section that contains a quantity of packed media either comprising raschig rings, pall rings, berl saddles, intalox packing, metal structured grid packing, hollow spherical packing, high performance thermoplastic packing, structured packing, synthetic woven fabric, or ceramic packing, or the like, wherein media is supported upon a suitable support grid system commonplace to industrial chemical equipment systems. The upper section of the scrubber preferably contains a demister to enhance the removal of liquid droplets entrained in a vapor stream and to minimize carry-over losses of the sorption liquid. This demister is also positioned above the scrubber spray nozzle system [36], comprised of a plurality of spray nozzles, or spray balls, that introduce and substantially equally distribute the scrubbing absorption liquid to the scrubber onto the scrubber's central packing section so it may gravity-flow down through the scrubber central section.

As the syngas passes up through the internal packing of the Char Scrubber, excess steam within the syngas comes into intimate contact with water [38] and solvent [40], which are cooled prior to being introduced to the upper section of the Char Scrubber through the scrubber spray nozzle system. Steam is condensed into a liquid phase before being discharged from the Char Scrubber via the Char Scrubber underflow downcomer [42].

Intimate gas to liquid contact within the Char Scrubber allows for the solvent to both, absorb SVOC from the syngas, and enable carbon contained within the char, comprised of a carbon and ash mixture, to become oleophilic and hydrophobic permitting said carbon to become suspended within the solvent before both the solvent and carbon are discharged from the Char Scrubber through the Char Scrubber underflow downcomer [42].

A Char Scrubber Heat Exchanger [8150] is installed in the common water recirculation line [44], and is preferably of the shell and tube type heat exchanger, wherein syngas steam condensate transferred to scrubbing operations resides on the tube-side, and a cooling water supply [46], and a cooling water return [48], communicate with the shell-side of the heat exchanger to fulfill the heat transfer requirements necessary to indirectly remove heat from the tube-side steam condensate recirculation scrubbing liquid.

Solvent Selection Definition

Where the end syngas user is a FT synthesis reactor, the preferred scrubbing solvent is Medium Fraction Fischer-Tropsch Liquid (MFFTL) generated from the downstream FT catalytic synthesis process, however other Fischer-Tropsch products may be used. The ability to generate a valuable scrubbing solvent on-site provides a financial benefit due to operational self-sufficiency thus improving plant operating costs since the facility need not rely upon an outside vendor to furnish the sorption liquid.

Where the end syngas processing technology is a fuels, power, or chemicals production application, the preferred scrubbing solvent is a degreaser solvent, or a biodegradable, non-toxic, and environmentally safe, industrial cleaning solvent for biodiesel residue, such as BioSol TS 170™, marketed by Evergreen Solutions. Nonetheless, many types of hydrophilic solvents may be used, including, but not limited to, glycerol, rapeseed methyl ester, biodiesel, canola oil, vegetable oil, corn oil, castor oil, or soy oil, listed in decreasing preference.

Immiscibility Definition

It is to be understood that the water and solvent are immiscible in that they are incapable of being mixed to form a homogeneous liquid. The solvent phase is relatively less dense than the water phase allowing the solvent phase to float on top of the water phase. It is also to be understood that the solvent possesses a relatively greater affinity for the unreacted carbon particulate than the water. This is partly due to the solvent possessing an adhesive tension relative to the carbon solid particulate exceeding that of water. It is also to be understood that the carbon separates immediately and substantially completely from the water phase and floats on the surface as an unagglomerated fine solid particulate substance leaving a clear water phase below.

Continuous Candle Filter Decanter

A Continuous Candle Filter Decanter [8175] may be utilized to accept syngas excess steam condensate, solvent, and carbon and ash from the Char Scrubber underflow downcomer [42]. The Continuous Candle Filter Decanter is configured to receive the second mixture ash from the Char Scrubber underflow downcomer [42] and separate the water within the second mixture based upon immiscibility so that the SVOC, solids and solvent collect together to form a third mixture above the water within the decanter vessel, the decanter vessel further configured to separately output the water and the third mixture.

The Continuous Candle Filter Decanter is comprised of an upright tank [50], made up of two parts, a hollow cylindrical, or rectangular, central section [52] with a closed dome shaped top [54]. It has one or more conical lower sections [56a & 56b] each terminating at the bottom in a drain port with a suitable drain valve [58a & 58b] and a drain line [60a & 60b]. These drain lines may be connected to a separate commercially available Filter Cake Liquid Removal System [8225], preferably of a mechanical pressure filter-belt press, or any similar device that exerts a mechanical pressure on a liquid laden sludge like filter cake substance to separate liquid therefrom.

A vertical water underflow weir [62] extends downward from the dome shaped top of the upright tank and is spaced away from and cooperates with the upright vertical housing wall [64] of the hollow center section to provide an annular passageway [66] therebetween for passage of the syngas steam condensate water phase into a common water header [68] taken from various water take-off nozzles [70a & 70b], circumferentially positioned around the upper portion of the outer annular passageway. Water may be routed to the water recirculation pump [72] and transferred to the Char Scrubber and Venturi Scrubber. Water take-off nozzles may be positioned at various points about the upright vertical housing walls, or water may be pumped from various points located on closed dome shaped top. Only two water take-off nozzles are shown for simplicity, however many more are preferred, usually one take-off point for each candle filter bundle, wherein a commercial system may contain about 4 candle filter bundles.

The vertical water underflow weir is comprised of an upright annular wall that terminates at a height within the pressure vessel deep enough to provide an inner solvent chamber [74] intended to contain the solvent used for recirculation in the scrubbing system. The solvent chamber is positioned in between the Char Scrubber underflow downcomer [42] and the vertical underflow weir [62]. The solvent and water interface layer is contained within the inner solvent chamber [76], and therefore the solvent and water interface rag-layer [78] will also be restricted to the inner solvent chamber.

It is to be understood that the 'rag-layer' describes the region wherein the solvent and water interface resides, also the location where unagglomerated carbon may accumulate based on the fact that carbon is more dense than solvent, thus sinking to the bottom of the solvent phase, but being less dense than water, allowing it to float on top of the water phase, or at the water and solvent interface layer.

The Char Scrubber underflow downcomer extends from the lower section of the Char Scrubber and is disposed within the inner solvent chamber terminating at a height within the solvent chamber at a vertical elevation relatively higher than, and above, the vertical weir underflow height. It is preferential to operate the system so that the solvent and water interface rag-layer resides at the region in the solvent chamber where the downcomer terminates within the solvent chamber.

The inner solvent chamber, housed within the Continuous Candle Filter Decanter's cylindrical center section, may contain one or more filter bundles [80a & 80b] containing a plurality of vertically disposed candle filter elements [82]. Preferably the elements are of the type which possess a perforated metal support core covered with a replaceable filter cloth, or synonymously termed filter-sock, of woven Teflon cloth with approximate 5-micron pore openings. During filtration, the filter cloth forms a ridged-type structure around the perforated metal core of the filter element and, thus ensuring good adherence of the filter cake during the filtration phase. Filtrate solvent is conveyed through the full-length of each individual candle filter element to the filter bundle common register [84a & 84b] and to a filtrate removal conduit [86a & 86b]. Only two candle filter bundles are shown in the figure for simplicity. Each filter element is closed at the bottom and allows for only circumferential transference of liquid through the filter sock into the perforations in the metal filter element support core.

A filtrate process pump [88], located on the common filtrate suction header [90], sucks solvent from the inner solvent chamber, through each filter element [82], of each filter bundle [80a & 80b], through each filter bundle filtrate removal conduit [86a & 86b] and filtrate register valve [92a & 92b], and transfers it via [94] to an optional SVOC Separation System Control Volume [SVOC-1] where SVOC is removed and an SVOC-depleted solvent is transferred to the Venturi Scrubber and Char Scrubber common solvent recirculation line [96].

Pressure transmitters [98a & 98b] are installed on each filtrate removal conduit and may be used to monitor the differential pressure across each filter bundle in relation to the filter housing pressure provided by a similar pressure transmitter [100] located on the vertical housing. In-line flow indicating sight glasses [102a & 102b] are installed on each filtrate removal conduit so that a plant operator may visually see the clarity of the filtrate to determine if any candle filter sock element has been ruptured and needs repair.

Backflush System

Filtrate Backflush Buffer Tank [8200] accepts SVOC-depleted filtrate solvent from the SVOC-depleted solvent transfer line [104], discharged from the SVOC Separation System. The tank is positioned in communication with the SVOC-depleted solvent transfer line [104] and preferably is installed in a vertical orientation relative to it so that solvent may flow via gravity into the tank. The Filtrate Backflush Buffer Tank is equipped with a level transmitter [106] that acts in communication with an solvent supply level control valve [108] located on a solvent supply line [110] which transfers fresh solvent to the system, either to the Filtrate Backflush Buffer Tank or to the Char Scrubber underflow downcomer (not shown).

The solvent backflush pump [112] accepts SVOC-depleted filtrate solvent from the Filtrate Backflush Buffer Tank through filtrate transfer conduit [114] and recirculates the solvent back to the Filtrate Backflush Buffer Tank through backflush tank recirculation line [116]. A restriction orifice [118], or similar pressure letdown device, such as an iris-type adjustable orifice valve, is located in-line to create a high pressure recirculation reservoir within the backflush tank recirculation line [116], and its connected piping network, to accommodate backflushing of the candle filter bundles.

Candle Filter Operation Philosophy

The best mode of operation for realizing a continuous filtrate stream encompasses operating the filtration system in a manner which allows for periodic backflushing of the filter element cloth surface in-situ by reversing the flow of liquid scrubbing solvent filtrate through the filter elements. The backwashing dislodges any accumulated filter cake allowing it to sink to the bottom of the conical section of the filter housing for removal of the system as a thick, paste-like, filter cake substance. Experimental results have consistently and repeatedly shown that regeneration of the filter elements to realize sustainable and continuous operation of the filter coincides with utilizing SVOC-depleted filtrate solvent as the backflush filter liquid. However the system will function as intended while utilizing alternate mediums to cleanse filter element surfaces, such as SVOC laden filtrate solvent, syngas steam condensate, or a vapor source, such as inert nitrogen or carbon dioxide.

It is preferred to utilize differential pressure across a filter bundle as the main variable to determine when to undergo a back flushing cycle, as opposed to using manual predetermined periodic time duration intervals, or using the reduction in flow through the filter bundles as the variable dictating when to commence filter back flushing, (synonymously termed 'filter cleaning', or 'filter backwashing', 'in-situ filter cleaning', or 'filter surface in-situ regeneration'). This is because experimental results have shown that a filter bundle differential pressure between 6 and 10 PSI is commensurate with preferable cake thickness of 20 to 35 millimeters. In contrast, using manual predetermined periodic time duration intervals as the sole mechanism to determine when to commence filter cleaning, often results in operational impairment, in that 'cake bridging' more readily occurs. 'Cake bridging' is well known in the art of filtration. It may be described as a large mass of agglomerated suspended solids filling the spaces between the filter elements and thus posing a challenge to regenerate in-situ, frequently requiring process interruption for physical cleaning and removal of the heavy, gelatinous filter cake.

In-situ filter cleaning may be accomplished by reversing the flow of liquid through the filter element thereby dislodging filter cake from the cloth surface thus allowing it to sink to the bottom of the water phase within the lower filter chamber conical section. This affords operations the luxury of minimizing losses of valuable solvent while draining the filter cake from the system.

Candle Filter Operating Procedure

Figure 7:
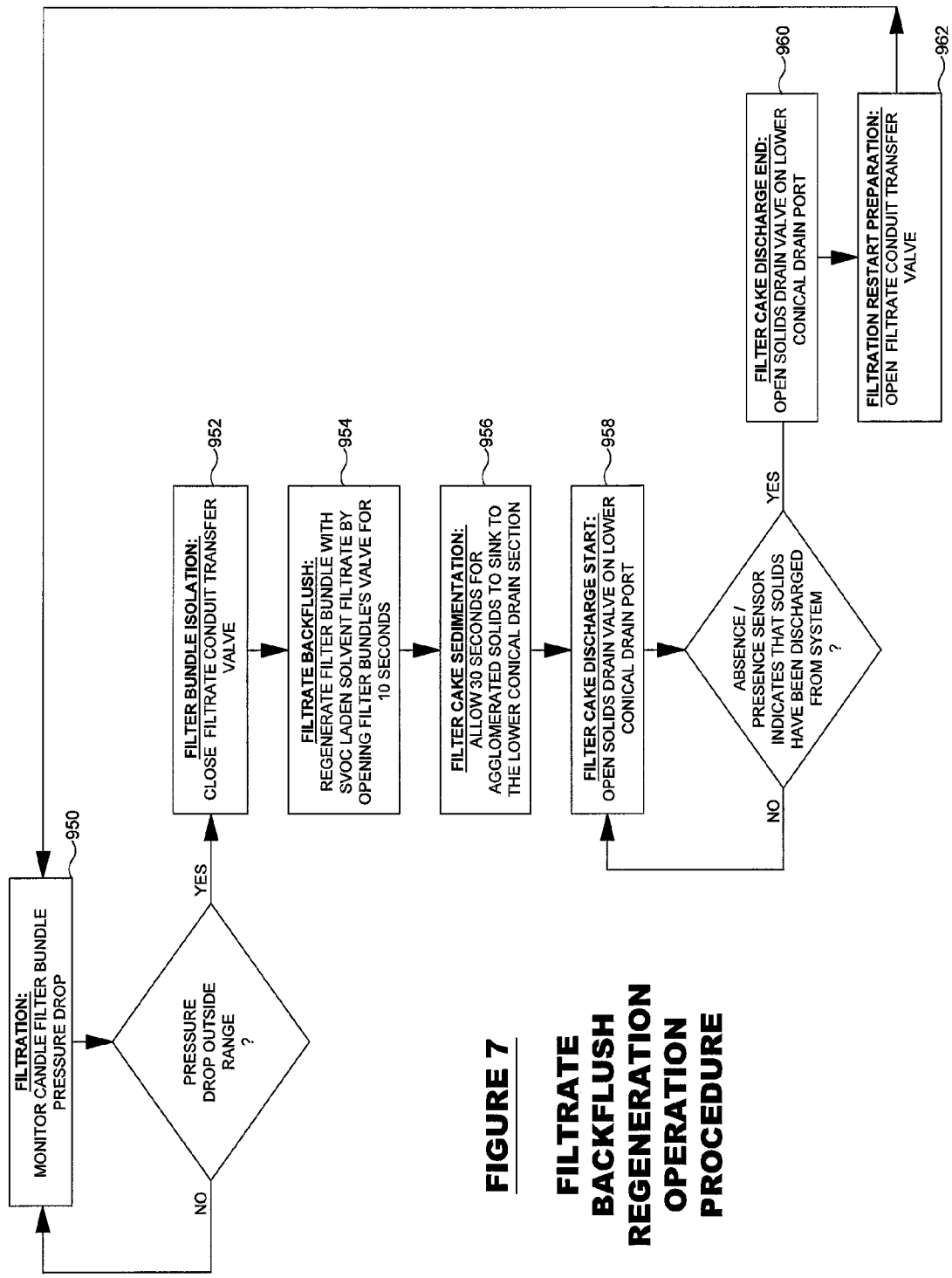

FIG. 7 depicts the preferred operating procedure for continuous filtration of suspended particulate solids from SVOC laden scrubbing solvent. Filtration [step 950] cooperates with the cyclic-batch filter in-situ cleaning steps of: filter bundle isolation [step 952]; filtrate backflush [step 954]; filter cake sedimentation [step 956]; filter cake discharge start [step 958]; filter cake discharge end [step 960]; and filtration restart preparation [step 962].

Figure 6:
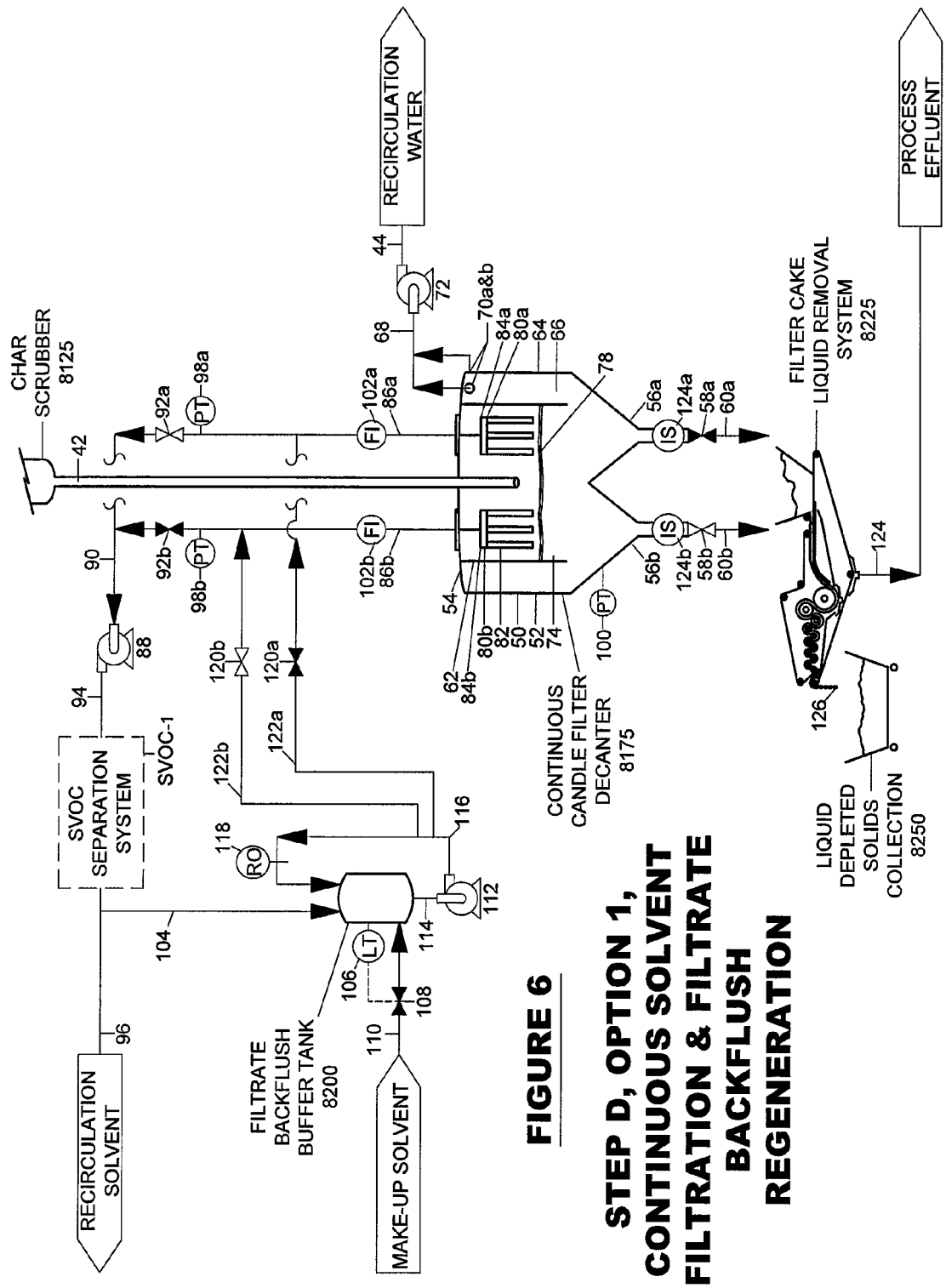

In step 950, (filtration), filtration proceeds and the filter bundle pressure drop is monitored. As a filtration cycle progresses, solids are deposited onto the surface of each filter element and adhere to its surface until a nominal target differential pressure drop between around 6 to 10 PSI is attained, which is proportionate to a predetermined thickness of 20 to 35 millimeters. If the filter bundle pressure drop is lower than the nominal target differential pressure drop, the filtering cycle continues until the nominal target differential pressure drop is reached. When a filter bundle has reached its nominal target differential pressure drop, a filter cleaning cycle will commence, which begins with step 952 (filter bundle isolation). In addition to FIG. 7, the sequential steps encompassing filtration and filter cleaning can be further illuminated by using FIG. 6, which visually indicate some of the valve sequencing involved, as indicated by open and closed valve positions, illustrated by 'non-darkened-in valves' and 'darkened-in valves', respectively, of filtrate register valve [92a & 92b], backflush filtrate regen valves [120a & 120b] (located on respective filtrate backflush regen conduits [122a & 122b]), as well as filter cake drain valves [58a & 58b] located on each lower conical section. FIG. 6, indicates filtrate register valve 92a open and 92b closed. It also shows backflush filtrate regen valves 120a closed and 120b open. FIG. 6 further depicts filter cake drain valves 58b open and 58a closed. It should be understood that these valves probably will never actually be opened at the same time; FIG. 6, together with FIG. 7, offer insight to the spirit of the operation, to clarify the preferred operating philosophy, and to provide the reader with a genuine appreciation for the sequencing involved.

When a nominal target pressure drop across a filter bundle is attained, the filter cake material must be dislodged from filter elements of a given filter bundle, and thus step 952 (filter bundle isolation) proceeds, which involves isolating the relevant filter bundle by closing the filtrate register valve 92b to stop filtration on that given filter bundle. Once the filtrate register valve has been closed, to isolate the filter bundle that exhibits a pressure drop higher or equal to a nominal target pressure drop, step 954 may proceed. Step 954, (filtrate backflush), involves transferring filtrate solvent from the pressurized recirculation loop [116], provided by the solvent backflush pump [112], through the relevant filtrate back-flush regen conduit [122b], injected though the filtrate regen valve [120b] where the solvent then countercurrently enters the filter bundle filtrate removal conduit [86b] and is transferred to the filter elements in need of regeneration.

It is to be understood that the operating discharge pressure of the solvent backflush pump [116], that required for the filtrate to be transferred countercurrent to operational flow to gently expand the filter cloth allowing for the cake to be discharged from the filter element surface, is higher than the operating pressure in the Continuous Candle Filter's upright tank [50], preferably between 15 to 20 PSI greater than the filter housing operating pressure, which operates between 30 and 60 PSIG. The pressure difference between the filtrate transferred to the system from the solvent backflush pump [116], and the upright tank [50], is the pressure necessary for the purification of the filter surfaces. It is to be understood that a typical backflush with SVOC-depleted filtrate solvent, in step 954, requires that the backflush filtrate regen valve [120b] need be left open for a duration of time less than or equal to 10 seconds.

After the SVOC-depleted filtrate solvent has been injected through the filter bundle, and once the backflush regen valve has been returned to a closed position, step 956 may commence. Step 956 (filter cake sedimentation) entails allowing a settling time sequence for a duration of time less than or equal to 30 seconds to allow the agglomerated dislodged filter cake solids to sink through both, the solvent phase, and the water phase, thus permitting sufficient time to allow the filtration induced forcibly agglomerated filter cake solids to settle to the bottom lower conical drain section.

Step 958 (filter cake discharge start) involves opening the respective regenerated filter bundle's filter cake drain valve [58b] to allow transference of an agglomerated paste-like carbon particulate filter cake material from the system. The process control signal generation mechanism required to end step 958 involves monitoring the signal output from a presence/absence detection flange mounted instrument [124b], also termed an impedance-sensing device, or the like, which may be installed just upstream prior to the filter cake drain valves to serve the purpose of further automating the system by indicating when the thick paste-like filter cake material has left the system.

Alternately the sensors may be furnished by the commercial vendor to detect the presence or absence of water within the pipeline thus acting as a control mechanism for closing the drain valve. If the process control signal indicates that the filter cake is being drained from the system, step 958 continues. If, on the other hand, the process control signal indicates that the filter cake has left the system, step 958 will end, and step 960 may begin. Step 960 (filter cake discharge end) entails closing the respective filter cake drain valve [58b] since solids have been discharged from the system. After step 960 has transpired, step 962 (filtration restart preparation) may commence which entails opening the respective filter bundle's filtrate register valve [92b] to again commence filtration on the regenerated filter bundle, thus allowing step 950 to commence again, then allowing the filtration and regeneration cycle to repeat itself.

Filter Cake Liquid Removal System

After the filter cake material is removed from the candle filter vessel, it may be transferred to any sort of commercially available Filter Cake Liquid Removal System [8225], preferably a belt filter press, or any similar device which applies mechanical pressure to an agglomerated sludge paste-like filter cake to remove residual liquid therefrom. Liquid removed from the filter cake [124] may be transferred to the plant waste water header, whereas the liquid depleted solids [126] may be transferred to another location for Liquid Depleted Solids Collection [8250].

Step D, Option 1, Operation

FIG. 8 underlines the principles dictating the philosophy of operation of Option 1 of Solids Removal & SVOC Removal Control Volume [D-1] as depicted in FIG. 4, which are as follows:

Step D1a:
  contacting the unconditioned syngas with a solvent and water to reduce the temperature of the syngas to below the SVOC condensation temperature to thereby form an intermediate SVOC-depleted syngas containing steam, and a first mixture comprising SVOC, solids, solvent and water;

Step D1b:
  removing steam from the intermediate SVOC-depleted syngas containing steam to form: (i) a first depleted syngas stream which has a reduced amount of SVOC relative to the unconditioned gas stream, and (ii) a second mixture comprising SVOC, solids, solvent and water;

Step D1c:

separating the water within the second mixture based upon immiscibility so that the SVOC, solids and solvent collect together to form a third mixture above the water; separating the solids from the SVOC and solvent in a vessel having at least one liquid phase candle filter such that the solids agglomerate on a surface of the candle filter and form a filter cake having density greater than that of water within the vessel;

Step D1d:

Backflushing the candle filter to loosen the filter cake so that the filter cake sinks into the water within the vessel; and Step D1e:

Removing the filter cake from a bottom of the vessel.

Step D, Option 2

In an alternate, non-limiting embodiment, the immiscible liquid separation and continuous filtration functionalities of the Continuous Candle Filter Decanter [8175] may be decoupled.

Figure 10:
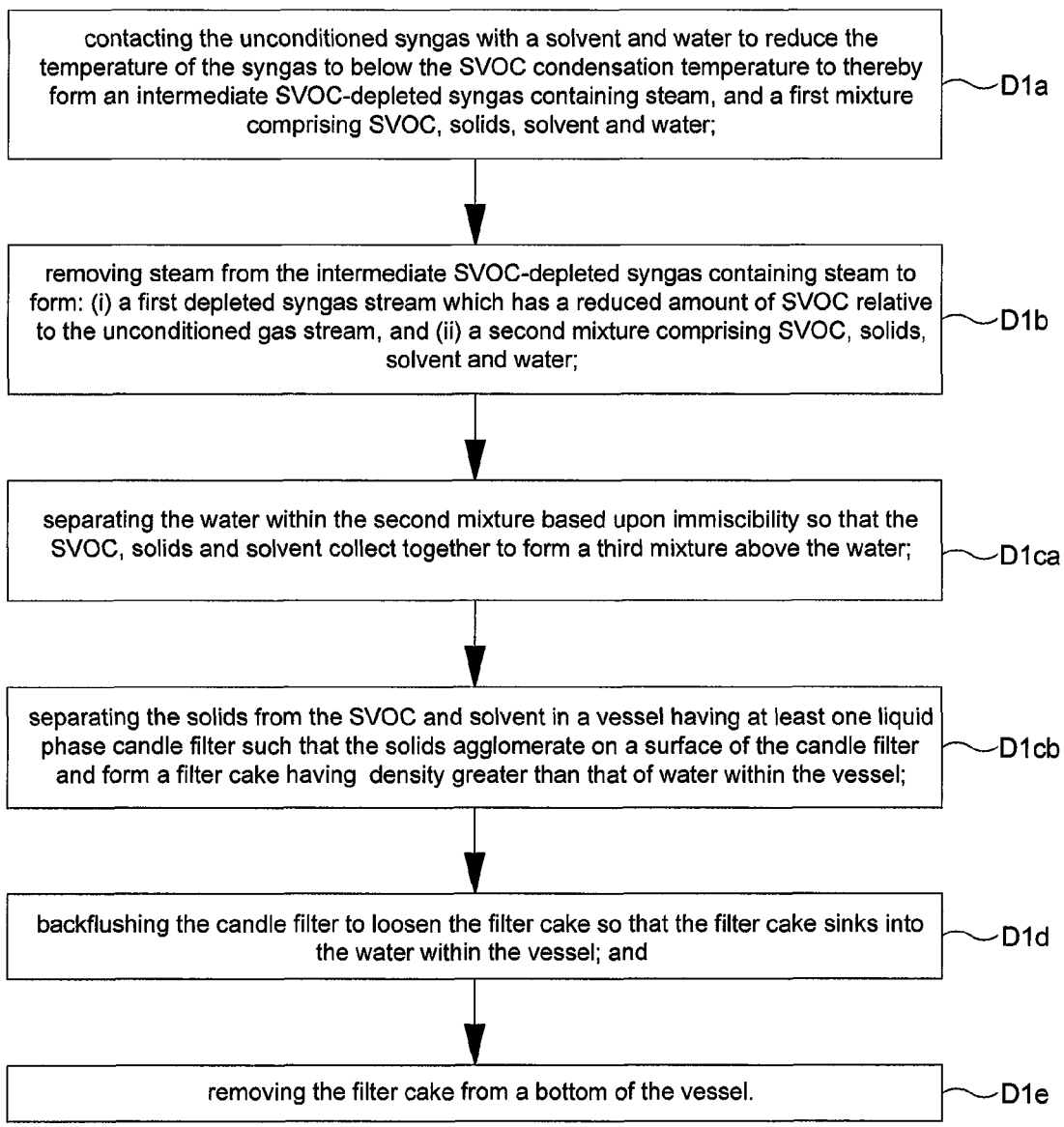

Option 2 of Solids Removal & SVOC Removal Control Volume [D-1], as depicted in FIG. 9 and FIG. 10, utilizes a Decanter [8275] and Continuous Candle Filter [8300], which serve a similar function as the Continuous Candle Filter Decanter [8175]. Separation of immiscible liquids followed by separation of SVOC from the solvent filtrate is the guiding principle to be achieved by installation of the configuration disclosed in Option 2.

The purpose of the Continuous Candle Filter Decanter [8175], of Step D Option 1, is to combine the functionality of density separation of liquids together with filtration separation of solids from liquids. It further automates an otherwise batch-wise filter operation so that a continuous cyclic-batch system is realized. As illustrated in FIG. 9, the Decanter [8275] and Continuous Candle Filter [8300] are separate from one another.

FIG. 9 depicts the Decanter [8275] and Continuous Candle Filter [8300] in communication through a solids & SVOC laden solvent filtrate transfer line [128]. It further depicts the Continuous Candle Filter [8300] in communication with the SVOC Separation System Control Volume [SVOC-1] through a SVOC laden solvent filtrate transfer line [130].

Decanters are well known liquid density separation unit operations commonplace to commercial industrial systems. Furthermore, similarly, candle filters, or the like, are commercially available and their installation, integration, and operation are well known to a person possessing an ordinary skill in the art to which it pertains.

FIG. 10 outlines the principles dictating the philosophy of operation of Option 2 of Solids Removal & SVOC Removal Control Volume [D-1] as depicted in FIG. 9, which are as follows:

Step D1a:

contacting the unconditioned syngas with a solvent and water to reduce the temperature of the syngas to below the SVOC condensation temperature to thereby form an intermediate SVOC-depleted syngas containing steam, and a first mixture comprising SVOC, solids, solvent and water;

Step D1b:

removing steam from the intermediate SVOC-depleted syngas containing steam to form: (i) a first depleted syngas stream which has a reduced amount of SVOC relative to the unconditioned gas stream, and (ii) a second mixture comprising SVOC, solids, solvent and water;

Step D1ca:

Separating the water within the second mixture based upon immiscibility so that the SVOC, solids and solvent collect together to form a third mixture above the water;

Step D1cb:

separating the solids from the SVOC and solvent in a vessel having at least one liquid phase candle filter such that the solids agglomerate on a surface of the candle filter and form a filter cake having density greater than that of water within the vessel;

Step D1d:

Backflushing the candle filter to loosen the filter cake so that the filter cake sinks into the water within the vessel; and Step D1e:

Removing the filter cake from a bottom of the vessel.

SVOC Separation System

Figure 11:
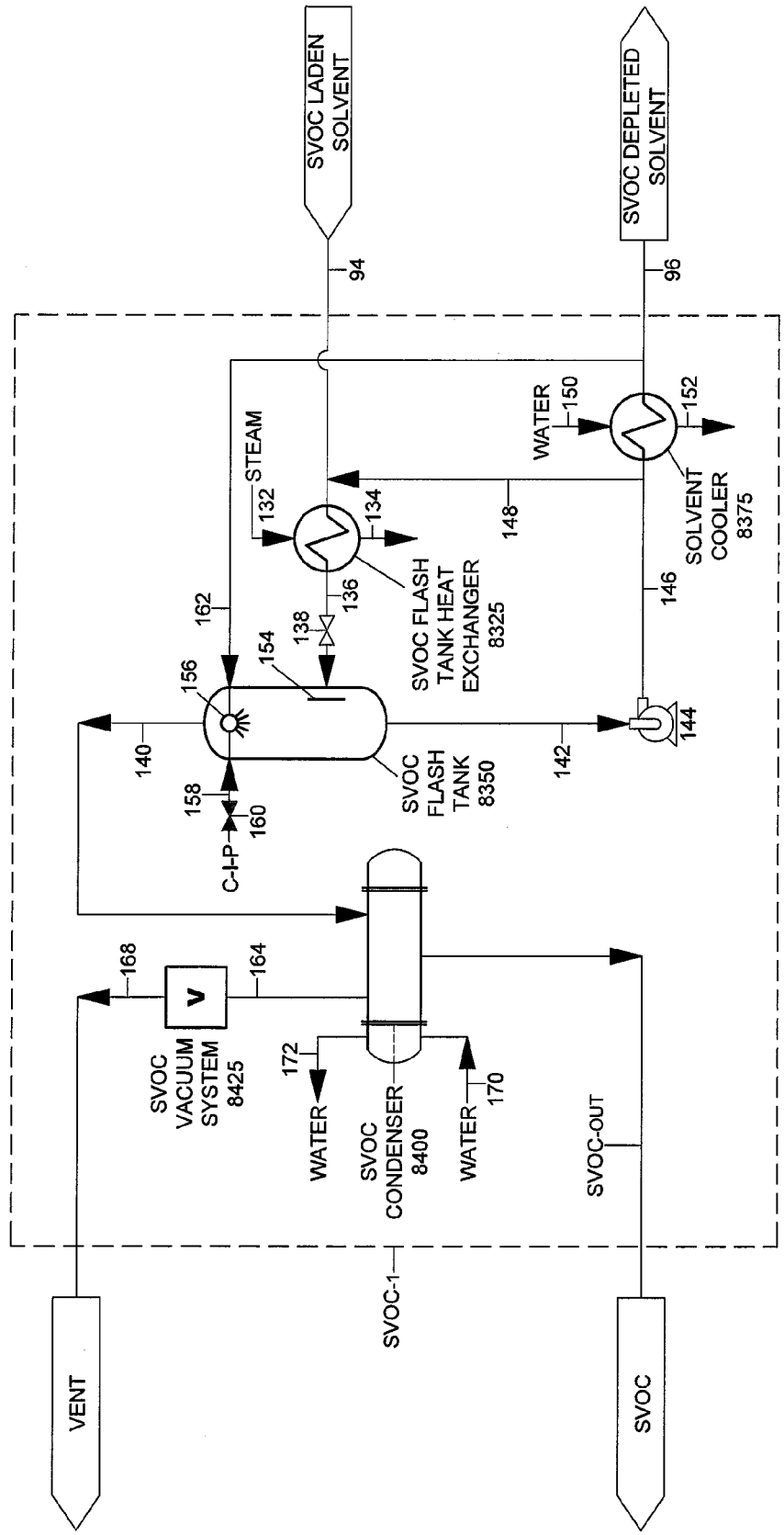
Figure 12:
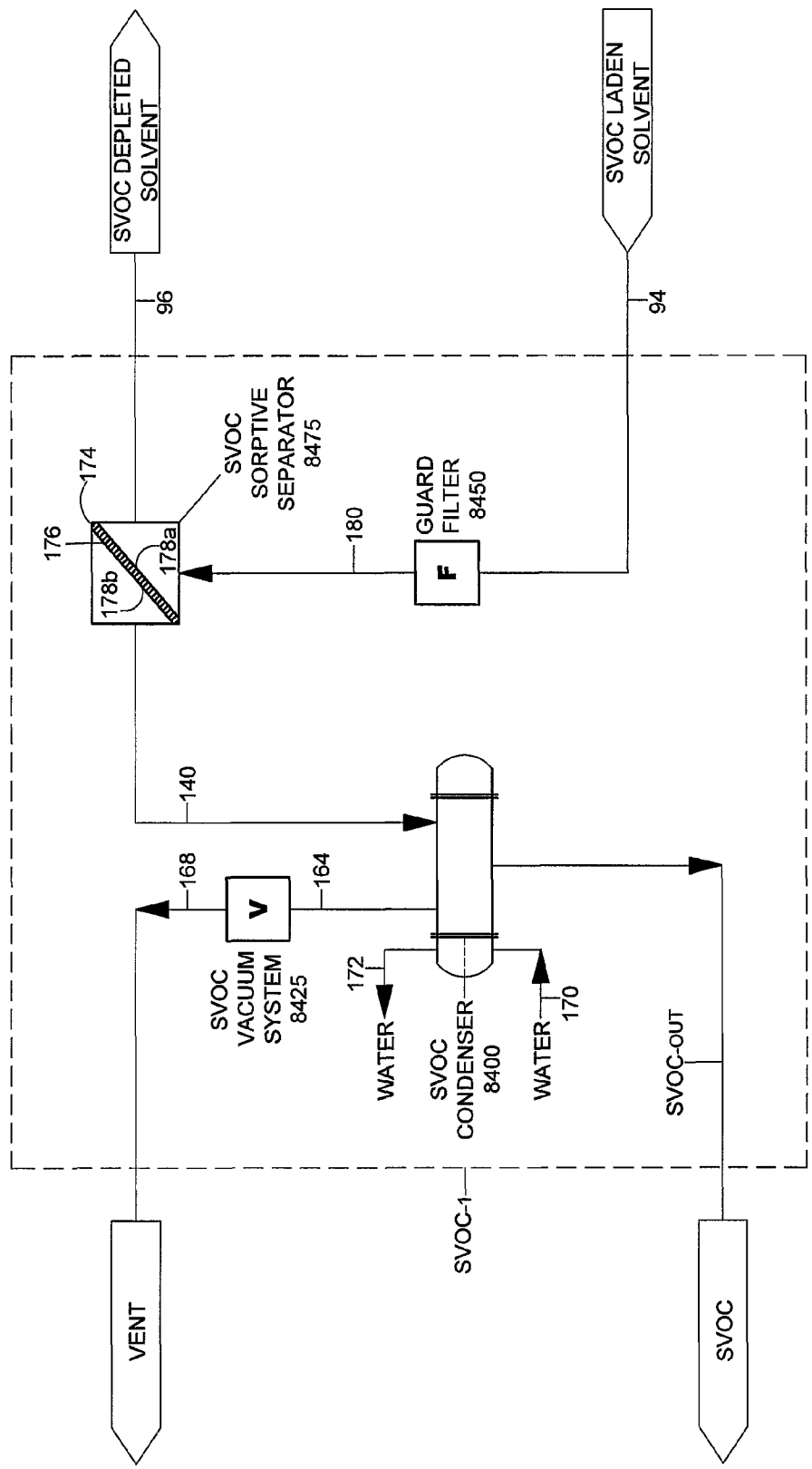

FIG. 11 and FIG. 12 illustrate options for separating SVOC from the filtrate scrubbing solvent.

SVOC Flash Separation System

The preferred application to remove SVOC from the syngas as depicted in Solids Removal & SVOC Removal Control Volume [D-1], encompasses the utilization of a scrubbing solvent that sorbs SVOC from the syngas. SVOC removal from the scrubbing solvent must take place in order to realize continuous recycle of the scrubbing solvent as well as to avoid the buildup of SVOC within the system leading to operational impairment of the scrubbing operations.

In order to continuously recycle absorption scrubbing liquid, a SVOC Flash Separation System, as depicted in FIG. 11, may be employed to flash SVOC from the scrubbing solvent. Preferably this system is employed together with the use of a vacuum system, condenser system, and liquid SVOC collection equipment permitting the recovery of a SVOC product.

FIG. 11 depicts the preferred non-limiting embodiment for the SVOC Separation System Control Volume [SVOC-1]. SVOC laden filtrate scrubbing solvent is transferred from solvent and char filtration operations through a filtrate solvent transfer line [94] and routed to the inlet of a SVOC Flash Tank Heat Exchanger [8325], which is preferably of a shell and tube type heat exchanger. Steam, or another heat source, may communicate with the shell-side of the heat exchanger through a steam inlet line [132] and a steam discharge line [134] to transfer heat to the SVOC laden filtrate solvent traveling through the exchanger's tube-side prior to being transferred to the SVOC Flash Tank [8350]. SVOC laden filtrate scrubbing solvent is discharged from the exchanger's tube-side and routed through a SVOC laden filtrate solvent Flash Tank transfer line [136] where it then flows through a pressure letdown device [138], comprised of either a valve, or restriction orifice, that is positioned just upstream of the inlet to the SVOC Flash Tank. Upon release to the lower pressure environment of the SVOC Flash Tank, the SVOC liquid fraction is vaporized, or flashed, from the SVOC laden filtrate solvent and enters the SVOC flash transfer conduit [140] for condensation and collection of the SVOC product. A SVOC-depleted filtrate solvent is expelled from the lower section of the SVOC Flash Tank where it enters a SVOC-depleted solvent transfer line [142]. A SVOC-depleted solvent transfer pump [144], routes the solvent to a Solvent Cooler [8375] through a solvent transfer line [146], or it may transfer the solvent back to the SVOC Flash Tank Heat Exchanger [8325] through a solvent recycle line [148].

A cooling water supply [150] and a cooling water return [152] communicate with the shell-side of the Solvent Cooler [8375] and provide the thermal capacity to remove heat from the solvent traveling through the tube-side of the exchanger.

The SVOC Flash Tank is preferably a vertical cylindrical tank, however it may be a horizontal flash tank with provided distribution pipe, and may be equipped with an impingement baffle [154] to provide a sudden flow direction change of the flashing SVOC laden filtrate solvent. A plurality of spray nozzles [156] are positioned in the upper section of the SVOC Flash Tank and are utilized for intermittent washing with a clean in place (CIP) agent transferred to the system through a CIP agent transfer line [158] and a CIP agent isolation valve [160]. Cleaning of the vessel preferably is performed only when the solvent is isolated from the SVOC Flash System. The spray nozzles [156] may also be provided with a source of cooled SVOC-depleted solvent through a cooled SVOC-depleted solvent transfer line [162] routed from the discharge of the Solvent Cooler [8375].

The SVOC Flash Tank Heat Exchanger [8325] increases the temperature of the SVOC laden solvent stream to above the flash point of SVOC and lesser than, and not equal, to the flash point temperature of the scrubbing solvent. This is to permit vaporization of only the SVOC fraction within the solvent and SVOC liquid mixture upon release to a lower pressure across the pressure letdown device [138].

A SVOC Condenser [8400] accepts SVOC laden vapors from the SVOC vapor transfer conduit [140] and condenses the SVOC into a liquid state prior to discharging the liquid SVOC from the system through a SVOC Separation System Control Volume SVOC Discharge [SVOC-OUT].

A SVOC vacuum system transfer line [164] connects the SVOC Vacuum System [8425], with the SVOC Condenser [8400]. The Vacuum system is preferably a liquid ring vacuum pump that uses a liquid SVOC seal fluid [166] within its pump casing (not shown).

A cooling water supply [170] and a cooling water return [172] communicate with the shell-side of the SVOC Condenser [8400] and provide the thermal capacity to condense SVOC traveling through the tube-side of the exchanger into a liquid phase.

SVOC Membrane Separation System

In an alternate non-limiting embodiment, selective sorptive permeation of SVOC from the scrubbing liquid may be employed, as depicted in FIG. 12 which portrays the SVOC Sorptive Separation System. Liquid phase sorption applications, not only including pervaporation membrane processes, may be employed to separate the SVOC from the SVOC laden scrubbing solvent liquid mixture due to selective diffusion of the SVOC molecules based on molecular diameter and polarity.

SVOC laden filtrate scrubbing solvent may be transferred from the filtrate solvent transfer line [94] to the inlet of a SVOC Sorptive Separator [8475]. It is preferred to utilize a SVOC Sorptive Separator [8475] in a capacity to realize liquid phase pervaporative sorption separation of SVOC from a solvent laden filtrate stream. However a packed bed of adsorbent, either polymeric styrene based adsorbents, or 10 angstrom aluminosilicate molecular sieve adsorbents, or a suitable sorption medium possessing an preferential sorption of SVOC from a scrubbing solvent may also be utilized to accomplish a similar result.

The SVOC Sorptive Separator [8475] is preferentially comprised of a commercially available permeation unit, preferably a shell and tube device utilizing a tubular membrane selective to hydrophobic non-polar solvents preferably in the form of a PEEK based membrane cast inside a hollow fiber tube.

The SVOC Sorptive Separator [8475] may also contain a cluster of membrane elements, and more than one permeation unit may be used to create multiple pervaporation modules, or even multiple stages of pervaporation modules may be utilized. Although a plate and frame type unit may be utilized in conjunction with membrane sheets, the shell and tube type system is preferred due to its ease in manufacture and lower capital cost.

The SVOC Sorptive Separator [8475] contains a porous membrane [174], preferably with a porous chemical resistant coating [176], having a SVOC laden solvent membrane process surface [178a], that is exposed to the SVOC laden filtrate scrubbing solvent, and an opposing SVOC permeate membrane process surface [178b], where the SVOC permeate is volatilized therefrom by a driving force created by preferably a combination of a vacuum driven and a temperature driven gradient created by a downstream vacuum system and condenser as previously described.

A Guard Filter [8450] accepts SVOC laden filtrate solvent from the filtrate solvent transfer line [94] prior to routing it to the SVOC Sorptive Separator [8475] through a second filtrate solvent transfer line [180]. The Guard Filter [8450] is in place to mediate any membrane fouling which may arise due to fine particulate matter blocking membrane flow channels, contributing to clogging of effective membrane void spaces and ultimately causing a gradual decline in the membrane SVOC permeation rate. The Guard Filter [8450] is preferably an easy access metal filter-bag housing preferably containing a heavy-duty polyester felt filter bag of 0.5 micron effective pore size.

Sequence Step E, Chlorine Removal [E]

Figure 13:
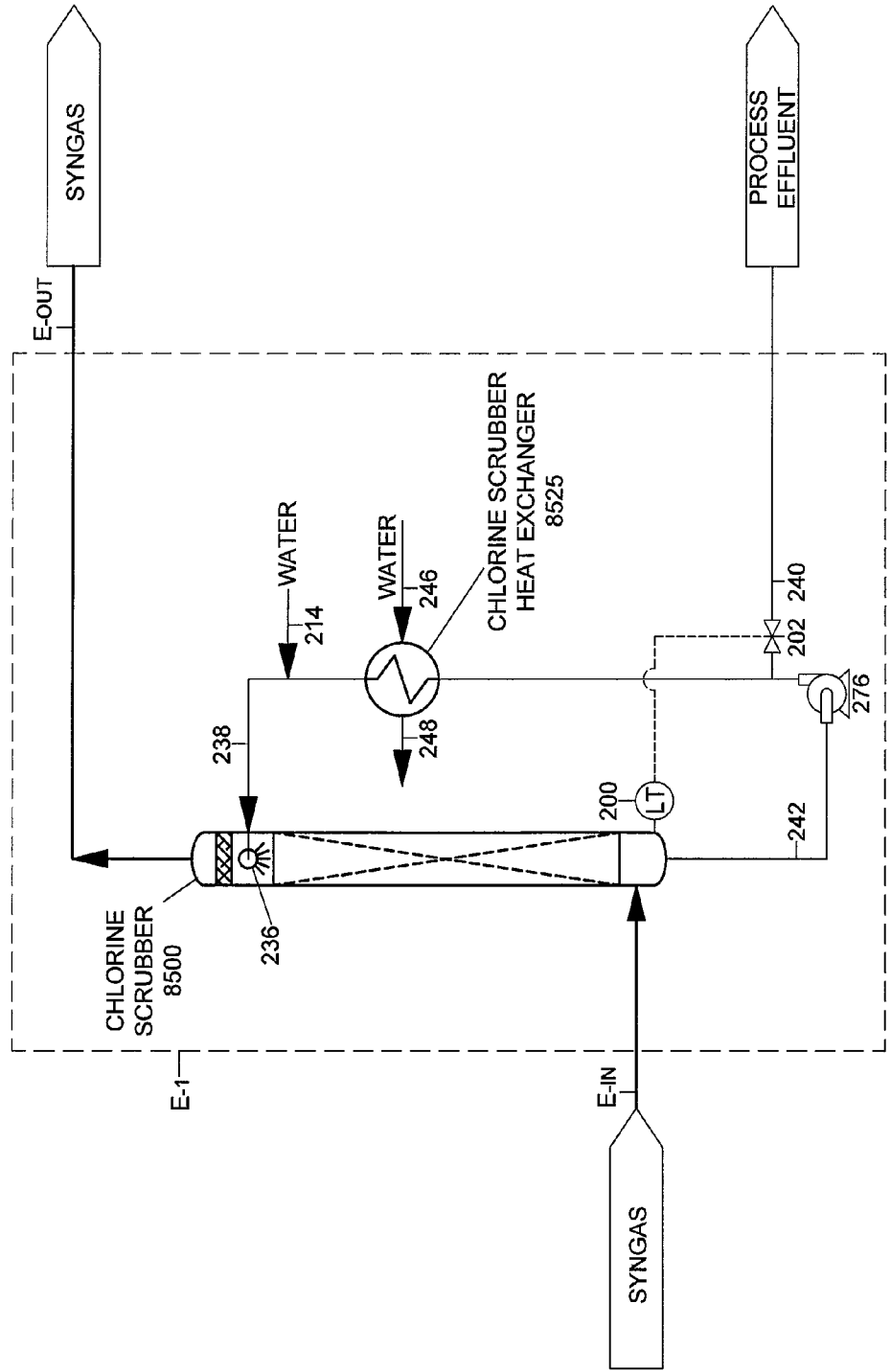

FIG. 13 illustrates Sequence Step E, Chlorine Removal [E], wherein Chlorine Removal Control Volume [E-1] accepts a chlorine laden Sequence Step E Syngas Inlet [E-IN], and outputs a chlorine depleted Sequence Step E Syngas Discharge [E-OUT].

The Chlorine Scrubber [8500], configured similar to the Char Scrubber [8125], is also a vertically oriented cylindrical, or rectangular, pressure vessel having a lower section, and an upper section, along with a central section that contains a specified quantity of packed absorption media, which is supported upon a suitable support grid system commonplace to industrial chemical equipment systems. The upper section of the scrubber preferably contains a demister that is positioned above a scrubber spray nozzle system [236] which introduces the scrubbing absorption liquid to the scrubber.

The purpose of the Hydrogen Chloride Scrubber is to remove trace amounts of hydrogen chloride from the syngas by using water condensed from residual steam contained within the syngas as the main scrubbing absorption liquid. It also serves the function to remove any residual particulate elutriated in the syngas.

Syngas enters the lower section of the Hydrogen Chloride Scrubber and passes up through the scrubber's central section where the syngas vapor comes into intimate contact with the water scrubbing liquid traveling countercurrently via gravity flow down through the scrubber's packing. Water is condensed out of the vapor phase and enters the lower section of the scrubber. A level control loop, comprising a level transmitter [200], positioned on the lower section of the scrubber, and a level control valve [202], may be automatically operated to permit water to be bled from the scrubber water recirculation piping [238], via a waste water transfer conduit [240], to maintain a steady liquid level within the lower section of the scrubber. A scrubber water recirculation pump [276], accepts water from the lower section of the scrubber, through the pump suction piping [242], and transfers the water through a Hydrogen Chloride Scrubber Heat Exchanger [8525], prior to injecting the water into the scrubber, via the main recirculation piping [238], which routes the water through the scrubber's spray nozzle system and into the upper section of the scrubber where the flow of liquid is directed downwards onto the scrubber central packing. The Hydrogen Chloride Scrubber Heat Exchanger [8525] is preferably of the shell and tube type, wherein a cooling water supply [246], and a cooling water return [248], communicate with the shell-side of the heat exchanger to fulfill the heat transfer requirements necessary to indirectly remove heat from the process side steam condensate recirculation liquid. Process water [214] may be transferred to the scrubber water recirculation piping, or the lower section of the scrubber.

Sequence Step F, Sulfur Removal [F]

Figure 14:
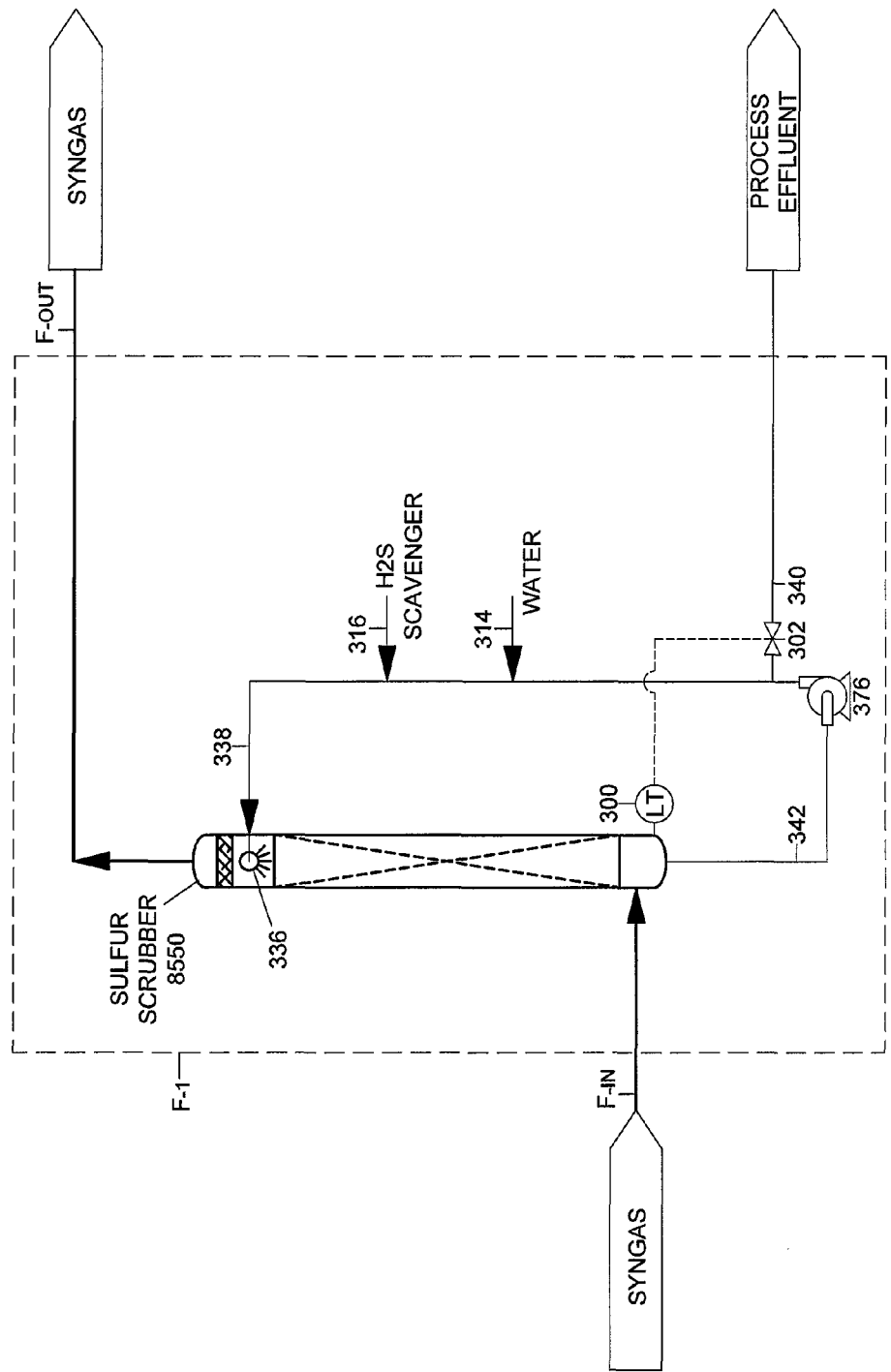

FIG. 14 illustrates Sequence Step F, Sulfur Removal [F], wherein Sulfur Removal Control Volume [F-1] accepts a sulfur laden Sequence Step F Syngas Inlet [F-IN], and outputs a sulfur-depleted Sequence Step F Syngas Discharge [F-OUT].

The Sulfur Scrubber [8550] is configured similar to the Chlorine Scrubber [8500]. The upper section of the scrubber preferably contains a demister that is positioned above a scrubber spray nozzle system [336] which introduces the scrubbing absorption liquid to the scrubber. Syngas enters the lower section of the Sulfur Scrubber and passes up through the scrubber's central section where the syngas vapor comes into intimate contact with a hydrogen sulfide scavenger scrubbing liquid traveling countercurrently via gravity flow downward through the scrubber's packing. The Sulfur Scrubber preferentially utilizes a hydrogen sulfide scavenger as the main scrubbing fluid which is preferably a dilute, nonregenerable, water-soluble, triazine derived solution, preferably of Nalco EC9021A product, diluted with water to between a 0.01 and 1 wt % triazine solution mixture. Glyoxal from BASF, SE-100 H2S Hydrogen Sulfide Scavenger from Sepcor, DTM Triazine from DThree Technology, or Baker Hughes' Petrolite SULFIX™ H2S scavengers may alternately be used. The use of a regenerable hydrogen sulfide scavenger fluid may also be used.

The Sulfur Scrubber is equipped with a level transmitter [300], positioned on the lower section of the scrubber, which cooperates with a level control valve [302] located on a waste transfer conduit [340]. The recirculation pump [376] accepts a dilute triazine solution from the lower section of the scrubber, through its pump suction piping [342], and pumps the liquid to the upper section of the scrubber through the recirculation piping [338] and through a plurality of spray nozzles which spray the flow downwards onto the scrubber's centrally located packed section.

A source of process water [314], along with a source of a fresh concentrated sulfur scavenger derived solution [316], are available to be injected into the Sulfur Scrubber system, preferably into the recirculation piping [338].

Any type of sulfur removal system may be used to achieve the syngas cooling functionality prescribed in Sequence Step F. Some alternatives may be, including, but not limited to, wet limestone scrubbing systems, spray dry scrubbers, claus processing system, solvent based sulfur removal processes such as the UC Sulfur Recovery Process (UCSRP), low-temperature or refrigerated solvent-based scrubbing systems using amines or physical solvents (i.e., Rectisol, Selexol, Sulfinol), high temperature sorbents, glycol ether, diethylene glycol methyl ether (DGM), regenerable and non-regenerable sorbents, molecular sieve zeolites, calcium based sorbents, FeO, MgO or ZnO-based sorbents or catalysts, Iron Sponge, potassium-hydroxide-impregnated activated-carbon systems, impregnated activated alumina, titanium dioxide catalysts, vanadium pentoxide catalysts, tungsten trioxide catalysts, sulfur bacteria (Thiobacilli), sodium biphosphate solutions, aqueous ferric iron chelate solutions, potassium carbonate solutions, alkali earth metal chlorides, magnesium chloride, barium chloride, crystallization techniques, bio-catalyzed scrubbing processes such as the THIOPAQ Scrubber, or hydrodesulphurization catalysts.

Sequence Step G, Particulate Filtration [G]

Figure 15:
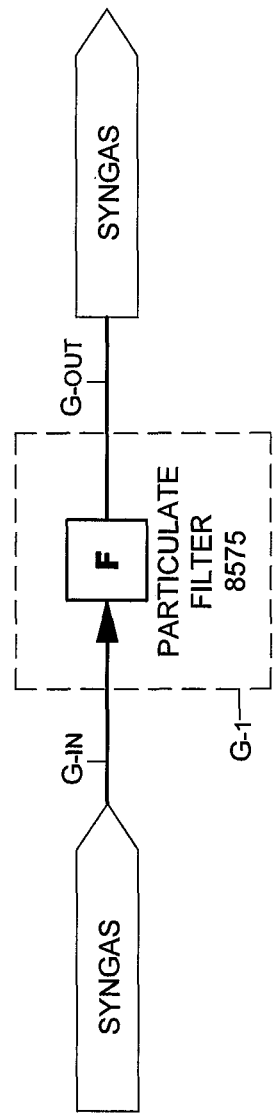

FIG. 15 illustrates Sequence Step G, Particulate Filtration [G], wherein the Particulate Filer [8575] situated within the Particulate Filtration Control Volume [G-1] accepts a particulate laden Sequence Step G Syngas Inlet [G-IN], and outputs a particulate depleted Sequence Step G Syngas Discharge [G-OUT].

Sequence Step H, Syngas Compression [H]

Figure 16:
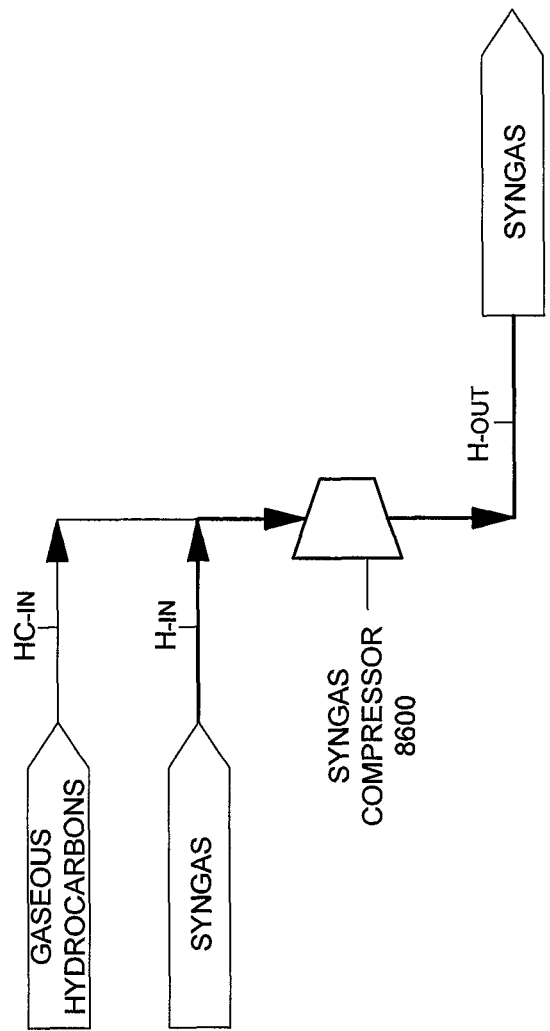

FIG. 16 illustrates Sequence Step H, Syngas Compression [H], wherein the Syngas Compressor [8600] accepts a Sequence Step H Syngas Inlet [H-IN], and outputs a Sequence Step H Syngas Discharge [H-OUT]. A gaseous hydrocarbon source [HC-IN] may be optionally routed to the inlet of the Syngas Compressor [8600] and may include, natural gas, syngas, refinery offgases, naphtha, methanol, ethanol, petroleum, methane, ethane, propane, butane, hexane, benzene, toluene, xylene, or naphthalene, or the like.

Sequence Step I, VOC Removal [I]

Figure 17:
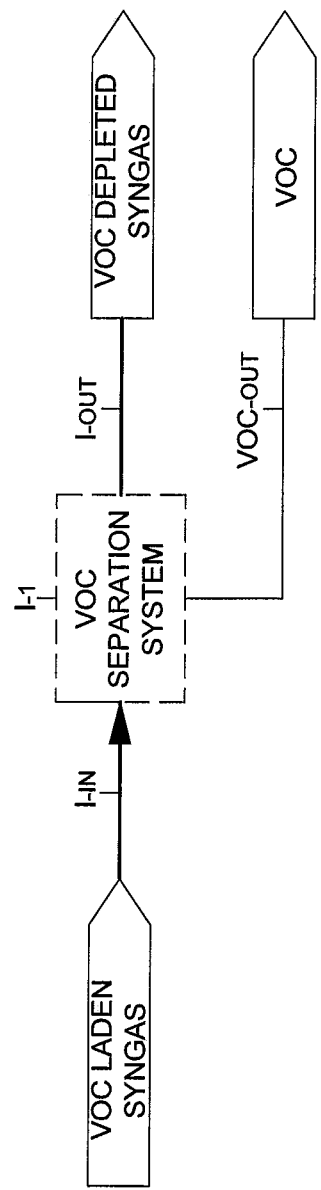

FIG. 17 depicts Sequence Step I, VOC Removal [I], wherein VOC Removal Control Volume [I-1] accepts a VOC laden Sequence Step I Syngas Inlet [I-IN], and outputs a VOC-depleted Sequence Step I Syngas Discharge [I-OUT].

VOC removal systems are not conventionally found within syngas cleaning or conditioning processes. Experimental results have consistently and repeatedly shown that without Sequence Step I, VOC Removal [I] in place sulfur removal systems could be inhibited downstream allowing contaminants to pass through the system and poison catalysts that are not sulfur tolerant.

Figure 18:
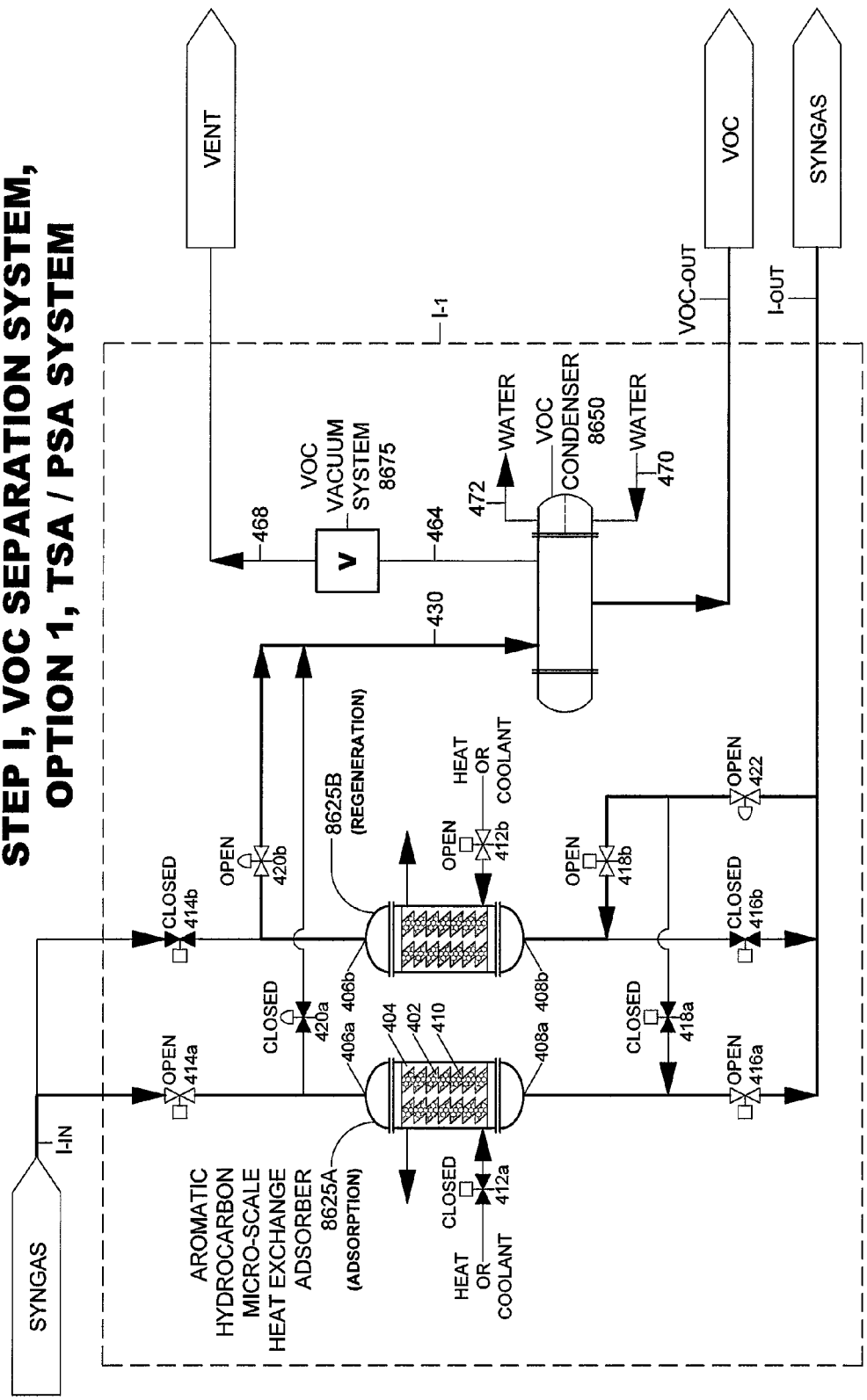

In one non-limiting embodiment, VOC may be removed from syngas by utilizing a heat exchange adsorption process that combines thermal swing regeneration with vacuum pressure swing adsorption (VPSA), as depicted in FIG. 18.

Figure 19:
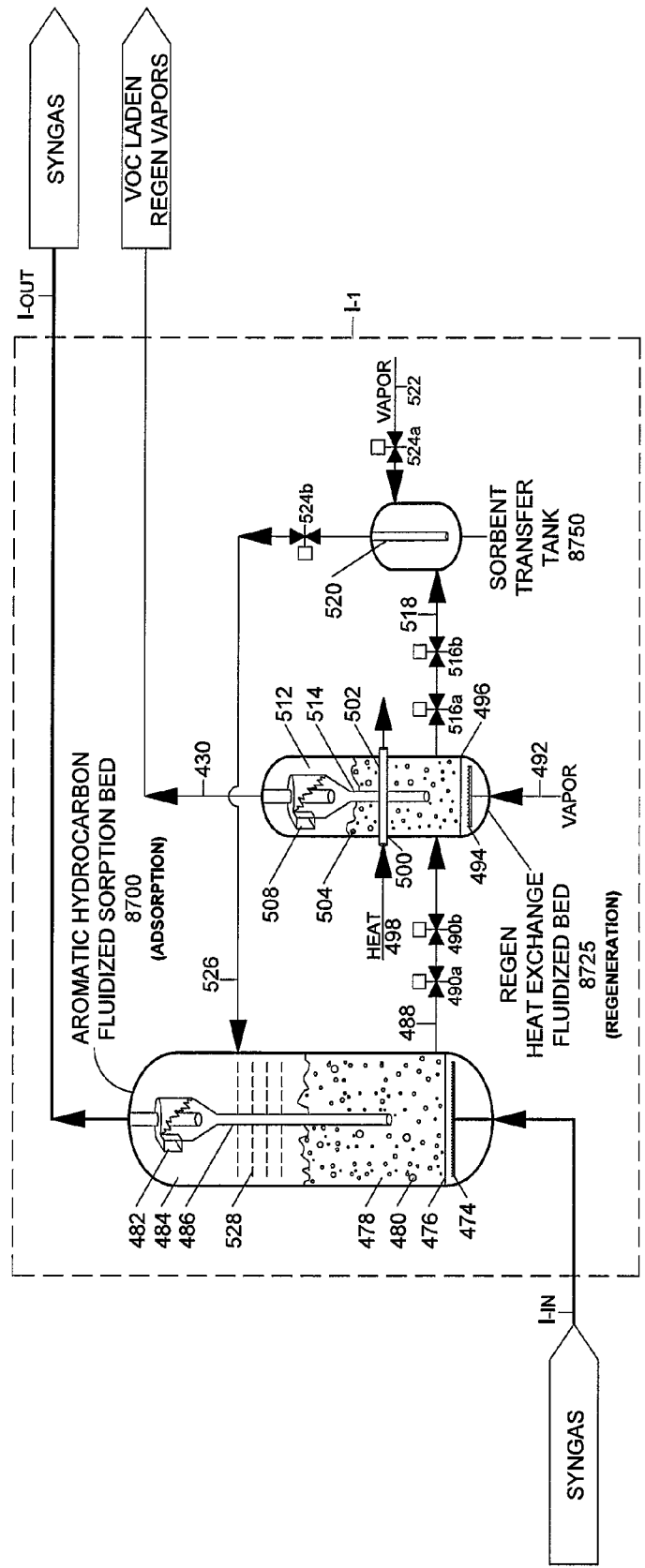

In another non-limited embodiment, VOC may be removed from syngas by utilizing a fluidized particulate bed adsorption system wherein VOC saturated adsorbent is regenerated utilizing a vacuum assisted thermal swing desorption process as depicted in FIG. 19.

Sequence Step I, Option 1

FIG. 18 depicts Option 1 of Sequence Step I which discloses a separation system that may be used to remove VOC from syngas. The figure portrays a VPSA system with thermal swing desorption capabilities.

VPSA is a gas separation process in which the adsorbent is regenerated by rapidly reducing the partial pressure of the adsorbed component, either by lowering the total partial pressure or by using a purge gas.

In a VPSA system, regeneration is achieved by first stopping feed flow, then depressurizing the adsorbent, usually by passing regeneration gas through the bed countercurrent to the feed direction. The regenerating gas is generally free of impurities.

VPSA systems have certain inherent disadvantages, mostly attributed to the short cycle time that characterizes VPSA. In each cycle of operation, the adsorbent is subjected to a feed period during which adsorption takes place, followed by depressurization, regeneration, and repressurization. During the depressurization, the feed gas in the bed is vented off and lost, which is referred to as a "switch loss." The short cycle time in the VPSA system gives rise to high switch losses and, because the cycle is short, it is necessary that the repressurization is conduced quickly. This rapid repressurization causes transient variations in the feed and product flows, which can adversely affect the plant operation, particularly in the operation of processes downstream of the adsorption process.

VPSA is best used for components that are not too strongly adsorbed. On the other hand, thermal swing adsorption (TSA) is preferred for very strongly adsorbed components, since a modest change in temperature produces a large change in gas-solid adsorption equilibrium. In the temperature swing process, to achieve regeneration, is it necessary to supply heat to desorb the material. Following regeneration of the sorbent by heating, the sorbent preferably is cooled prior to the next adsorption step, preferably by transferring a cooling fluid, not only including water, through the thermal transfer chambers of each Aromatic Hydrocarbon Micro-Scale Heat Exchange Adsorber [8625A&B].

In one embodiment, each Aromatic Hydrocarbon Micro-Scale, also termed Microchannel, Heat Exchange Adsorber [8625A&B] includes one or more adsorption chambers each of which may be tubular or rectangular in shape and each chamber is separated from the adjacent chamber(s) by a thermal transfer chamber [404]. Each adsorption chamber is provided with a feed inlet [406a & 406b] for introducing VOC laden syngas, a product outlet [408a & 408b] for removing VOC-depleted syngas from the adsorption chamber, and a particulate bed [410] comprising sorbent particles disposed within the chamber. It is desirable for the adsorption chambers to be relatively narrow to ensure rapid heat transfer, and thus is it our realization that a micro-scale heat exchanger, also termed a microchannel heat exchanger, is the preferred unit operation to be utilized in this particular application. In another non-limiting embodiment, each Aromatic Hydrocarbon Adsorber [8625A&B] are comprised of fixed beds without thermal transfer chambers [404]. It is to be understood that although FIG. 18 depicts parallel first and second adsorbers capable of being operated such that while the first heat exchange adsorber is in an adsorption mode, the second heat exchange adsorber is in a regeneration mode, more than two adsorbers may be used so that one adsorber is off-line.

The particulate bed preferably contains an adsorption medium that selectively adsorbs VOC into the pores of adsorbent versus any other syngas constituents. In one embodiment, the adsorbent is a styrene based polymeric adsorbent, such as Dowex Optipore V503, or the like. In another embodiment, the adsorbent may be made up of molecular sieves, zeolites, catalyst materials, silica gel, alumina, activated carbon materials, or combinations thereof.

Each thermal transfer chamber is equipped with thermal transfer chamber inlet valve [412a & 412b]. A coolant material, not only including water, or a heating material, not only including steam, may be introduced into the thermal transfer chamber. The coolant material may remove heat from the adjacent adsorption chambers by thermal transfer. The heating material can add heat to the adjacent adsorption chambers also by thermal transfer.

When the first adsorber unit [8625A] is in an adsorption mode, the second adsorber [8625B] is in regeneration mode where the second adsorber is first depressurized, then purged with the VOC-depleted syngas stream and finally re-pressurized. During this part of the cycle, the first inlet valve [414a] is open and the second first inlet valve [414b] is closed directing the syngas feed from line [I-IN] into the first adsorber [8625A]. As the VOC laden syngas passes through the adsorber [8625A], VOC adsorbate is selectively adsorbed into the pores of the adsorbent and the VOC-depleted syngas passes through a first product outlet valve [416a] and transferred from the VOC separation system through Sequence Step I Syngas Discharge [I-OUT]. During the entire regeneration process, second product outlet valve [416b] is closed to prevent flow of regenerate into the VOC-depleted syngas stream.

Under regeneration conditions, the second adsorber [8625B] is first depressurized. During depressurization, both the first purge inlet valve [418a] and second purge inlet valve [418b] are closed to prevent purge from entering the second adsorber [8625B] during depressurization. The first depressurization valve [420a] is closed to prevent flow of the VOC laden syngas stream [I-IN] into the regenerate product line [430]. The first thermal transfer chamber inlet valve [412a] is closed to prevent heat addition to the first adsorber [8625A] undergoing adsorption, and the second thermal transfer chamber inlet valve [412b] on the second adsorber [8625B] is open to allow transfer of heat to the regenerating VOC saturated adsorbent. The second depressurization outlet valve [420b] is open allowing flow from the second adsorber [8625B] through the regenerate product line [430]. The regenerate product will contain a mixture of syngas and VOC. The regenerate product line is under a vacuum condition as a result of the VOC Vacuum System [8675]. The regenerate product flows freely from the pressurized second adsorber [8625B] along the regenerate product line [430].

Once the second adsorber is fully depressurized, the second purge inlet valve [418b] is opened allowing flow of VOC-depleted syngas to purge the VOC that is selectively adsorbed in the pores of the adsorbent and withdraw such purge stream along regenerate product line [430] under vacuum conditions. Simultaneous to the time when the purge inlet valve is opened, the second adsorber's thermal transfer chamber inlet valve [412b] is opened to indirectly transfer thermal energy to the depressurized regenerating adsorber [8625B] to aid the removal of VOC adsorbate from the pores of the adsorbent which is under vacuum conditions. Once the purge and heat addition steps are complete for the second adsorber [8625B], depressurization outlet valve [420b] is closed while purge inlet valve [418b] remains open so that VOC-depleted syngas from the first adsorber [8625A] can pressurize the second adsorber [8625B] to the same pressure as the first adsorber [8625B]. Coolant may be exchanged for the heat source transferred to the second adsorber [8625B] through the second thermal transfer chamber inlet valve [412b] and into the thermal transfer chamber [404] of the second adsorber [8625B] to cool the adsorbent media within the adsorption chamber to prepare it for the next adsorption sequence.

Once the second adsorber [8625B] is fully pressurized, it is ready for its function to switch from regeneration to adsorption. At this point, the adsorbent in the first adsorber

[8625A] has selectively adsorbed a considerable amount of VOC. The first adsorber [8625A] is ready for regeneration. The two beds switch function. This occurs by the following valve changes. The first product outlet valve [416a] is closed, and the first inlet valve [414a] is closed. The first purge inlet valve [418a] remains closed, and the first depressurization outlet valve [420a] is opened to begin depressurization of the first adsorber [8625A]. The second thermal transfer chamber inlet valve [412b] is closed and the first thermal transfer chamber inlet valve [412a] is opened to allow thermal energy to be transferred to the first adsorber [8625A] thermal transfer chamber [404].

Adsorption begins for the second adsorber [8625B] with the following valve arrangement. The second depressurization outlet valve [420b] remains closed. The second purge inlet valve [418b] is closed. The second product outlet valve [416b] is opened, and the first inlet valve [414b] is opened to facilitate flow from the VOC laden syngas stream [I-IN] into the second adsorber and flow of VOC-depleted syngas from the second adsorber [8625B] through second product outlet valve [416b] into the VOC-depleted syngas stream [I-OUT]. The regeneration process as described above for the second adsorber [8625B] is repeated for the first adsorber [8625A].

Preferably, the regeneration occurs at a pressure below atmospheric pressure under a vacuum created by the VOC Vacuum System [8675]. The regenerate leaves the second adsorber [8625B] as a vapor stream. It is cooled in a VOC Condenser [8650] supplied with a cooling water supply [470] and a cooling water return [472]. Condensed VOC regenerate product is withdrawn along stream through VOC Separation System Control Volume VOC Discharge [VOC-OUT].

A VOC vacuum system transfer line [464] connects the VOC Vacuum System [8675], with the VOC Condenser [8650]. The Vacuum system is preferably a liquid ring vacuum pump that uses a liquid VOC seal fluid [466] within its pump casing (not shown).

This system is preferably operated during adsorption at a pressure of 25 psia of greater and preferably 300 psia of greater. The VPSA system during regeneration of the bed, in one embodiment, is operated at less than atmospheric pressure. In one embodiment, the VPSA system is operated at a pressure of 7.5 psia or less and preferably 5 psia or less to regenerate the bed. In one embodiment, the VPSA system uses a two bed system. Optionally a three bed system is used. In another embodiment, four or more beds are used.

Sequence Step I, Option 2

In another non-limiting embodiment, VOC may be removed from syngas by utilization of a continuous pressurized fluidized particulate bed adsorption system whereby VOC laden syngas is used to fluidize a particulate bed containing an adsorption medium that selectively adsorbs VOC.

FIG. 19 depicts, Sequence Step I, VOC Removal [I], Option 2 as the embodiment situated within VOC Removal Control Volume [I-1]. An Aromatic Hydrocarbon Fluidized Sorption Bed [8700] accepts VOC laden syngas from stream [I-IN] and outputs a VOC-depleted syngas through stream [I-OUT].

VOC laden syngas is introduced into the Aromatic Hydrocarbon Fluidized Sorption Bed through a distribution plate [474], which may be positioned below an optional support grid system [476] with a suitable screen to prevent reverse-flow of absorbent into the inlet conduit [I-IN].

Syngas fluidizes the adsorbent bed material [478] which adsorbs VOC from the vapor bubbles [480] passing up through the bed. An optional internal cyclone [482] may be positioned within the freeboard section [484] of the fluidized bed to separate the adsorbent from the VOC-depleted syngas, and return the adsorbent to the bed via a cyclone dipleg [486].

Desorption of VOC from the VOC saturated adsorbent takes place within the indirectly heated Regen Heat Exchange Fluidized Bed [8725]. In order for the Aromatic Hydrocarbon Fluidized Sorption Bed [8700] to realize a continuous separation of VOC from syngas, adsorbent bed material [478] must be moved from the bed, regenerated, and then transported back to the bed. A series of alternating solids handling valves [490a & 490b], configured in a lock hopper arrangement, may be used to batch-transfer volumes of adsorbent bed material [478] through VOC adsorbent transfer conduit [488] to the Regen Heat Exchange Fluidized Bed [8725]. Lock hopper valve arrangements are well known in the art to which it pertains and are commonly used to transfer solids from one isolated pressurized environment to another.

Sequence Step I, VOC Removal [I], Option 2 is preferentially installed prior to Syngas Compression Sequence Step [H]. Therefore, the preferred operating pressure range for the Aromatic Hydrocarbon Fluidized Sorption Bed [8700] of Sequence Step I, Option 2 ranges from 30 to 75 psia. The regenerate product line [430] connected to the Regen Heat Exchange Fluidized Bed [8725] is held under vacuum conditions as described in FIG. 18. The Regen Heat Exchange Fluidized Bed [8725] is operated under vacuum conditions at a pressure 14.5 psia or less and preferably 8.5 psia or less.

The Regen Heat Exchange Fluidized Bed [8725] is continuously fluidized with a VOC-depleted vapor source [492], preferably with FT tailgas, however, steam, compressed syngas, or any other available vapor, such as nitrogen or air may be used instead.

The VOC-depleted vapor source [492] is introduced into the Regen Heat Exchange Fluidized Bed [8725] through a distribution plate [494], which may be positioned below an optional support grid system [496] with a suitable screen. A heat source [498], preferably steam, is made available to at least one heat transfer chamber [500] that shares at least one heat transfer surface [502] with that of the fluidized adsorbent bed material [478] contained within the Regen Heat Exchange Fluidized Bed [8725]. This allows thermal energy to be indirectly transferred into the bed to allow a temperature aided desorption of VOC from the pores of the adsorbent material that is fluidized with the VOC-depleted vapor source [492]. VOC will be released from the adsorbent material within the bed and will enter the vapor bubbles [504] as they pass up through the bed.

An optional internal cyclone [508] may be positioned within the freeboard section [512] of the fluidized bed to separate the adsorbent from the VOC laden vapor, and return the adsorbent to the bed via a cyclone dipleg [514]. A series of alternating solids handling valves [516a & 516b], configured in a lock hopper arrangement, may be used to batch-transfer volumes of regenerated adsorbent bed material [478] through transfer conduit [518] to the Sorbent Transfer Tank [8750].

The Sorbent Transfer Tank [8750] is a cylindrical pressure vessel equipped with a dip tube [520], pressurized vapor source [522], and solids handling valves [524a & 524b], which are used together in combination to transport regenerated adsorbent bed material [478] back to the Aromatic Hydrocarbon Fluidized Sorption Bed [8700] through regen adsorbent transport line [526]. Regenerated adsorbent bed material [478] is first transferred from the Regen Heat Exchange Fluidized Bed [8725] to the Sorbent Transfer Tank [8750] through solids handling valves [516a & 516b]. The Sorbent Transfer Tank [8750] is the isolated and pressurized with the vapor source [522] by opening solids handling valve [524a] while valve 524b is closed. When the pressure in the Sorbent Transfer Tank [8750] exceeds that of the Aromatic Hydrocarbon Fluidized Sorption Bed [8700], the valve positions of solids handling valves [524a & 524b] are switched allowing regenerated adsorbent bed material [478] to be conveyed via a pressure surge from the Sorbent Transfer Tank [8750] up through the dip tube [520], and through the regen adsorbent transport line [526], where it may then enter the Aromatic Hydrocarbon Fluidized Sorption Bed [8700]. The regenerated adsorbent bed material [478] may either free fall through the freeboard section [484], or if perforated trays [528] are installed in the freeboard section [484], the regenerated adsorbent bed material [478] may gradually trickle down through the vessel and thus improve gas to solid contact.

In another non-limiting embodiment, the Regen Heat Exchange Fluidized Bed [8725] may be operated under positive pressure conditions wherein VOC may be condensed and recovered as disclosed in FIG. 18. In this particular embodiment, a VOC laden gaseous hydrocarbon vapor [430] may then exit the Regen Heat Exchange Fluidized Bed [8725], where it then may be made available as a fuel source to the Hydrocarbon Reformer [8000] of Sequence Step B, Hydrocarbon Reforming [B].

Sequence Step J, Metal Removal [J]

Figure 20:
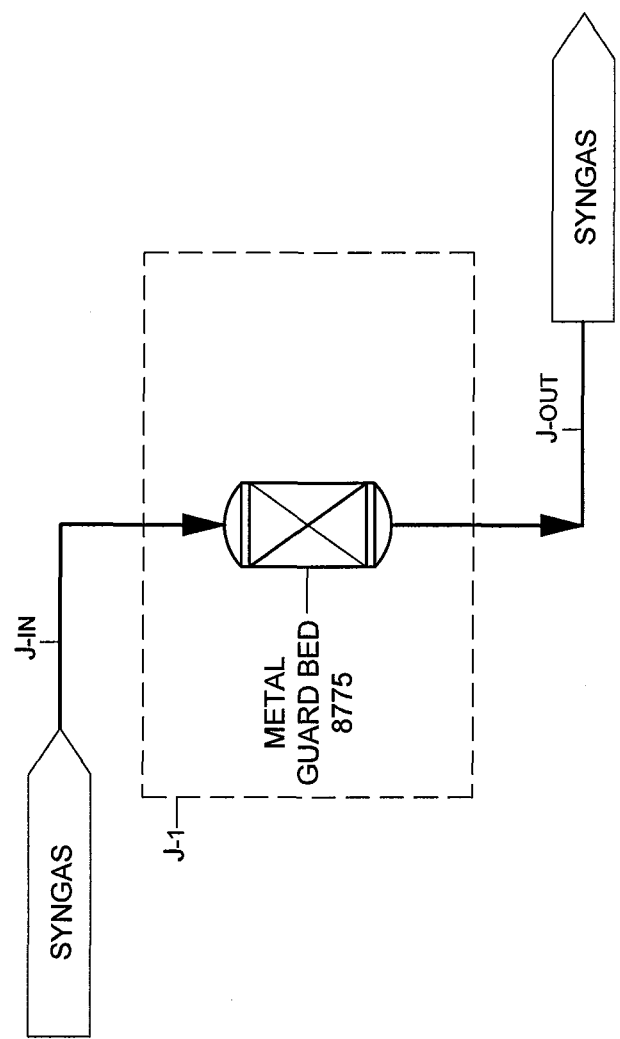

FIG. 20 depicts Sequence Step J, Metal Removal [J], wherein Metal Removal Control Volume [J-1] accepts a metal laden Sequence Step J Syngas Inlet [J-IN], and outputs a metal depleted Sequence Step J Syngas Discharge [J-OUT].

Metal Guard Bed [8775] is preferably comprised of vertical cylindrical pressure vessel containing cellulose acetate packing media possessing an affinity to sorb heavy metals, not only including, mercury, arsenic, lead, and cadmium. The cellulose acetate may be in the form of beads, spheres, flake, or pellets. Alternatively, sorbents such as Mersorb, from NUCON International, Inc., or AxTrap 277 from Axens—IFP Group Technologies, or the like, may be used.

Sequence Step K, Ammonia Removal [K]

Figure 21:
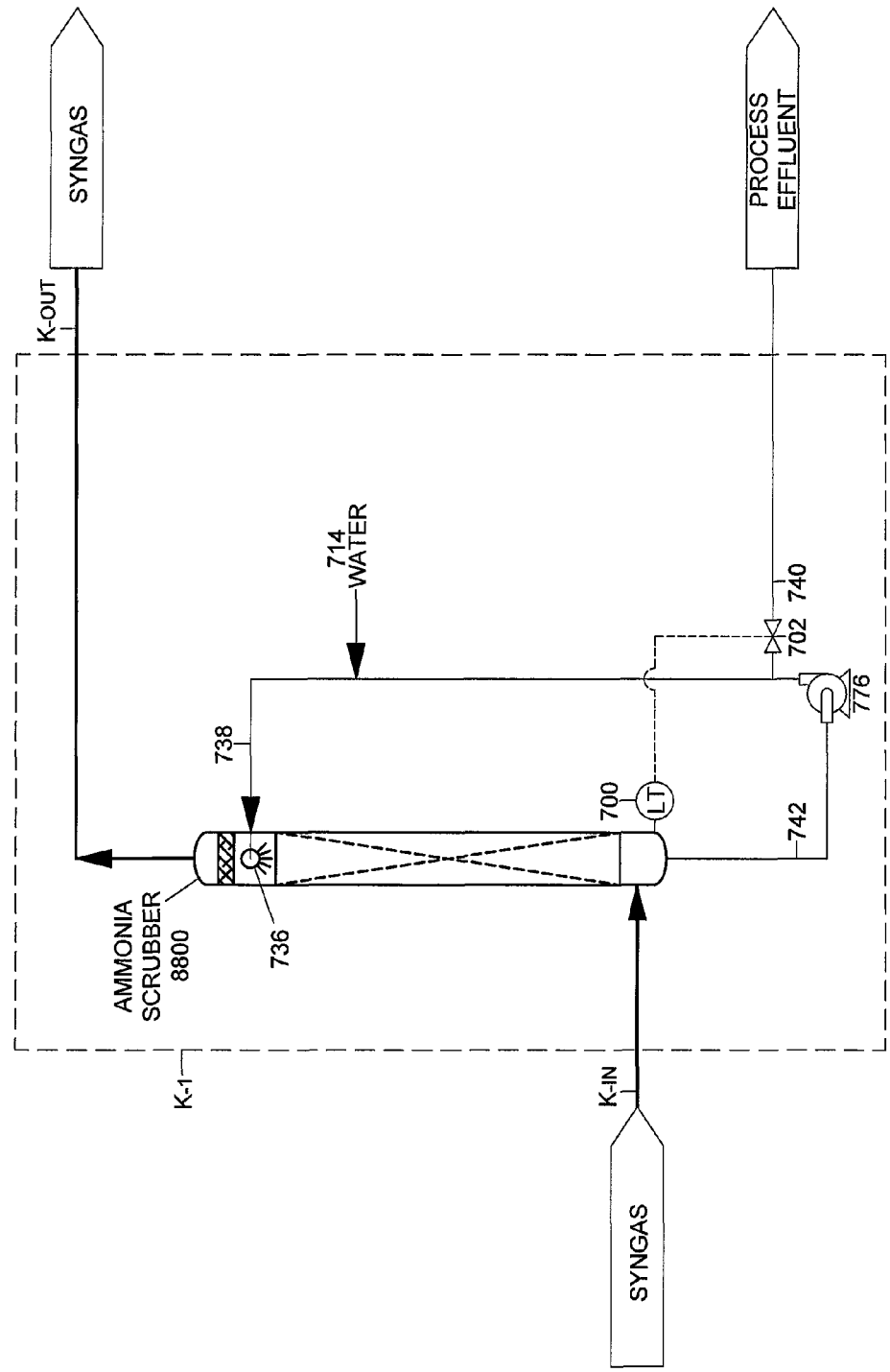

FIG. 21 depicts Sequence Step K, Ammonia Removal [K], wherein Ammonia Removal Control Volume [K-1] accepts an ammonia laden Sequence Step K Syngas Inlet [K-IN], and outputs an ammonia-depleted Sequence Step K Syngas Discharge [K-OUT].

The Ammonia Scrubber [8800], configured similar to the Chlorine Scrubber [8500], is also a vertically oriented cylindrical, or rectangular, pressure vessel having a lower section, and an upper section, along with a central section that contains a specified quantity of packed absorption media, which is supported upon a suitable support grid system commonplace to industrial chemical equipment systems. The upper section of the scrubber preferably contains a demister that is positioned above a scrubber spray nozzle system [736] which introduces the scrubbing absorption liquid to the scrubber.

The purpose of the Ammonia Scrubber is to remove trace amounts of nitrogenated compounds including ammonia and hydrogen cyanide from the syngas by using water as the main scrubbing absorption liquid.

Syngas enters the lower section of the Ammonia Scrubber and passes up through the scrubber's central section where the syngas vapor comes into intimate contact with the water scrubbing liquid traveling countercurrently via gravity flow down through the scrubber's packing. A level control loop, comprising a level transmitter [700], positioned on the lower section of the scrubber, and a level control valve [702], may be automatically operated to permit water to be bled from the scrubber water recirculation piping [738], via a waste water transfer conduit [740], to maintain a steady liquid level within the lower section of the scrubber. A scrubber water recirculation pump [776], accepts water from the lower section of the scrubber, through the pump suction piping [742], and transfers the water through the scrubber's spray nozzle system [736] and into the upper section of the scrubber where the flow of liquid is directed downwards onto the scrubber central packing. Process water [714] may be transferred to the scrubber water recirculation piping, or the lower section of the scrubber.

Sequence Step L, Ammonia Polishing [L]

Figure 22:
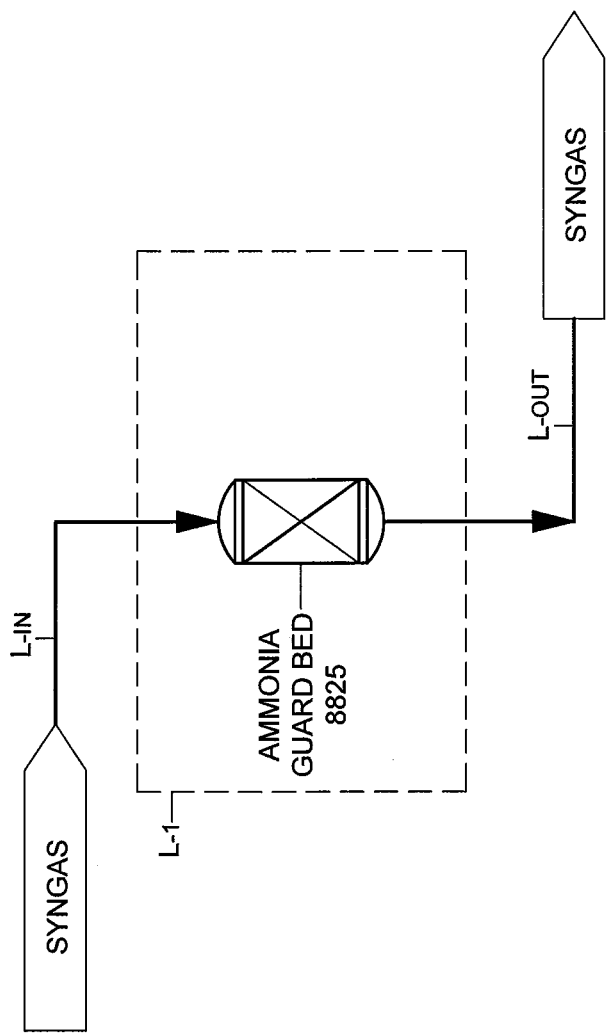

FIG. 22 depicts Sequence Step L, Ammonia Polishing [L], wherein Ammonia Polishing Control Volume [L-1] accepts a Sequence Step L Syngas Inlet [L-IN], and outputs a Sequence Step L Syngas Discharge [L-OUT].

The Ammonia Guard Bed [8825] is comprised of preferably a vertical cylindrical pressure vessel containing molecular sieve type 4A which possess an affinity to sorb trace amounts of nitrogenated compounds including ammonia and hydrogen cyanide. Alternatively, sorbents such 5A, 13X, dealuminated faujasite, dealuminated pentasil, and clinoptilolite, or the like, may be used.

Sequence Step M, Heat Addition [M]

Figure 23:
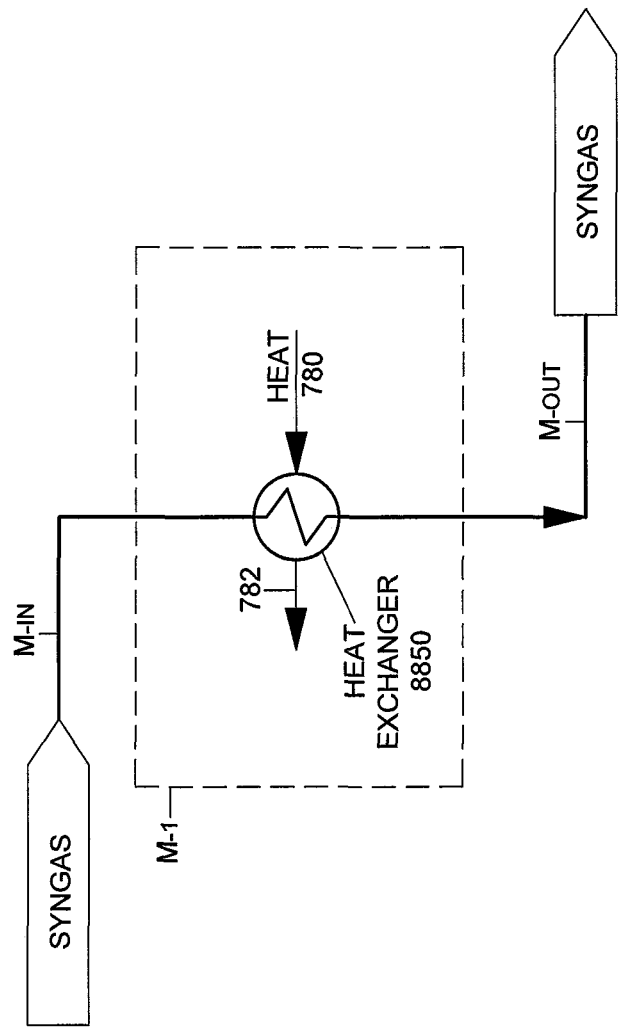

FIG. 23 depicts Sequence Step M, Heat Addition [M], wherein Heat Addition Control Volume [M-1] accepts a Sequence Step M Syngas Inlet [M-IN], and outputs a Sequence Step M Syngas Discharge [M-OUT].

The Heat Exchanger [8850] is preferably of a shell- and tube type, where syngas is routed to the tube-side. Steam located on the shell-side of the exchanger elevates the temperature of the syngas from between 75 to 125 degrees F. to between 350 and 450 degrees Fahrenheit.

The Heat Exchanger [8850] is equipped with a heat source [780] and a heat discharge that communicate with the shell-side to indirectly transfer heat to the syngas. Alternately, the heater may be electrically driven, or flue gas or another alternate heat source may be utilized in the place of steam to increase the temperature of the syngas.

Sequence Step N, Carbonyl Sulfide Removal [N]

Figure 24:
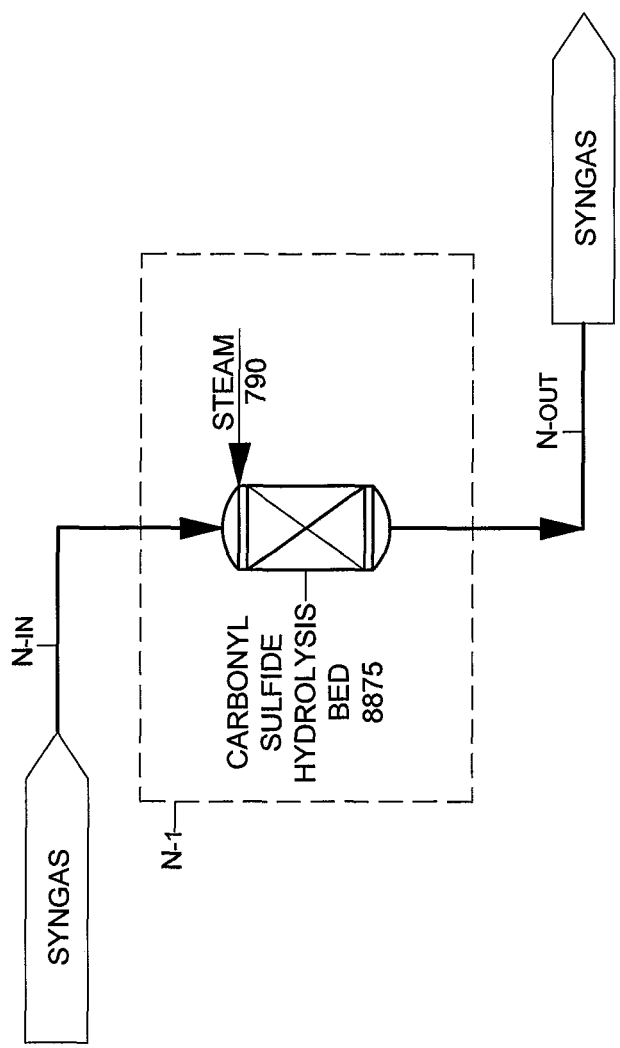

FIG. 24 depicts Sequence Step N, Carbonyl Sulfide Removal [N], wherein Carbonyl Sulfide Removal Control Volume [N-1] accepts a carbonyl sulfide laden Sequence Step N Syngas Inlet [N-IN], and outputs a sulfur-depleted Sequence Step N Syngas Discharge [N-OUT].

The Carbonyl Sulfide Hydrolysis Bed [8875] is comprised of preferably a vertical cylindrical pressure vessel containing a packed bed media, comprised of alumina or titania, either in the form of beads, pellets, granules, spheres, packing, or the like and serves the purpose to hydrolyze carbonyl sulfide into hydrogen sulfide and carbon dioxide prior to the hydrogen sulfide polishing step. Water [790] in the form of steam may be injected into the hydrolysis bed aide the carbonyl sulfide to react with water to hydrolyze into hydrogen sulfide and carbon dioxide over the packed bed media. It is preferred to accomplish the goals of this sequence step with the utilization of a packed bed of an alumina based material which allows for the hydrolysis of carbonyl sulfide into carbon dioxide and hydrogen sulfide, however any type of carbonyl sulfide removal system or method, such as adsorption or absorption type systems, may be employed to accomplish the goal of the sequence step to remove carbonyl sulfide from syngas.

Sequence Step O, Sulfur Polishing [O]

Figure 25:
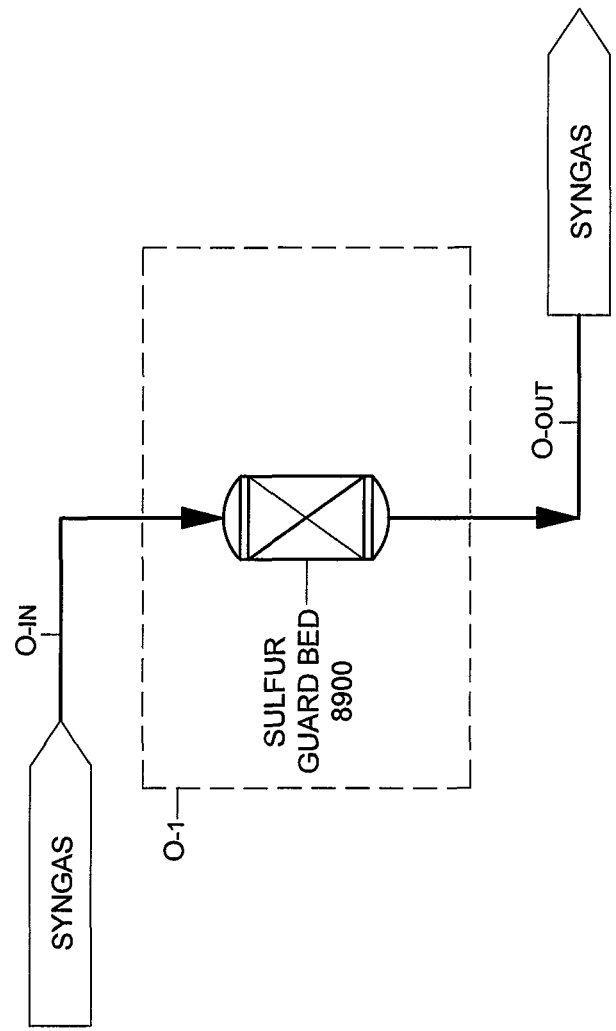

FIG. 25 depicts Sequence Step O, Sulfur Polishing [0], wherein Sulfur Polishing Control Volume [O-1] accepts Sequence Step O Syngas Inlet [O-IN], and outputs Sequence Step O Syngas Discharge [O-OUT].

The Sulfur Guard Bed [8900] is comprised of preferably a vertical cylindrical pressure vessel containing a sorbent media, comprised of zinc oxide in the form of beads, pellets, granules, spheres, packing, or the like and serves the purpose to adsorb trace amounts of hydrogen sulfide and elemental sulfur.

Sequence Step P, Carbon Dioxide Removal [P]

Figure 26:
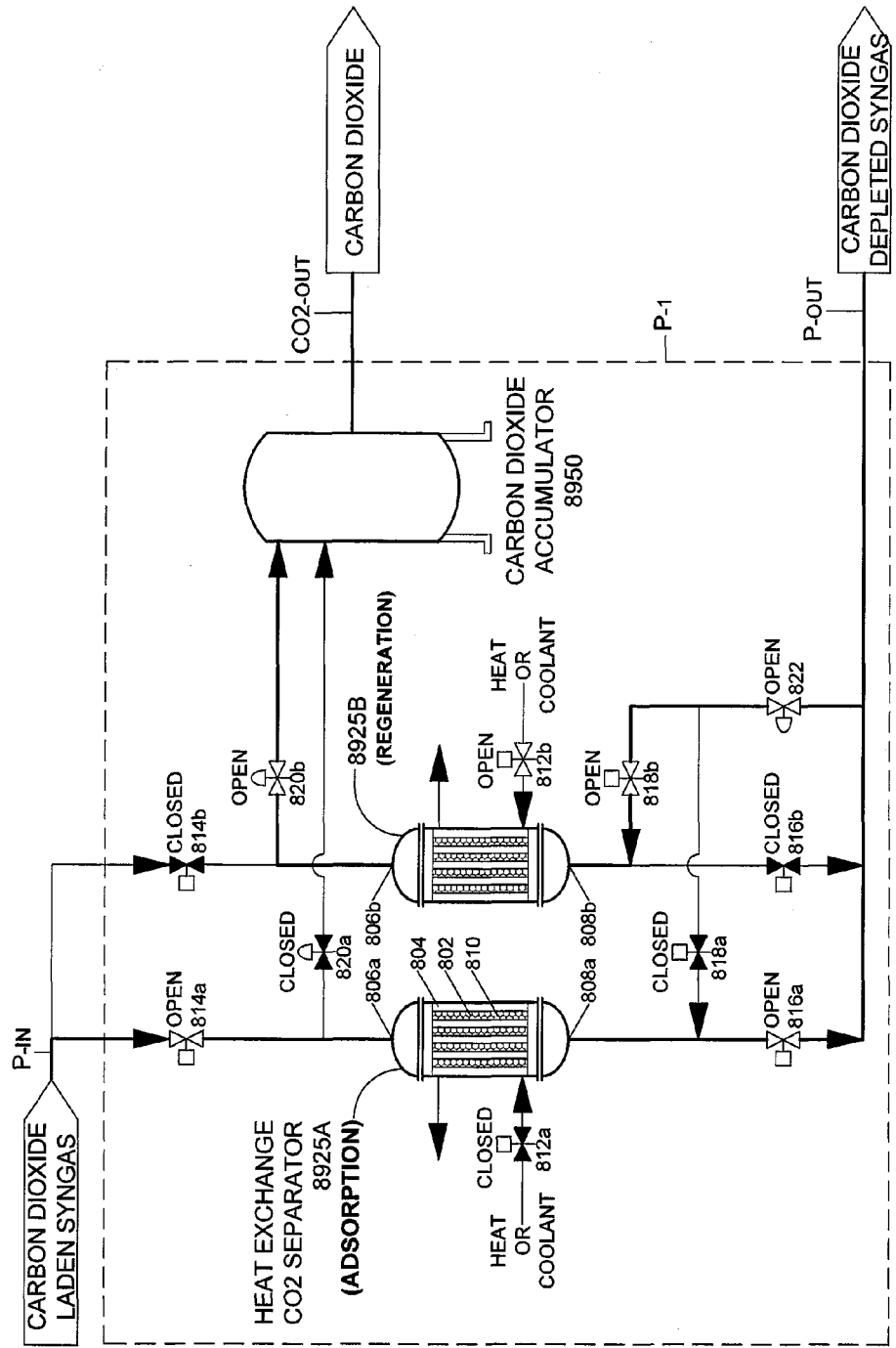

FIG. 26 depicts Sequence Step P, Carbon Dioxide Removal [P], wherein Carbon Dioxide Removal Control Volume [P-1] accepts a carbon dioxide laden Sequence Step P Syngas Inlet [P-IN], and outputs a carbon dioxide depleted Sequence Step P Syngas Discharge [P-OUT]. The Heat Exchange CO2 Separator serves the purpose to remove the carbon dioxide from the pressurized syngas and recycle it for utilization somewhere else. It is preferred to recycle the separated carbon dioxide as an oxidant within the Hydrocarbon Reformer [8000], or for use in the upstream syngas generation process as a fluidization medium, or as vapor purges on instrumentation and sampling ports and connections.

The equipment functionality as described above in Sequence Step I, Option 1, of FIG. 18 is identical to that of the preferred embodiment situated within Dioxide Removal Control Volume [Q-1] of Sequence Step P, Carbon Dioxide Removal [P]. However, one main difference exists in that the Heat Exchange CO2 Separator [8925A&B] is preferentially comprised of a shell and tube heat exchanger, preferably equipped with ½" diameter tubes. It is preferred to dispose an activated carbon fiber material, preferably in the form of spiral wound activated carbon fiber fabric, or braided activated carbon fiber cloth strands, within the tube side particulate bed [810] of the vessel while the shell-side thermal transfer chamber [804] runs empty except when undergoing a regeneration cycle.

The regeneration process as described above in Sequence Step I, Option 1, of FIG. 18 is identical to that of the preferred embodiment situated within Dioxide Removal Control Volume [P-1] of Sequence Step P, Carbon Dioxide Removal [P], except for the fact that the Sequence Step P does not utilize a vacuum system. Instead, the regenerate product line [830] is in communication with a Carbon Dioxide Accumulator [8950]. The purpose of the Carbon Dioxide Accumulator [8950] is to provide sufficient volume and residence time for regenerated carbon dioxide laden syngas vapors, transferred from a regeneration cycle, to be stored for utilization somewhere else by transferring the carbon dioxide through a Sequence Step P Carbon Dioxide Discharge [CO2-OUT]. The accumulator operates at a pressure of 100 to 165 psia.

Alternatively, a membrane or sorption based carbon dioxide recovery unit may be used to accomplish the goals of carbon dioxide removal and recovery defined by Sequence Step P, Carbon Dioxide Removal [P]. In a further embodiment, carbon dioxide may be reduced within this sequence step by use of a carbon dioxide electrolyzer.

Sequence Step Q, R, S: Heat Addition [Q]; Steam Methane Reforming [R]; Heat Removal [S]

Figure 27:
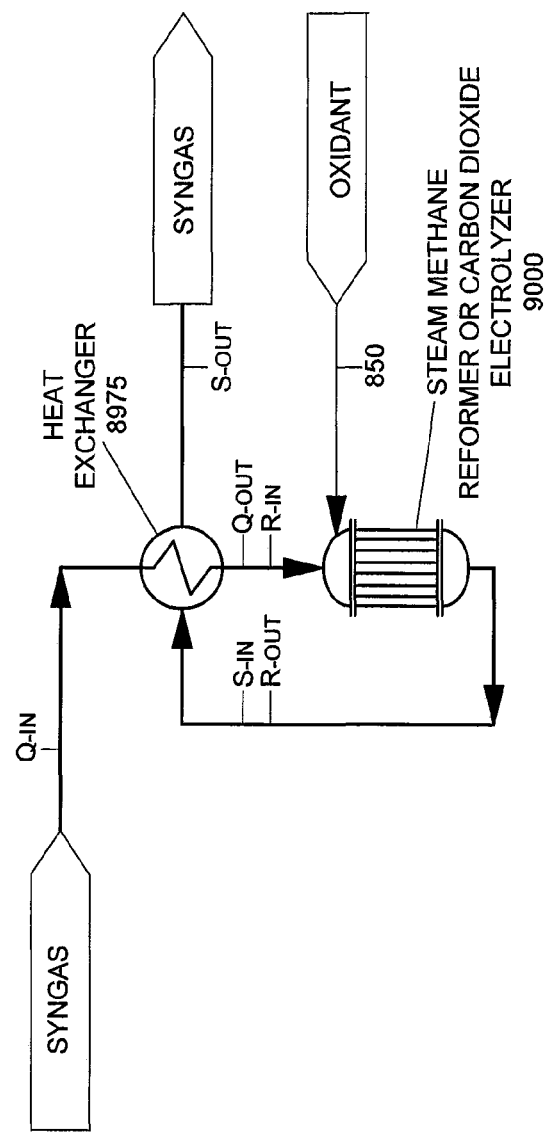

With reference to FIG. 27, Sequence Step Q, Heat Addition [Q], Sequence Step R, Steam Methane Reforming [R], and Sequence Step S, Heat Removal [S] are combined in a preferred fashion as to realize an energy integrated system capable of reforming hydrocarbons present in the inlet syngas source [P-IN]. This configuration is preferred when utilizing the optional gaseous hydrocarbon source [HC-IN] routed to the inlet of the Syngas Compressor [8600].

A Heat Exchanger [8975] accepts a gaseous hydrocarbon laden syngas Sequence Step Q Syngas Inlet [Q-IN] and elevates its temperature to the operating temperature of the Steam Methane Reformer [9000]. This is accomplished by utilization of heat transfer integration with the reformed cleaned and conditioned syngas [R-OUT] transferred a the shared heat transfer surface within the Heat Exchanger [8975]. An oxidant source [850] is made available to the Steam Methane Reformer [9000] to ensure complete decomposition of the gaseous hydrocarbons into carbon monoxide and hydrogen. A cooled syngas depleted of undesirable gaseous hydrocarbons [S-OUT] is discharged from the Heat Exchanger [8975] to be made available to a downstream syngas processing technology.

Syngas Processing Embodiments

Those of ordinary skill in the art will recognize that fewer that all of the steps B-S of FIG. 1 may be used in a given syngas processing method and system.

For instance, in a first syngas processing method, only steps C, D, G, H, K, O and T may be practiced, and the corresponding system will include the equipment required to implement these steps.

In a second syngas processing method, only steps B, C, D, F, G, H, I, K, M, N, O and T may be practiced, and the corresponding system will include the equipment required to implement these steps.

FIGS. 30A-30F present a number of syngas processing embodiments that one might wish to implement. Each row of the table in FIGS. 30A-30F presents the steps to be practiced in a single syngas processing embodiment. It is understood that the corresponding elements necessary to realize each such method would be needed in a system for that embodiment. method.

EQUIPMENT LIST

The following list of equipment presents items that should be understandable to those of ordinary skill in the art familiar of syngas processing.

8000 Hydrocarbon Reformer
8025 Heat Recovery Steam Generator (HRSG) Superheater
8050 Heat Recovery Steam Generator (HRSG)
8075 Steam Drum
8100 Venturi Scrubber
8125 Char Scrubber
8150 Char Scrubber Heat Exchanger
8175 Continuous Candle Filter Decanter
8200 Filtrate Backflush Buffer Tank
8225 Filter Cake Liquid Removal System
8250 Liquid Depleted Solids Collection
8275 Decanter
8300 Continuous Candle Filter
8325 SVOC Flash Tank Heat Exchanger
8350 SVOC Flash Tank
8375 Solvent Cooler
8400 SVOC Condenser
8425 SVOC Vacuum System
8450 Guard Filter
8475 SVOC Sorptive Separator
8500 Chlorine Scrubber
8525 Chlorine Scrubber Heat Exchanger
8550 Sulfur Scrubber 8575 Particulate Filter
8600 Syngas Compressor
8625 Aromatic Hydrocarbon Micro-Scale Heat Exchange Adsorber
8650 VOC Condenser
8675 VOC Vacuum System
8700 Aromatic Hydrocarbon Fluidized Sorption Bed
8725 Regen Heat Exchange Fluidized Bed
8750 Sorbent Transfer Tank
8775 Metals Guard Bed
8800 Ammonia Scrubber
8825 Ammonia Guard Bed
8850 Heat Exchanger
8875 Carbonyl Sulfide Hydrolysis Bed
8900 Sulfur Guard Bed
8925 Heat Exchange CO2 Separator
8950 Carbon Dioxide Accumulator
8975 Heat Exchanger
9000 Steam Methane Reformer

LIST OF REFERENCE NUMERALS

Sequence Step B Syngas Inlet [B-IN]
Sequence Step B Syngas Discharge [B-OUT]
Sequence Step C Syngas Inlet [C-IN]
Sequence Step C Syngas Discharge [C-OUT]
Sequence Step D Syngas Inlet [D-IN]
Sequence Step D Syngas Discharge [D-OUT]
SVOC Separation System Control Volume SVOC Discharge [SVOC-OUT]
Sequence Step E Syngas Inlet [E-IN]
Sequence Step E Syngas Discharge [E-OUT]
Sequence Step F Syngas Inlet [F-IN]
Sequence Step F Syngas Discharge [F-OUT]
Sequence Step G Syngas Inlet [G-IN]
Step G Syngas Discharge [G-OUT]
optional gaseous hydrocarbon source [HC-IN]
Sequence Step H Syngas Inlet [H-IN]
Step H Syngas Discharge [H-OUT]
Sequence Step I Syngas Inlet [I-IN]
VOC Separation System Control Volume VOC Discharge [VOC-OUT]
Sequence Step I Syngas Discharge [I-OUT]
Sequence Step J Syngas Inlet [J-IN]
Sequence Step J Syngas Discharge [J-OUT]
Step K Syngas Inlet [K-IN]
Sequence Step K Syngas Discharge [K-OUT]
Sequence Step L Syngas Inlet [L-IN]
Sequence Step L Syngas Discharge [L-OUT]
Sequence Step M Syngas Inlet [M-IN]
Sequence Step M Syngas Discharge [M-OUT]
Sequence Step N Syngas Inlet [N-IN]
Sequence Step N Syngas Discharge [N-OUT]
Sequence Step O Syngas Inlet [O-IN]
Sequence Step O Syngas Discharge [O-OUT]
Sequence Step P Syngas Inlet [P-IN]
Sequence Step P Syngas Discharge [P-OUT]
Sequence Step P Carbon Dioxide Discharge [CO2-OUT]
Sequence Step Q Syngas Inlet [Q-IN]
Sequence Step Q Syngas Discharge [Q-OUT]
Sequence Step R Syngas Inlet [R-IN]
Sequence Step R Syngas Discharge [R-OUT]
Sequence Step S Syngas Inlet [S-IN]
Sequence Step S Syngas Discharge [S-OUT]
Hydrocarbon Reforming Control Volume [B-1]
Syngas Cooling Control Volume [C-1]
Solids Removal & SVOC Removal Control Volume [D-1]
Chlorine Removal Control Volume [E-1]
Sulfur Removal Control Volume [F-1]
Particulate Filtration Control Volume [G-1]
VOC Removal Control Volume [I-1]
Metal Removal Control Volume [J-1]
Ammonia Removal Control Volume [K-1]
Ammonia Polishing Control Volume [L-1]
Heat Addition Control Volume [M-1]
Carbonyl Sulfide Removal Control Volume [N-1]
Sulfur Polishing Control Volume [O-1]
Carbon Dioxide Removal Control Volume [P-1]
SVOC Separation System Control Volume [SVOC-1]
additives [2]
oxidant source [4]
gaseous hydrocarbon source [6]
superheated steam [8]
HRSG transfer line [10]
water [12]
steam and water mixture [14]
pressure transmitter [16]
pressure control valve [18]
saturated steam transfer line [20]
level transmitter [22]
level control valve [24]
water supply line [26]
steam drum continuous blowdown line [28]
Venturi Scrubber recirculation water line [30]
Venturi Scrubber recirculation solvent line [32]
Venturi Scrubber to Char Scrubber transfer conduit [34]
scrubber spray nozzle system [36]
Char Scrubber recirculation water [38]
Char Scrubber recirculation solvent [40]
Char Scrubber underflow downcomer [42]
common water recirculation line [44]
cooling water supply [46]
cooling water return [48]
upright tank [50]
central section [52]
closed dome shaped top [54]
conical lower sections [56a & 56b]
drain valve [58a & 58b]
drain line [60a & 60b]
vertical underflow weir [62]
upright vertical housing wall [64]
annular passageway [66]
common water header [68]
water take-off nozzles [70a & 70b]
water recirculation pump [72]
inner solvent chamber [74]
solvent and water interface rag-layer [78]
filter bundles [80a & 80b]
candle filter elements [82]
filter bundle common register [84a & 84b]
filtrate removal conduit [86a & 86b]
filtrate process pump [88]
common filtrate suction header [90]
filtrate register valve [92a & 92b]
filtrate solvent transfer line [94]
alternate backflush transfer line [95]
common solvent recirculation line [96]
pressure transmitters [98a & 98b]
housing pressure transmitter [100]
flow indicating sight glasses [102a & 102b]
SVOC-depleted solvent transfer line [104]
level transmitter [106]
solvent supply level control valve [108]
solvent supply line [110]

solvent backflush pump [112]
filtrate transfer conduit [114]
backflush tank recirculation line [116]
restriction orifice [118]
backflush filtrate regen valves [120a & 120b]
filtrate backflush regen conduit [122a & 122b]
liquid removed from the filter cake [124]
waste water header [126]
solids & SVOC laden solvent filtrate transfer line [128]
SVOC laden solvent filtrate transfer line [130]
alternate backflush transfer line [131]
steam inlet line [132]
steam discharge line [134]
SVOC laden filtrate solvent Flash Tank transfer line [136]
pressure letdown device [138]
SVOC flash transfer conduit [140]
SVOC-depleted solvent transfer line [142]
SVOC-depleted solvent transfer pump [144]
solvent transfer line [146]
solvent recycle line [148]
cooling water supply [150]
cooling water return [152]
impingement baffle [154]
spray nozzles [156]
CIP agent transfer line [158]
CIP agent isolation valve [160]
cooled SVOC-depleted solvent transfer line [162]
SVOC vacuum system transfer line [164]
liquid SVOC seal fluid [166]
vacuum system vent line [168]
cooling water supply [170]
cooling water return [172]
porous membrane [174]
porous chemical resistant coating [176]
SVOC laden solvent membrane process surface [178a]
SVOC permeate membrane process surface [178b]
filtrate solvent transfer line [180]
level transmitter [200]
level control valve [202]
process water [214]
scrubber spray nozzle system [236]
scrubber water recirculation piping [238]
water transfer conduit [240]
pump suction piping [242]
cooling water supply [246]
cooling water return [248]
recirculation pump [276]
level transmitter [300]
level control valve [302]
process water [314]
sulfur scavenger derived solution [316]
scrubber spray nozzle system [336]
scrubber water recirculation piping [338]
water transfer conduit [340]
pump suction piping [342]
recirculation pump [376]
adsorption chamber [402]
thermal transfer chamber [404]
feed inlet [406a & 406b]
product outlet [408a & 408b]
particulate bed [410]
thermal transfer chamber inlet valve [412a & 412b]
inlet valve [414a & 414b]
product outlet valve [416a & 416b]
purge inlet valve [418a & 418b]
depressurization valve [420a & 420b]
modulating purge valve [422]

regenerate product line [430]
VOC vacuum system transfer line [464]
liquid VOC seal fluid [466]
vacuum system vent line [468]
cooling water supply [470]
cooling water return [472]
distribution plate [474]
support grid system [476]
adsorbent bed material [478]
vapor bubbles [480]
internal cyclone [482]
freeboard section [484]
cyclone dipleg [486]
VOC adsorbent transfer conduit [488]
solids handling valves [490a & 490b]
VOC-depleted vapor source [492]
distribution plate [494]
support grid system [496]
heat source [498]
heat transfer chamber [500]
heat transfer surface [502]
vapor bubbles [504]
gaseous hydrocarbon vapor [506]
internal cyclone [508]
freeboard section [512]
cyclone dipleg [514]
solids handling valves [516a & 516b]
transfer conduit [518]
dip tube [520]
vapor source [522]
solids handling valves [524a & 524b]
regen adsorbent transport line [526]
perforated trays [528]
level transmitter [700]
level control valve [702]
process water [714]
scrubber spray nozzle system [736]
scrubber water recirculation piping [738]
water transfer conduit [740]
pump suction piping [742]
recirculation pump [776]
heat source [780]
heat discharge [782]
water [790]
adsorption chamber [802]
thermal transfer chamber [804]
feed inlet [806a & 806b]
product outlet [808a & 808b]
particulate bed [810]
thermal transfer chamber inlet valve [812a & 812b]
inlet valve [814a & 814b]
outlet valve [816a & 816b]
purge inlet valve [818a & 818b]
depressurization valve [820a & 820b]
modulating purge valve [822]
regenerate product line [830]
oxidant source [850]

SEQUENCE STEP LIST

Syngas Generation [A]
Sequence Step B, Hydrocarbon Reforming [B]
Sequence Step C, Syngas Cooling [C]
Sequence Step D, Solids Removal & SVOC Removal [D]
Sequence Step E, Chlorine Removal [E]
Sequence Step F, Sulfur Removal [F]
Sequence Step G, Particulate Filtration [G]

Sequence Step H, Syngas Compression [H]
Sequence Step I, VOC Removal [I]
Sequence Step J, Metal Removal [J]
Sequence Step K, Ammonia Removal [K]
Sequence Step L, Ammonia Polishing [L]
Sequence Step M, Heat Addition [M]
Sequence Step N, Carbonyl Sulfide Removal [N]
Sequence Step O, Sulfur Polishing [O]
Sequence Step P, Carbon Dioxide Removal [P]
Sequence Step Q, Heat Addition [Q]
Sequence Step R, Steam Methane Reforming [R]
Sequence Step S, Heat Removal [S]
Clean Syngas For End User [T]
Sequence Step B Syngas Inlet [B-IN]
Sequence Step B Syngas Discharge [B-OUT]
Sequence Step C Syngas Inlet [C-IN]
Sequence Step C Syngas Discharge [C-OUT]
Sequence Step D Syngas Inlet [D-IN]
Sequence Step D Syngas Discharge [D-OUT]
SVOC Separation System Control Volume SVOC Discharge [SVOC-OUT]
Sequence Step E Syngas Inlet [E-IN]
Sequence Step E Syngas Discharge [E-OUT]
Sequence Step F Syngas Inlet [F-IN]
Sequence Step F Syngas Discharge [F-OUT]
Sequence Step G Syngas Inlet [G-IN]
Sequence Step G Syngas Discharge [G-OUT]
optional gaseous hydrocarbon source [HC-IN]
Sequence Step H Syngas Inlet [H-IN]
Sequence Step H Syngas Discharge [H-OUT]
Sequence Step I Syngas Inlet [I-IN]
VOC Separation System Control Volume VOC Discharge [VOC-OUT]
Sequence Step I Syngas Discharge [I-OUT]
Sequence Step J Syngas Inlet [J-IN]
Sequence Step J Syngas Discharge [J-OUT]
Sequence Step K Syngas Inlet [K-IN]
Sequence Step K Syngas Discharge [K-OUT]
Sequence Step L Syngas Inlet [L-IN]
Sequence Step L Syngas Discharge [L-OUT]
Sequence Step M Syngas Inlet [M-IN]
Sequence Step M Syngas Discharge [M-OUT]
Sequence Step N Syngas Inlet [N-IN]
Sequence Step N Syngas Discharge [N-OUT]
Sequence Step O Syngas Inlet [O-IN]
Sequence Step O Syngas Discharge [O-OUT]
Sequence Step P Syngas Inlet [P-IN]
Sequence Step P Syngas Discharge [P-OUT]
Sequence Step P Carbon Dioxide Discharge [CO2-OUT]
Sequence Step Q Syngas Inlet [Q-IN]
Sequence Step Q Syngas Discharge [Q-OUT]
Sequence Step R Syngas Inlet [R-IN]
Sequence Step R Syngas Discharge [R-OUT]
Sequence Step S Syngas Inlet [S-IN]
Sequence Step S Syngas Discharge [S-OUT]
Hydrocarbon Reforming Control Volume [B-1]
Syngas Cooling Control Volume [C-1]
Solids Removal & SVOC Removal Control Volume [D-1]
Chlorine Removal Control Volume [E-1]
Sulfur Removal Control Volume [F-1]
Particulate Filtration Control Volume [G-1]
VOC Removal Control Volume [I-1]
Metal Removal Control Volume [J-1]
Ammonia Removal Control Volume [K-1]
Ammonia Polishing Control Volume [L-1]
Heat Addition Control Volume [M-1]
Carbonyl Sulfide Removal Control Volume [N-1]
Sulfur Polishing Control Volume [O-1]
Carbon Dioxide Removal Control Volume [P-1]
SVOC Separation System Control Volume [SVOC-1]
filtration [step 950]
filter bundle isolation [step 952]
filtrate backflush [step 954]
filter cake sedimentation [step 956]
filter cake discharge start [step 958]
filter cake discharge end [step 960]
filtration restart preparation [step 962]
Step D1$a$
Step D1$b$
Step D1$c$
Step D1$ca$
Step D1$cb$
Step D1$d$
Step D1$e$

What is claimed is:

1. A syngas clean-up system for processing unconditioned syngas having solids and semi-volatile organic compounds (SVOC) therein, comprising:
a hydrocarbon reformer (8000) connected to a source of unconditioned syngas and operated to output an improved quality syngas;
a semi-volatile organic compound (SVOC) removal system positioned downstream of the hydrocarbon reformer (8000), the SVOC removal system comprising at least one scrubber (8100, 8125) and configured to output a first depleted syngas stream having a reduced amount of solids and SVOCs relative to the unconditioned syngas;
at least one syngas compressor (8600) positioned downstream of the scrubber and configured output a compressed first depleted syngas stream;
a volatile organic compound (VOC) separation system positioned downstream of the syngas compressor, the VOC separation system comprising at least one adsorber and configured to output a second depleted syngas stream which has a reduced amount of VOC relative to the compressed first depleted syngas stream;
at least one carbonyl sulfide hydrolysis bed (8875) positioned downstream of the VOC separation system and configured to remove carbonyl sulfide to produce a third depleted syngas stream which has a reduced amount of carbonyl sulfide relative to the second depleted syngas stream; and
at least one sulfur guard bed (8900) positioned downstream of the carbonyl sulfide hydrolysis bed and configured to remove at least one sulfur compound to produce a sulfur-depleted syngas stream which has a reduced amount of sulfur relative to the second and third depleted syngas streams.

2. The system according to claim 1, wherein the SVOC removal system comprises:
a venturi scrubber (8100) configured to receive the unconditioned syngas, solvent and water and output an intermediate SVOC-depleted syngas containing steam together with a first mixture comprising SVOC, solids, solvent and water;
a char scrubber (8125) configured to receive the intermediate SVOC-depleted syngas containing steam and the first mixture, and separately output: (i) a first depleted syngas stream which has a reduced amount of SVOC relative to the unconditioned gas stream, and (ii) a second mixture comprising SVOC, solids, solvent and water;

a decanter (8275) configured to receive the second mixture and separate the water within the second mixture based upon immiscibility so that the SVOC, solids and solvent collect together to form a third mixture separate from the water within the decanter, the decanter further configured to separately output the water and the third mixture; and a vessel (8300) arranged to receive the third mixture, the vessel having at least one liquid phase candle filter and a vessel bottom provided with a drain port; wherein:

the candle filter is capable of operating so that: (i) the solids agglomerate on a surface of the candle filter and form a filter cake, and (ii) the SVOC and solvent are removed through the candle filter, and the drain port is suitable for removing filter cake therethrough.

3. The system according to claim 2, wherein the SVOC removal system further comprises:

an SVOC separation system (SVOC-1) configured to receive said SVOC and solvent removed through the candle filter, and output a first stream of SVOC and a second stream of SVOC-depleted solvent.

4. The system according to claim 3, wherein the SVOC removal system further comprises:

a heat exchanger (8150) configured to receive water from the decanter (8275) and to provide water to both the venturi scrubber (8100) and the char scrubber (8125).

5. The system according to claim 1, wherein the SVOC removal system comprises:

a venturi scrubber (8100) configured to receive the unconditioned syngas, solvent and water and output an intermediate SVOC-depleted syngas containing steam together with a first mixture comprising SVOC, solids, solvent and water;

a char scrubber (8125) configured to receive the intermediate SVOC-depleted syngas containing steam and the first mixture, and separately output: (i) a first depleted syngas stream which has a reduced amount of SVOC relative to the unconditioned gas stream, and (ii) a second mixture comprising SVOC, solids, solvent and water;

a decanter (8275) configured to receive the second mixture and separate the water within the second mixture based upon immiscibility so that the SVOC, solids and solvent collect together to form a third mixture separate from the water within the decanter, the decanter further configured to separately output the water and the third mixture; and a separation device arranged to receive the third mixture and separate the solids from the SVOC and solvent, and output an SVOC-laden solvent.

6. The system according to claim 5, wherein the SVOC removal system further comprises:

an SVOC separation system (SVOC-1) configured to receive said SVOC-laden solvent and output a first stream of SVOC and a second stream of SVOC-depleted solvent.

7. The system according to claim 5, wherein the SVOC removal system further comprises:

a heat exchanger (8150) configured to receive water from the decanter (8275) and to provide water to both the venturi scrubber (8100) and the char scrubber (8125).

8. The system according to claim 1, further comprising:

a chlorine scrubber (8500) positioned downstream of the at least one scrubber and upstream of the syngas compressor (8600);

wherein the chlorine scrubber (8500) is configured to reduce an amount of chlorine present in the first depleted syngas stream.

9. The system according to claim 8, further comprising:

a sulfur scrubber (8550) positioned downstream of the chlorine scrubber (8500) and upstream of the syngas compressor (8600);

wherein the chlorine scrubber (8500) is configured to reduce an amount of chlorine present in the first depleted syngas stream.

10. The system according to claim 9, further comprising:

a particulate filter (8575) positioned downstream of the sulfur scrubber (8550) and upstream of the syngas compressor (8600);

wherein the particulate filter is configured to reduce an amount of particulates present in the first depleted syngas stream.

11. The system according to claim 1, further comprising:

a carbon dioxide separator (8925) positioned downstream of the at least one carbonyl sulfide hydrolysis bed (8875);

wherein the carbon dioxide separator (8925) is configured to reduce an amount of carbon dioxide in the third depleted syngas stream.

12. The system according to claim 11, wherein at least a portion of the carbon dioxide removed from the third depleted syngas stream is conveyed to a syngas generator upstream of the hydrocarbon reformer (8000) for use in generating additional unconditioned syngas.

13. The system according to claim 1, further comprising:

an ammonia scrubber (8800) positioned downstream of the VOC separation system and upstream of the at least one sulfur guard bed (8900);

a metal guard bed (8775) positioned downstream of the VOC separation system and upstream of the at least one sulfur guard bed (8900);

a carbon dioxide separator (8925) positioned downstream of all three of the ammonia scrubber (8800), the metal guard bed (8775) and the carbonyl sulfide hydrolysis bed (8875);

wherein the ammonia scrubber (8800) is configured to reduce an amount of ammonia present in the second depleted syngas stream;

wherein the metal guard bed (8775) is configured to reduce an amount of metal present in the second depleted syngas stream; and\ wherein the carbon dioxide separator (8925) is configured to reduce an amount of carbon dioxide in the third depleted syngas stream.

14. The system according to claim 13, wherein at least a portion of the carbon dioxide removed from the third depleted syngas stream is conveyed to a syngas generator upstream of the hydrocarbon reformer (8000) for use in generating additional unconditioned syngas.

15. The system according to claim 1, further comprising:

at least one heat recovery device (8025, 8050) positioned downstream of the hydrocarbon reformer and upstream of the SVOC removal system;

wherein the at least one heat recovery device (8025, 8050) is configured to cool the improved quality syngas.

16. The system according to claim 1, wherein the SVOC removal system comprises:

a venturi scrubber (8100) configured to receive the improved quality syngas, and a char scrubber (8125) downstream of the venturi scrubber (8100).

17. The system according to claim 1, wherein the SVOC removal system comprises:
- at least one scrubber (8100, 8125) configured to receive the unconditioned syngas and water, and separately output: (i) a first depleted syngas stream which has a reduced amount of SVOC relative to the unconditioned gas stream, and (ii) a second mixture comprising at least solids and water;
- a decanter (8275) configured to receive the second mixture and separate the solids from a least a portion of the water;
- a heat exchanger (8150) configured to receive said a least a portion of the water from the decanter (8275) and return water to at least one scrubber; and
- a separation device arranged to receive at least said solids separated by said decanter.

18. The system according to claim 1, wherein the VOC separation system comprises:
- a pressure swing adsorption system having parallel first and second microchannel heat exchange adsorbers (8625A & 8625B) capable of being operated such that while the first heat exchange adsorber (8625A) is in an adsorption mode, the second heat exchange adsorber (8625B) is in a regeneration mode; and
- the pressure swing adsorption system is configured to receive the compressed first depleted syngas stream and separately output: (i) the second depleted syngas stream, and (ii) the VOC.

19. The system according to claim 1, wherein the VOC separation system comprises:
- an aromatic hydrocarbon fluidized adsorption bed (8700) configured to receive the compressed first depleted syngas stream and separately output: (i) the second depleted syngas stream, and (ii) VOC-laden sorbent; and
- a regeneration fluidized bed (8725) configured to receive the VOC-laden sorbent and separately output the VOC and the sorbent.

20. The system according to claim 1, wherein the VOC separation system comprises:
- an aromatic hydrocarbon fixed adsorption bed (8625) configured to receive the compressed first depleted syngas stream and separately output: (i) the second depleted syngas stream which has a reduced amount of volatile organic compounds (VOC) relative to the compressed first depleted syngas stream, and (ii) VOC-laden sorbent for regeneration into a VOC stream and a sorbent stream.

21. The system according to claim 1, further comprising:
- an ammonia scrubber (8800) positioned downstream of the VOC separation system and upstream of the least one carbonyl sulfide hydrolysis bed (8875);
- wherein the ammonia scrubber (8800) is configured to reduce an amount of ammonia present in the second depleted syngas stream.

22. The system according to claim 1, further comprising:
- a metal guard bed (8775) positioned downstream of the VOC separation system and upstream of the at least one sulfur guard bed (8900);
- wherein the metal guard bed is configured to reduce an amount of metal present in the second depleted syngas stream.

23. A system for processing unconditioned syngas, comprising:
- means for removing solids and semi-volatile organic compounds (SVOC) from the unconditioned syngas to form a first depleted syngas stream which has a reduced amount of solids and SVOC relative to the unconditioned syngas;
- means for removing volatile organic compounds (VOC) from the first depleted syngas stream to form a second depleted syngas stream which has a reduced amount of VOC relative to the first depleted syngas stream; and
- at least one bed configured to receive the second depleted syngas stream and remove at least one sulfur compound therefrom to produce a sulfur-depleted syngas stream which has a reduced amount of sulfur relative to the second depleted syngas stream.

* * * * *